United States Patent
Yonekubo et al.

(12)

(10) Patent No.: US 6,328,400 B1
(45) Date of Patent: Dec. 11, 2001

(54) PRINTER SYSTEM, METHOD OF GENERATING IMAGE, AND RECORDING MEDIUM FOR REALIZING THE METHOD

(75) Inventors: Shuji Yonekubo; Takahiro Katakura; Kazumichi Shimada; Toshiaki Kakutani, all of Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/147,035
(22) PCT Filed: Apr. 1, 1998
(86) PCT No.: PCT/JP98/01517
§ 371 Date: Sep. 15, 1998
§ 102(e) Date: Sep. 15, 1998
(87) PCT Pub. No.: WO98/43818
PCT Pub. Date: Oct. 8, 1998

(30) Foreign Application Priority Data

Apr. 2, 1997 (JP) .................................................... 9-084233
Apr. 16, 1997 (JP) .................................................... 9-099486
Nov. 19, 1997 (JP) .................................................... 9-336529

(51) Int. Cl.$^7$ ............................................................. B41J 2/21
(52) U.S. Cl. .............................. 347/15; 347/40; 347/43
(58) Field of Search .................................. 347/9, 10, 11, 347/12, 14, 15, 40, 41, 43

(56) References Cited

U.S. PATENT DOCUMENTS 4,739,415 * 4/1988 Toyono et al. ..................... 358/296
5,327,166 * 7/1994 Shimada ............................. 347/15

(List continued on next page.)

FOREIGN PATENT DOCUMENTS 0 516 366   12/1992   (EP) .
0 610 096   8/1994    (EP) .
0 622 239   11/1994   (EP) .
0 687 565   12/1995   (EP) .
WO 87/03363  6/1987   (WO) .

OTHER PUBLICATIONS

U.S. application No. 09/147,364, filed Dec. 8, 1998, pending, Docket No. 4947–0057–2 PCT*.
U.S. application No. 09/539,886, filed Mar. 31, 2000, pending, Docket No. 4947–0110–0.

*Primary Examiner*—N. Le
*Assistant Examiner*—Lamson D. Nguyen
(74) *Attorney, Agent, or Firm*—Oblon, Spivak, McClelland, Maier & Neustadt, P.C.

(57) ABSTRACT

The present invention prevents deterioration of the quality in interlace printing. The printing system of the present invention uses a head that regulates the amount of ink spouting from nozzles and forms dots of different diameters. While the diameter of dots formed in one primary scan is restricted to a fixed value, the system of the present invention enables dots of different diameters to coexist at an appropriate ratio, thereby improving the printing quality. The printing system of the present invention shifts a nozzle array, in which nozzles are arranged at intervals of a predetermined dot pitch, by a predetermined amount in the secondary scanning direction and varies the dot diameter on every primary scan, while controlling the nozzles in an overlapping state. This enables the dots of different diameters to coexist in a specified area. One preferable application carries out halftone processing under the conditions for dots of a certain diameter at the position where a dot of the certain diameter is formed. This application controls the ratio of dot formation to a desired level. For example, the probability of formation of small-diametral dots is increased in a low-density area. Another preferable application divides the nozzle array on a print head into two groups of nozzles, wherein each group of nozzles forms dots of a specified size. Appropriate selection of the nozzle pitch and the quantity of secondary scanning feed enables printing in which large-diametral dots and small-diametral dots coexist according to a predetermined rule.

36 Claims, 32 Drawing Sheets

U.S. PATENT DOCUMENTS

| | | | |
|---|---|---|---|
| 5,412,410 | 5/1995 | Rezanka | 347/15 |
| 5,488,398 * | 1/1996 | Matsubara et al. | 347/43 |
| 5,610,637 * | 3/1997 | Sekiya et al. | 347/10 |
| 5,712,666 * | 1/1998 | Matsubara et al. | 347/15 |
| 5,844,585 * | 12/1998 | Kurashima et al. | 347/43 |
| 5,992,972 * | 11/1999 | Nagoshi et al. | 347/43 |

* cited by examiner

Fig. 8A
ARRANGEMENT OF NOZZLE ARRAYS
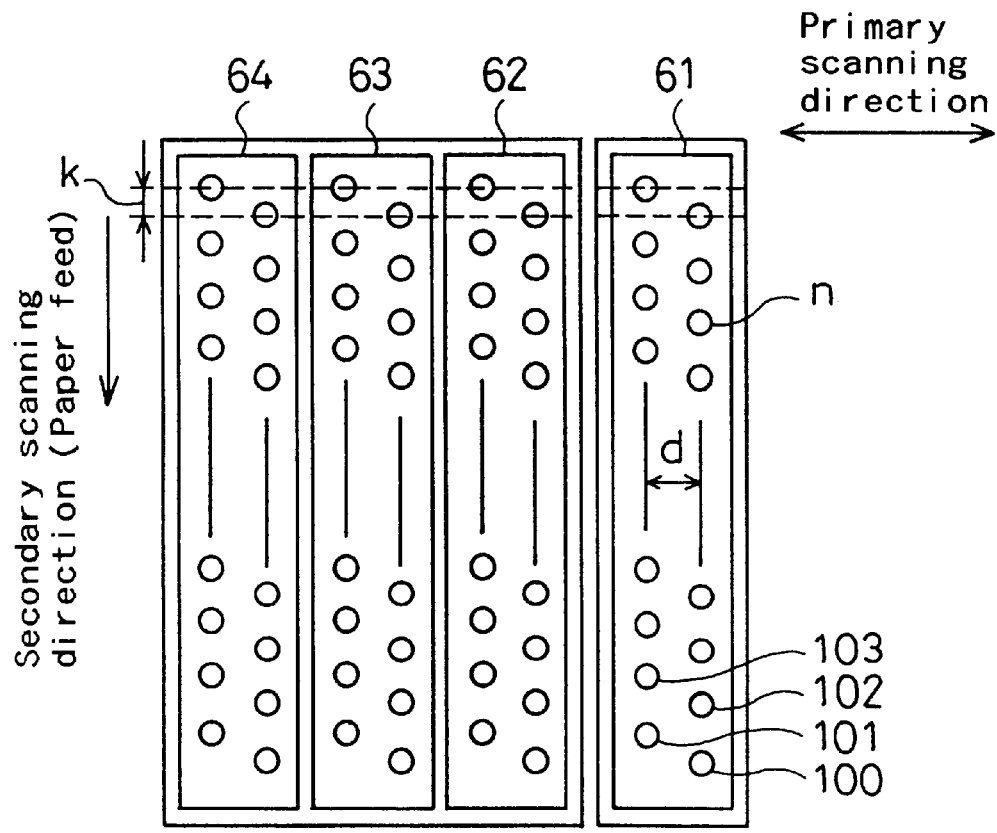
Fig. 8B DOTS FORMED BY ONE NOZZLE ARRAY
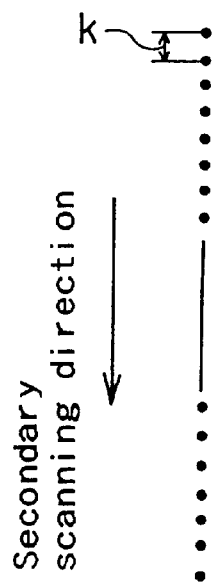

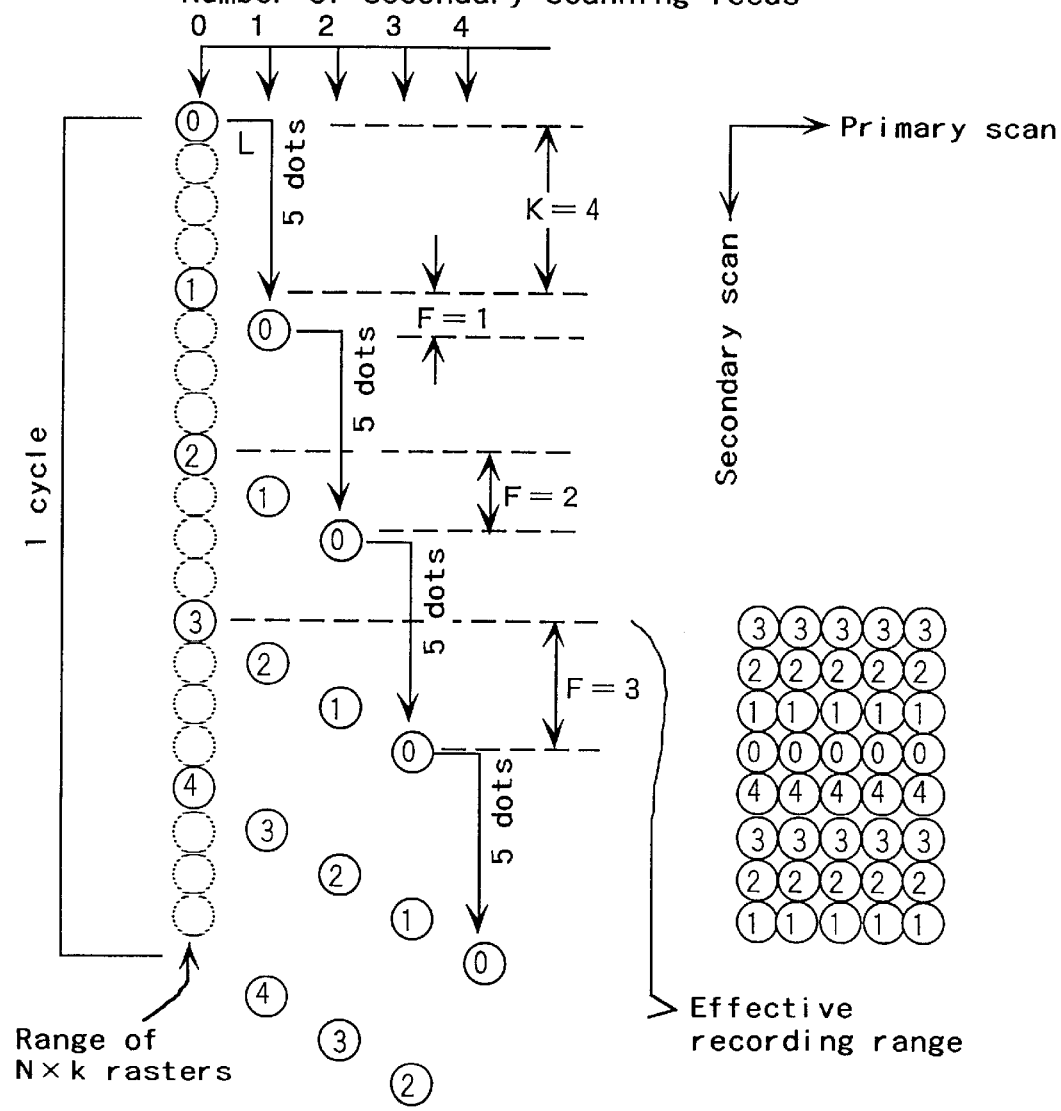
Fig. 9A CONCEPT OF SECONDARY SCANNING FEED
Fig. 9B PARAMETERS
Nozzle pitch k : 4 [dots]
Number of nozzles used N : 5
Number of repeats of scan s : 1
Number of effective nozzles Neff : 5
| Number of secondary scanning feeds | 0 | 1 | 2 | 3 | 4 |
|---|---|---|---|---|---|
| Quantity of feed L (dots) |  | 5 | 5 | 5 | 5 |
| $\Sigma L$ |  | 5 | 10 | 15 | 20 |
| $F = (\Sigma L) \% k$ | 0 | 1 | 2 | 3 | 0 |

In one cycle

First time
Second time
Third time
Fourth time
First time
Second time
Third time
Fourth time

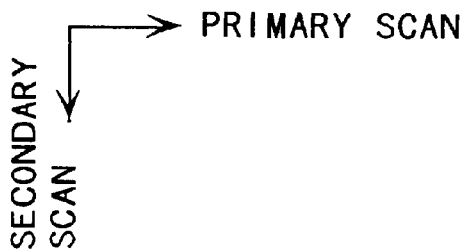
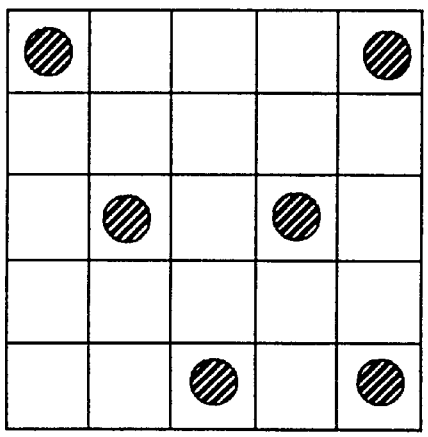
Fig. 15A
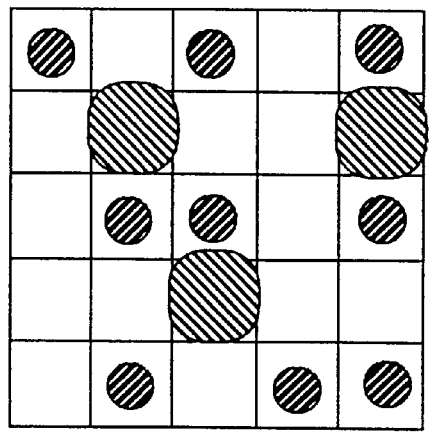
Fig. 15B
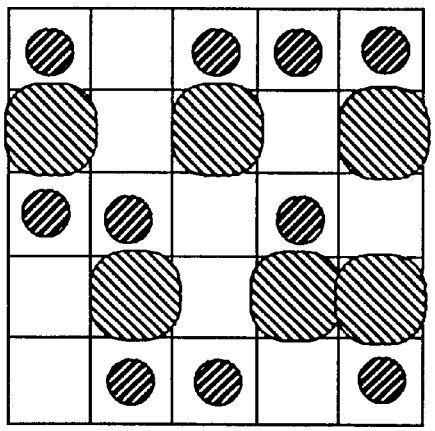
Fig. 15C
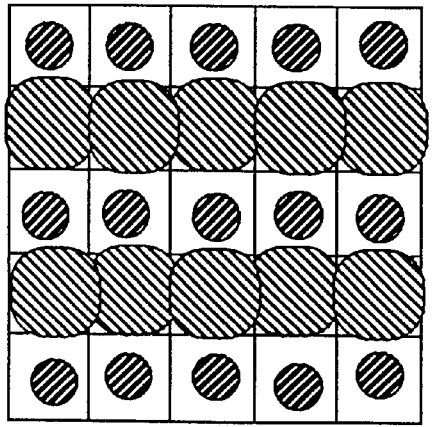
Fig. 15D CONCEPT OF SECONDARY SCANNING FEED (s=1)

Fig. 16B  PARAMETERS

Nozzle pitch k : 3 [dots]
Number of nozzles used N : 4
Number of repeats of scan s : 1
Number of effective nozzles Neff: 4

| Number of secondary scanning feeds | 0 | 1 | 2 | 3 |
|---|---|---|---|---|
| Quantity of feed L (dots) | 0 | 4 | 4 | 4 |
| ΣL | 0 | 4 | 8 | 12 |
| F = (ΣL) % k | 0 | 1 | 2 | 0 |

CONCEPT OF SECONDARY SCANNING FEED (S=2)

Fig. 17B   PARAMETERS

```
Nozzle pitch k                    : 3 [dots]
Number of nozzles used N          : 4
Number of repeats of scan s       : 2
Number of effective nozzles Neff  : 2
```

| Number of secondary scanning feeds | 0 | 1 | 2 | 3 | 4 | 5 | 6 |
|---|---|---|---|---|---|---|---|
| Quantity of feed L (dots) | 0 | 2 | 2 | 2 | 2 | 2 | 2 |
| ΣL | 0 | 2 | 4 | 6 | 8 | 10 | 12 |
| F = (ΣL) % k | 0 | 2 | 1 | 0 | 2 | 1 | 0 |

Fig. 19A CONCEPT OF SECONDARY SCANNING FEED
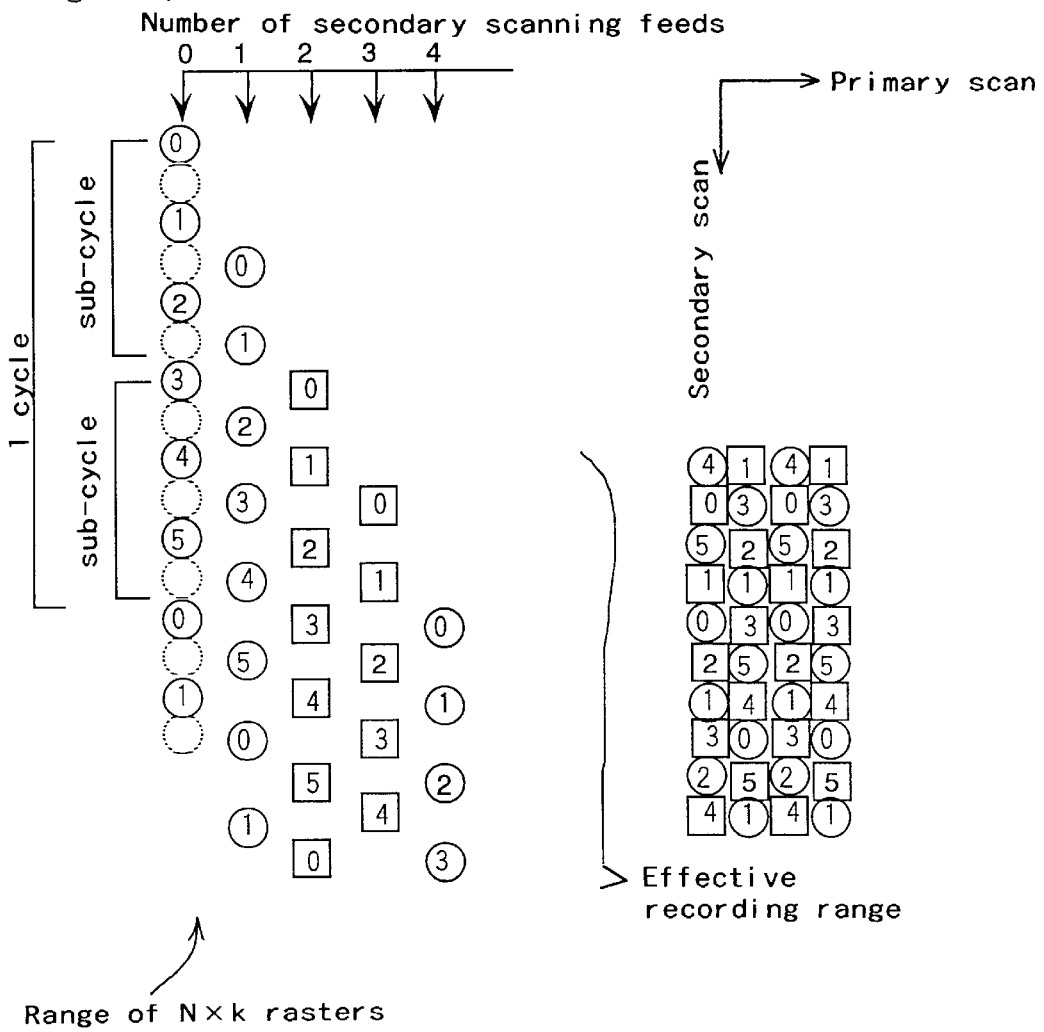
Fig. 19B PARAMETERS
Nozzle pitch k : 2 [dots]
Number of nozzles used N : 6
Number of repeats of scan s : 2
Number of effective nozzles Neff : 3
| Number of secondary scanning feeds | 0 | 1 | 2 | 3 | 4 |
|---|---|---|---|---|---|
| Quantity of feed L (dots) | 3 | 3 | 3 | 3 | |
| ΣL | 3 | 6 | 9 | 12 | |
| F = (ΣL) % k | 0 | 1 | 0 | 1 | 0 |

○ Secondary scan number 0
☐ Secondary scan number 1
◇ Secondary scan number 2
△ Secondary scan number 3

PRINTER SYSTEM, METHOD OF GENERATING IMAGE, AND RECORDING MEDIUM FOR REALIZING THE METHOD

BACKGROUND OF THE INVENTION

1. Field of the Invention

The present invention relates to a printing system, a method of generating an image, and a recording medium for realizing the method. More specifically the present invention pertains to a printing system that records at least two types of dots having different diameters on a printing object and generates a multi-tone image expressed by recording densities of the at least two types of dots. The present invention also pertains to a method of generating such an image and a recording medium on which programs for realizing this method are recorded.

2. Discussion of the Background

Color printers, in which a plurality of color inks are discharged from a head, are widely used as an output device of a computer that records a multi-color, multi-tone image processed by the computer. Several methods are applicable to print a multi-color, multi-tone image with three color inks, cyan, magenta, and yellow (CMY). One method is a technique adopted in the conventional printers. This technique expresses the tone of a printing image by the density of dots (frequency of appearance of dots per unit area) while fixing the size of dots formed on a sheet of paper by a spout of ink. Another method adjusts the diameter of dots formed on a sheet of paper, in order to vary the density of dots per unit area. Although the advanced processing of the head for forming ink particles has been improving the density of dots formable per predetermined length or the variable range of the dot diameter, the printers have only the limited printing density (resolution) to 300 through 720 dpi and the limited particle diameter to several ten microns. The resolution of printers is significantly lower than the resolution of silver photography, which has reached several thousand dpi on the film.

In ink jet printers, dots recorded on the sheet of paper may be conspicuous at some printing densities. Further reduction of the dot diameter is accordingly required to improve the printing quality. An increase in number of dot-forming elements per color disposed on a print head is also required to improve the printing speed. By way of example, in an ink jet printer having a print head reciprocating relative to the sheet of paper, one proposed technique increases the number of nozzles per color and thereby the number of dots recorded by one feed along the width of the sheet (this feeding direction is hereinafter referred to as the primary scanning direction), in order to raise the printing speed. In this case, a large number of dot-forming elements (ink nozzles) are arranged in a direction perpendicular to the feeding direction of the print head (this direction is hereinafter referred to as the secondary scanning direction).

The increase in number of the dot-forming elements requires increasing the number of driving circuits. In one conventional ink jet printer that forms dots by spout of ink, electricity is supplied to piezoelectric elements that are used as driving elements for spouting ink from nozzles. This mechanism requires a number of piezoelectric elements and driving circuits corresponding to the number of nozzles. For example, 64 piezoelectric elements are required in the case of 64 nozzles. In the printer that carries out printing with four color inks, the total of 64×4=256 piezoelectric elements and driving circuits are required. A conventional printing system outputs a signal that determines the on/off condition of each piezoelectric element via an interface circuit IF and generates a timing pulse (dot clock) Sd for supplying electricity to all the 64 piezoelectric elements at each feeding position of the print head, that is, at the printing position, so as to determine formation or non-formation of a dot at the position. Using the driving elements having sufficiently high response like the piezoelectric elements can narrow the pulse width of this dot clock Sd and thereby vary the diameter of dots. It is not required to drive a plurality of dot-forming elements for the respective colors simultaneously. A common signal line can thus be used to output signals from the CPU to the piezoelectric elements on the respective color heads. This simplifies the circuit structure.

In the conventional printing system, the time of supply of electricity to the driving elements, such as piezoelectric elements, depends upon the pulse width of the dot clock Sd. The conventional printing system thus can not form dots of a desired size, for example, large-diametral dots or small-diametral dots, at desired positions in the course of image processing. This causes the poor matching with the desired image processing. The prior art circuit provides two types of dot clocks Sd and selects one of the dot clocks Sd based on the instruction from the CPU. This enables the diameter of dots formed in one primary scan of the print head to be switched between two levels, but equalizes the diameter of ink particles spouted from a plurality of nozzles, that is, the size of dots formed in the primary scan. The requirement on image processing is generally different at the respective dot-forming positions (pixels) corresponding to the plurality of nozzles. This may result in formation of a small-diametral dot at the position where a large-diametral dot is required by the image processing. The conventional structure that can vary the dot diameter thus does not sufficiently exert its effects.

Another possible technique narrows the pulse width of the dot clock Sd and records an image with only small-diametral dots. This technique, however, requires formation of a large number of dots in printing a high-density area and consumes an undesirably long time for printing. The problem is solved by providing circuits for independently driving the respective dot-forming driving elements and varying the dot diameter by every dot. This structure that varies the dot clock Sd independently on every driving element, however, makes the circuit structure and the driving operation extremely complicated.

These problems also arise in the printer that carries out interlace printing. The following describes the outline of interlace printing and its problems. In an ink jet printer with a print head having a plurality of nozzles arranged in the feeding direction of the sheet of paper, the scattered characteristics of individual nozzles and the non-uniform pitch between a plurality of nozzles deteriorate the picture quality of an image printed on a printing medium. The known printing technique to prevent the deterioration of picture quality forms dots on adjoining lines with different nozzles. This is the technique called interlace printing system.

In the interlace printing system, the pitch of nozzles arranged in the secondary scanning direction on a nozzle array of a print head is set to be an integral multiple of the dot pitch corresponding to the printing resolution. In one example, N nozzles are arranged in the secondary scanning direction on the nozzle array, n nozzles out of the N nozzles arranged on the nozzle array are actually driven, and the interval between the nozzles on the nozzle array is set equal to a k-dot pitch. The nozzle pitch k should be a positive integer that is relatively prime to the value n. The print head is relatively fed in the secondary scanning direction by a fixed distance corresponding to the n-dot pitch after every run of the nozzle array on the primary scanning path. The relative feed in the secondary scanning direction is generally realized by feeding the sheet of paper.

In the interlace printing system, adjoining lines in the secondary scanning direction are printed by different nozzles. Even when there are scatters in the characteristics of the respective nozzles and the nozzle pitch, this structure prevents the deterioration of the picture quality of a printing image due to the scatters and thereby gives a high-quality printing image. In the interlace printing system, however, formation of the large-diametral dots and formation of the small-diametral dots are switched only on every path. This system can thus not form dots of a desired size at desired position and causes the poor matching with the desired image processing.

SUMMARY OF THE INVENTION

One object of the present invention is thus to enhance the matching with the image processing and improve the quality of a printing image in the restricted structure that can form only the dots of a specific diameter at specific positions.

Another object of the present invention is to improve the technique of printing an image on a printing medium while feeding a head both in the primary scanning direction and in the secondary scanning direction relative to the printing medium, especially in an ink jet printer.

At least part of the above and the other related objects is realized by a printing system for recording at least two types of dots having different diameters on a printing object and thereby generating a multi-tone image expressed by recording densities of the at least two types of dots. The printing system includes: a head which records a larger-diametral dot out of the at least two types of dots having different diameters at a first position that is determined according to a relative position to the printing object, and records a smaller-diametral dot out of the at least two types of dots at a second position that is different from the first position: a position specification unit which determines whether the head exists at the first position or at the second position, based on the relative position to the printing object; an input unit which inputs image data including density information of a target image to be printed: and a multi-valuing unit which carries out a multi-valuing operation corresponding to a number of tones expressible by the at least two types of dots based on the input image data, while changing a condition for formation of a dot according to a type of the dot to be printed at the position of the head specified by the position specification unit.

The present invention is also directed to a method of generating an image realized in this printing system. The method records at least two types of dots having different diameters on a printing object by driving a head and thereby generates a multi-tone image expressed by recording densities of the at least two types of dots, wherein the head records a larger-diametral dot out of the at least two types of dots having different diameters at a first position that is determined according to a relative position to the printing object and records a smaller-diametral dot out of the at least two types of dots at a second position that is different from the first position. The method includes the steps of:

inputting image data including density information of a target image to be printed;

determining whether the head exists at the first position or at the second position, based on the relative position to the printing object; and carrying out a multi-valuing operation corresponding to a number of tones expressible by the at least two types of dots based on the input image data, while changing a condition for formation of a dot according to a type of the dot to be printed at the position of the head thus determined.

The printing system or the corresponding image generating method of the present invention determines the position of the head that can form at least two types of dots having different diameters, changes the condition for formation of a dot according to the type of the dot to be printed at the position of the head, and carries out the multi-valuing operation corresponding to the number of tones expressible by the at least two types of dots based on the input image data. At the position where a larger-diametral dot is to be formed, the image processing is carried out corresponding to the determination of whether or not a larger-diametral dot is formed. In a similar manner, at the position where a smaller-diametral dot is to be formed, the image processing is carried out corresponding to the determination of whether or not a smaller-diametral dot is formed. This structure enables the positions of formation of at least two types of dots having different diameters to have the fair matching with the image processing. Even in the printing system with a head that can form only dots of a predetermined diameter at specific positions, the adequate image processing is compatible with the restriction of the dot diameter.

In accordance with one preferable structure of the printing system or the corresponding image generating method of the present invention, the head repeats a primary scan and a secondary scan relative to the printing object, so as to record a two-dimensional image, the head having a plurality of dot-forming elements, which are arranged in a secondary scanning direction and forms the at least two types of dots, and forming one type of a dot out of the at least two types of dots on every primary scan. This structure enables the dot diameter to be varied according to the head position. In this case, one preferable application further causes a quantity of feed of the head in the secondary scanning direction after completion of every primary scan to be different from a pitch between the plurality of dot-forming elements, so as to form dots on the printing object through a plurality of the primary scans at a pitch narrower than the pitch between the plurality of dot-forming elements.

The multi-valuing unit may carry out the multi-valuing operation to form a specified type of a dot based on the input image data on every primary scan in which the head forms one type of a dot. Even when one primary scan forms only one type of dots having an identical diameter, this structure enables at least two types of dots having different diameters to be formed as a whole.

One possible application of the multi-valuing operation varies a threshold value, which is the condition for formation of a dot and used to determine whether a dot is to be formed or not, according to the type of the dot to be printed at the position of the head specified by the position specification unit. Varying the threshold value changes the probability of formation of a dot having the corresponding diameter at every position. Namely this structure changes the frequency of formation of dots according to the position and satisfies the requirement on the image processing.

In one possible structure, a greater value is set to the threshold value for the larger-diametral dot, whereas a smaller value is set to the threshold value for the smaller-diametral dot. This varies the frequency of formation of dots of a desired diameter.

In another possible structure, a smaller value may be set to the threshold value for the smaller-diametral dot when the input image data has a lower density. In this case, the probability of formation of the smaller-diametral dot is increased in the lower-density area of an original image. In still another possible structure, a smaller value may be set to the threshold value for the larger-diametral dot in an area where density of the input image data is higher than a predetermined level. In this case, the probability of formation of the larger-diametral dot is increased in the area having the density higher than a predetermined level. This effectively reduces the streak-like unevenness.

Another possible application of the multi-valuing operation varies an evaluation value, which is the condition for formation of a dot and used to evaluate a recording density realized by a dot, according to the type of the dot to be printed at the position of the head specified by the position specification unit. This structure sets the evaluation value according to the dot to be formed and does not cause the poor matching with the image processing.

In case that the multi-valuing operation is binarization, a smaller value is set to the evaluation value for the larger-diametral dot, whereas a greater value is set to the evaluation value for the smaller-diametral dot. This is because the density realized on every dot is proportional to the diameter of the dot as long as the density of ink is fixed.

A variety of processes, such as the error diffusion method and the dither method, may be applied to the multi-valuing operation. The multi-valuing operation called the error diffusion method or the least mean error method diffuses a quantization error of an image density caused by the multi-valuing operation with respect to a target pixel to peripheral pixels in the vicinity of the target pixel, corrects the input image data with a summation of the quantization errors diffused by the error diffusion unit, and carries out the multi-valuing operation based on the corrected image data. This method requires a relatively large quantity of computation, but makes the mean density close to that of the original image, thereby improving the quality of the resulting image.

The printing system may realize the dual-direction printing. In this case, the head reciprocates along a width of the printing object to form the at least two types of dots. The head forms at least one type of a dot out of the at least two types of dots only during a shift in one direction. The dot formed only during a shift of one direction may be the larger-diametral dot. This structure keeps the positional accuracy for the larger-diametral dot equivalent to the single-way printing, thereby improving the printing speed without deteriorating the printing quality.

The head may have a mechanism for discharging ink particles under a pressure applied to each ink running through an ink conduit by application of a voltage to a piezoelectric element arranged in the ink conduit. In another example, the head may have a mechanism for discharging ink particles under a pressure applied to each ink running through an ink conduit by air bubbles that are produced by a supply of electricity to a heating body arranged in the ink conduit.

In case that the computer executes the image processing, programs for realizing the above image generating method are recorded on a recording medium. The present invention is thus directed to a recording medium mechanically readable by a computer for controlling a head which records a larger-diametral dot out of the at least two types of dots having different diameters at a first position that is determined according to a relative position to the printing object and records a smaller-diametral dot out of the at least two types of dots at a second position that is different from the first position. The recording medium includes program code means recorded thereon, wherein the program code means includes: a first program code which causes a computer to determine whether the head exists at the first position or at the second position, based on the relative position to the printing object; and a second program code which causes the computer to carry out a multi-valuing operation corresponding to a number of tones expressible by the at least two types of dots based on input image data, while changing a condition for formation of a dot according to a type of the dot to be printed at the position of the head thus determined.

The computer reads the programs recorded on the recording medium and executes the input programs to realize the image generating method discussed above. The computer executing these programs functions as a printing machine.

Typical examples of the recording medium include ROMs, RAMs, flexible disks, CD-ROMs, memory cards, magneto-optic discs, paper with bar codes recorded thereon, and punched cards according to a predetermined coding system. The program for determining formation or non-formation of a dot is recorded on the recording medium. In case that the program for controlling spout of ink from the head according to the determination of dot formation is included in a printer or a computer as the firmware, it is not required to record the program for controlling the head on the recording medium. In case that the computer or the printer does not have such firmware or the program corresponding to this processing is required separately, the program for outputting signals to control spout of ink from the head according to the determination of dot formation may be recorded on the recording medium. These programs may be recorded together on the same recording medium or separately on a plurality of recording media. The programs may be coded or compressed according to the requirements.

In the printing system of the present invention, the head may have a nozzle array with a plurality of nozzles arranged thereon. The head is fed in the direction of the width of the printing object, such as a sheet of paper, and is shifted relatively in the direction perpendicular to the width after completion of every feed. A specified area is filled with dots by repeating this feed and shift operations of the head. The pitch of the plurality of nozzles on the head and the quantity of feed may have a predetermined relationship, so that at least two nozzles exist to form dots in a specified area and causes the specified area to be filled with dots through a plurality of shifts of the head. Adequately setting the relationship between the pitch of the nozzles and the quantity of feed enables dots of different diameters to be formed at a desired ratio in the specified area.

In accordance with one preferable application, the head has a dot-formation array in which a given number of dot-forming elements for forming dots are arranged at an interval of a predetermined pitch in the secondary scanning direction perpendicular to a primary scanning direction, the dot-forming elements included in the dot-formation array being driven simultaneously at a predetermined position in the primary scanning direction.

In the printing system of this preferable structure, the dot-forming elements included in the dot-formation array are nozzles for spouting ink particles, and the given number of dot-forming elements included in the dot-formation array are divided into two groups of dot-forming elements. Each group includes N nozzles, where N denotes an integer of not less than 2, which are arranged in the secondary scanning direction at a nozzle interval of k dots, where k denotes an integer of not less than 2. The two groups of dot-forming elements are apart from each other by the nozzle interval of k dots. This nozzle arrangement realizes interlace printing in the printing system that forms dots with ink particles. This structure causes the positions of formation of at least two types of dots having different diameters to have the fair matching with the image processing, while keeping the advantage of the interlace printing. Even in the printing system with a head that can form only dots of a predetermined diameter at specific positions, the adequate image processing is compatible with the restriction of the dot diameter. This arrangement further has the anti-banding effect of the interlace printing system.

One preferable application of this structure drives the head and the scanning control unit to repeat a step of repeating a first path k times and subsequently repeating a second path k times, wherein the first path carries out the secondary scan after printing a first-sized dot out of the at least two types of dots having different diameters, and the second path carries out the secondary scan after printing a second-sized dot, which is different in size from the first-sized dot.

Another preferable application of this structure drives the head and the scanning control unit to repeat a step of repeating a first path k times and subsequently repeating a second path k times when the nozzle interval k is an even value, wherein the first path carries out the secondary scan after printing a first-sized dot out of the at least two types of dots having different diameters, and the second path carries out the secondary scan after printing a second-sized dot, which is different in size from the first-sized dot.

Still another preferable application of this structure drives the head and the scanning control unit to alternately repeat a first path and a second path when the nozzle interval k is an odd value, wherein the first path feeds the printing object after printing a first-sized dot out of the at least two types of dots having different diameters, and the second path feeds the printing object after printing a second-sized dot, which is different in size from the first-sized dot.

In accordance with one possible structure, when a number of nozzles n are used for printing among N nozzles included in the head, where n is a positive integer of not greater than N, k and n are relatively prime. This facilitates formation of dots by the interlace printing system. In this case, the quantity of feed of the printing object may be n dots.

In the interlace printing system, the first-sized dot may be smaller than the second-sized dot.

In accordance with another preferable application, the dot-forming elements included in the dot-formation array are nozzles for spouting ink particles, and the given number of dot-forming elements included in the dot-formation array are divided into an even nozzle group and an odd nozzle group. Each group includes N nozzles, where N denotes a positive integer, which are arranged in the secondary scanning direction at a nozzle interval of 2k dot pitch, where k denotes a positive integer. Each nozzle in the even nozzle group and an adjoining nozzle in the odd nozzle group is arranged at a fixed interval of k dots. This structure also realizes formation of dots by interlace printing.

One preferable application of this structure drives the head and the scanning control unit to repeat a step of repeating a first path k times and subsequently repeating a second path k times, wherein the first path feeds the printing object after printing a first-sized dot out of the at least two types of dots having different diameters, and the second path feeds the printing object after printing a second-sized dot, which is different in size from the first-sized dot.

Another preferable application of this structure drives the head and the scanning control unit to repeat a step of repeating a first path k times and subsequently repeating a second path k times when the nozzle interval k is an even value, wherein the first path feeds the printing object after printing a first-sized dot out of the at least two types of dots having different diameters, and the second path feeds the printing object after printing a second-sized dot, which is different in size from the first-sized dot.

Still another preferable application of this structure drives the head and the scanning control unit to alternately repeat a first path and a second path when the nozzle interval k is an odd value, wherein the first path feeds the printing object after printing a first-sized dot out of the at least two types of dots having different diameters, and the second path feeds the printing object after printing a second-sized dot, which is different in size from the first-sized dot.

In accordance with one possible structure, when a number of nozzles n are used for printing among N nozzles included in the head, where n is a positive integer of not greater than N, 2k and n are relatively prime. This facilitates formation of dots by the interlace printing system. In this case, the quantity of feed of the printing object may be n dots.

In the interlace printing system, the first-sized dot may be smaller than the second-sized dot.

The present invention also includes some other applications. The first application is a structure, in which one or related ones of the position specification unit, the input unit, and the multi-valuing unit are not included in the casing of the printing system but in an apparatus for outputting images to be printed. These units may be realized by discrete circuits or alternatively by the software in an arithmetic and logic circuit including a CPU. In the latter case, the apparatus for outputting images to be printed, such as a computer, carries out the processing related to generation of dots. Only a mechanism for regulating discharge of inks from the head to actually form the generated dots, for example, on a sheet of paper, is disposed in the casing of the printing system. Another possible structure divides these required units into two groups, and enables one group to be realized in the casing of the printing system and the other group to be realized in the apparatus for outputting images. The position specification unit generally detects the actual head position, but may alternatively detect the virtual head position in case that the image processing regarding dot arrangement is carried out in the computer. In this case, prior to the operation of actually driving the head in the printing system, the dot arrangement has been completed corresponding to the driving position of the head. The dot arrangement and the actual driving of the head may be carried out simultaneously or in parallel with a delay of predetermined dots or predetermined lines.

The second application is a program supply apparatus for supplying the program, which realizes the image generating method of the present invention on the computer, via a communications line.

The third application is a print recorded by the image generating method of the present invention. The print has an image generated by the method of recording at least two types of dots having different diameters on a printing object by driving a head and thereby generating a multi-tone image expressed by recording densities of the at least two types of dots, wherein the head records a larger-diametral dot out of the at least two types of dots having different diameters at a first position that is determined according to a relative position to the printing object and records a smaller-diametral dot out of the at least two types of dots at a second position that is different from the first position. The print is obtained by inputting image data including density information of a target image to be printed, determining whether the head exists at the first position or at the second position, based on the relative position to the printing object, and carrying out a multi-valuing operation corresponding to a number of tones expressible by the at least two types of dots based on the input image data, while changing a condition for formation of a dot according to a type of the dot to be printed at the position of the head thus determined.

Analysis of the state of recording the dots on such a print by the dot unit shows that the probability of formation of a specific dot at a specific position is enhanced in the multi-tone image consisting of at least two types of dots having different diameters. The print printed by the printing system of the present invention is also one application of the present invention.

The dots of different diameters coexist in a variety of patterns. For example, the dots formed in a specific area have an identical diameter in the primary scanning direction or in the secondary scanning direction of the head. In another example, the dots of different diameters may be arranged in zigzag in a specific area.

These and other objects, features, aspects, and advantages of the present invention will become more apparent from the following detailed description of the preferred embodiments with the accompanying drawings.

BRIEF DESCRIPTION OF THE DRAWINGS

FIG. 8A shows structure of a nozzle array in the first embodiment;

FIG. 8B shows dots formed by the nozzle array;

FIGS. 9A and 9B show the concept of feeding the head in the first embodiment;

FIGS. 15A through 15D illustrate dots formed according to tone data in the first embodiment;

FIGS. 16A and 16B show a modification of the structure of feeding the head in the first embodiment;

FIGS. 17A and 17B show the concept of feeding the head as a second embodiment according to the present invention;

FIGS. 19A and 19B show the concept of feeding the head as a third embodiment according to the present invention;

DETAILED DESCRIPTION OF THE PREFERRED EMBODIMENTS

A. Structure of Apparatus

Figure 1:
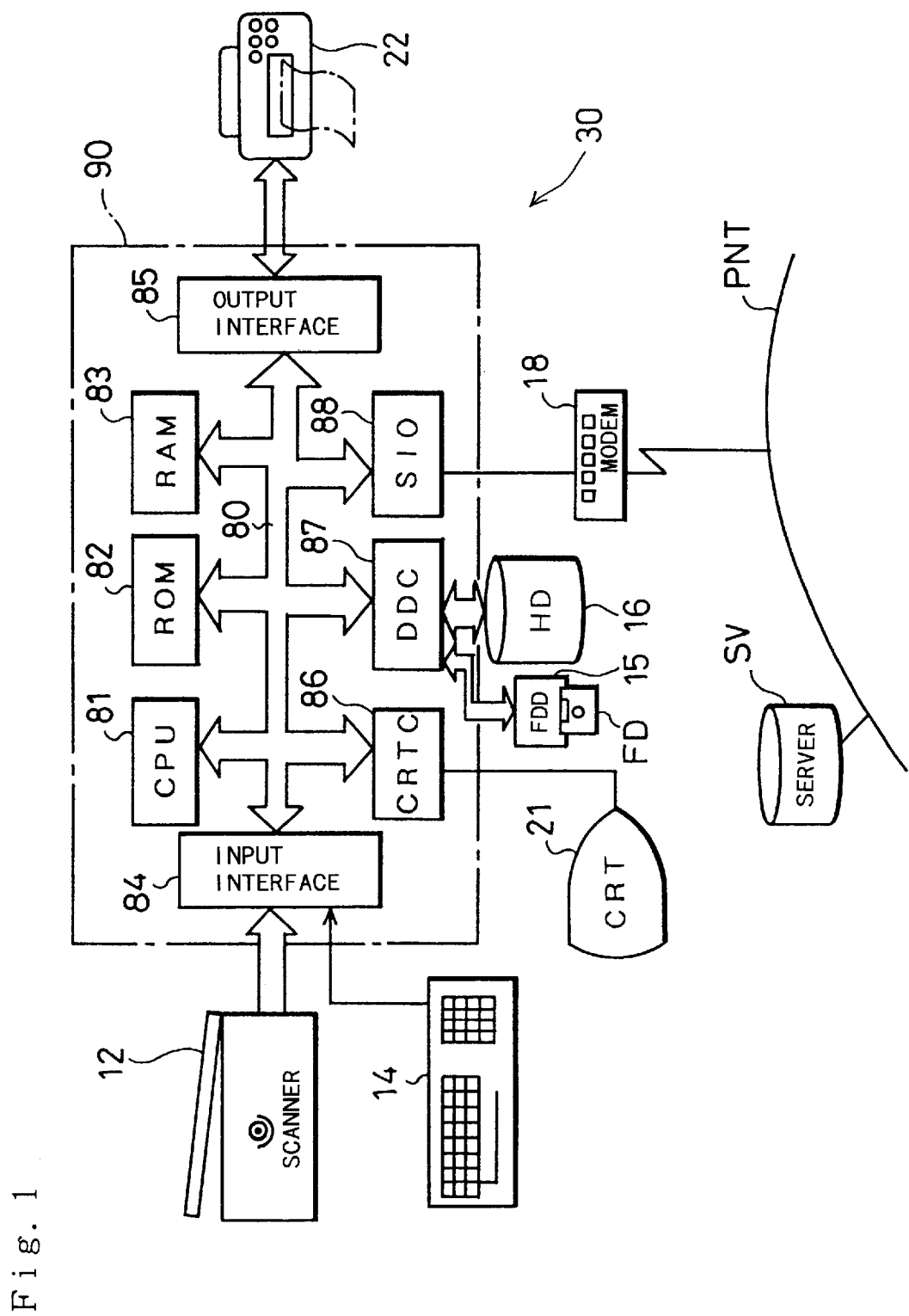
FIG. 1 is a block diagram illustrating structure of a printing system as a first embodiment according to the present invention.

Some modes of carrying out the present invention are described as preferred embodiments with the accompanying drawings. FIG. 1 is a block diagram illustrating structure of an image processing apparatus 30 including a printing system as a first embodiment according to the present invention. As illustrated in FIG. 1, the image processing apparatus 30 includes a computer 90, to which a scanner 12 and a color printer 22 are connected. The computer 90 executes predetermined programs loaded therein, so as to realize the image processing apparatus 30 including the printing system. The computer 90 includes a CPU 81 for executing a variety of arithmetic and logic operations according to programs in order to control the actions related to image processing, and other peripheral units mutually connected to one another via a bus 80. A ROM 82 stores programs and data required for execution of the variety of arithmetic and logic operations by the CPU 81. A RAM 83 is a memory, which various programs and data required for execution of the variety of arithmetic and logic operations by the CPU 81 are temporarily read from and written in. An input interface 84 receives input signals from the scanner 12 and a keyboard 14, whereas an output interface 85 sends output data to the printer 22. A CRTC 86 controls signal outputs to a CRT 21 that can display color images. A disk controller (DDC) 87 controls transmission of data from and to a hard disk 16, a flexible drive 15, and a CD-ROM drive (not shown). The hard disk 16 stores a variety of programs that are loaded into the RAM 83 and executed, as well as other programs that are supplied in the form of device drivers. A serial input-output interface (SIO) 88 is also connected to the bus 80. The SIO 88 is connected to a public telephone network PNT via a modem 18. The image processing apparatus 30 is connected with an external network via the SIO 88 and the modem 18, and can access a specific server SV in order to download the programs required for image processing into the hard disk 16. The computer 90 may alternatively execute the required programs loaded from a flexible disk FD or a CD-ROM.

Figure 2:
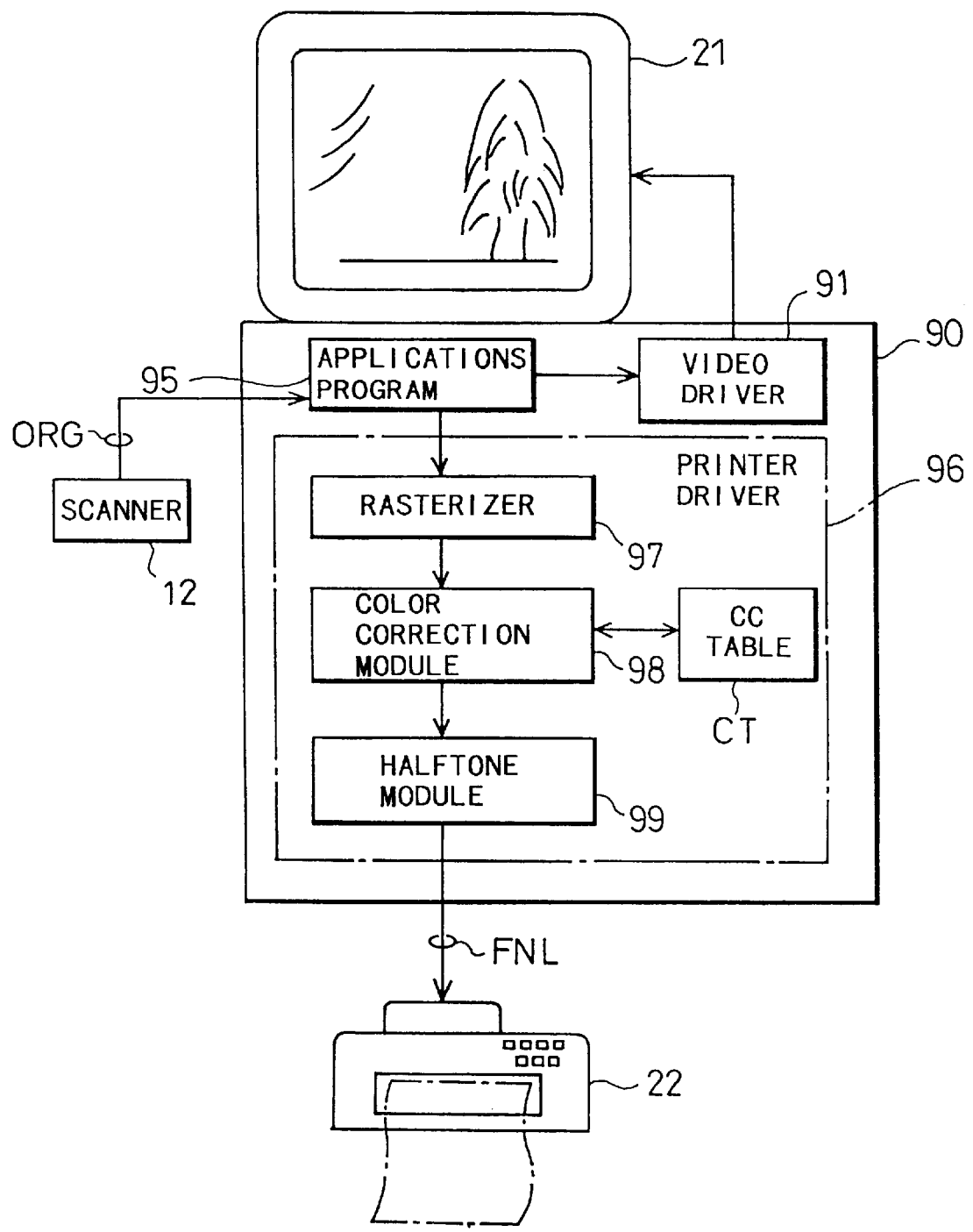
FIG. 2 shows structure of a printer driver realized in a computer 90 of the first embodiment.

On a supply of power, predetermined programs and data are read from a boot block of the hard disk 16, so that an operating system and required drivers, such as a printer driver, are incorporated into the computer 90. FIG. 2 is a block diagram conceptually illustrating the functions of a printer driver 96 and other elements incorporated in the computer 90.

In the computer 90, an applications program 95 is activated to output an image to the printer 22. The printer driver 96 processes the input image data and enables final color image data FNL to be output to the printer 22. The applications program 95 used to, for example, retouch an image, reads an image from the scanner 12 and causes the input image to be subjected to predetermined processing, while displaying the image on the CRT display 21 via a video driver 91. When the applications program 95 outputs a printing instruction, the printer driver 96 in the computer 90 receives image information from the applications program 95 and converts the input image information to signals printable by the printer 22 (binarized signals for the respective colors C, M, Y, and K). In the example of FIG. 2, the printer driver 96 includes a rasterizer 97 for converting the color image data processed by the applications program 95 to dot-based image data, a color correction module 98 for causing the dot-based image data to be subjected to color correction according to the ink colors C, M, and Y used by the printer 22 and the colorimetric characteristics of the printer 22, a color correction table CT referred to by the color correction module 98, and a halftone module 99 for generating halftone image data, which express the density in a specific area by the existence or non-existence of ink in each dot unit, from the color-corrected image data.

Figure 3:
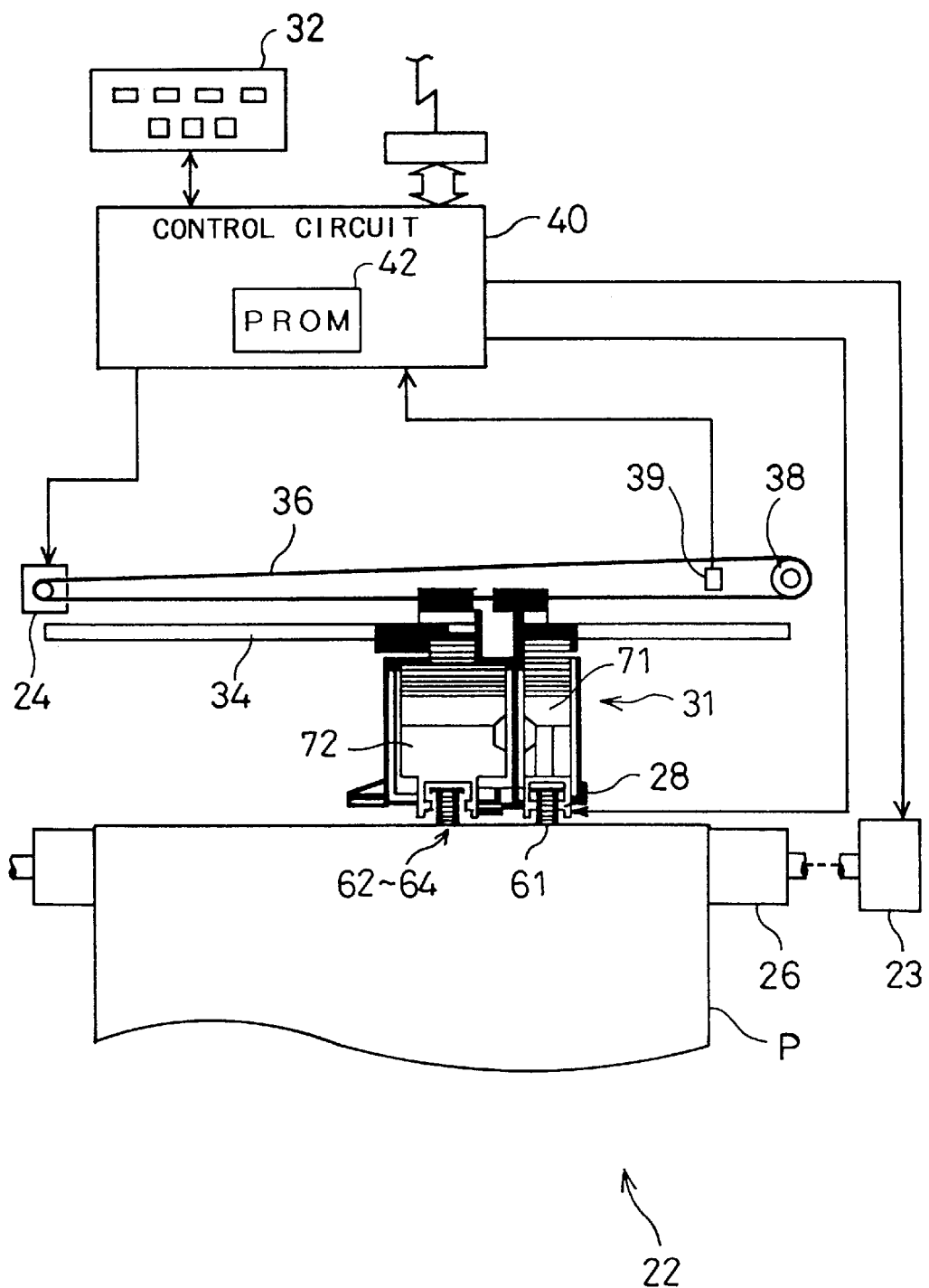
FIG. 3 schematically illustrates internal structure of a printer 22.

FIG. 3 schematically illustrates structure of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and formation of dots, and a control circuit 40 for transmitting signals to and from the sheet feed motor 23, the carriage motor 24, the print head 28, and a control panel 32.

A black ink cartridge 71 and a color ink cartridge 72 for storing three color inks, that is, cyan, magenta, and yellow, may be mounted on the carriage 31 of the printer 22. Four ink discharge heads 61 through 64 are formed on the print head 28 that is disposed in the lower portion of the carriage 31, and ink supply conduits 65 (see FIG. 4) are formed in the bottom portion of the carriage 31 for leading supplies of ink from ink tanks to the respective ink discharge heads 61 through 64. When the black ink cartridge 71 and the color ink cartridge 72 are attached downward to the carriage 31, the ink supply conduits 65 are inserted into connection apertures (not shown) formed in the respective cartridges. This enables supplies of ink to be fed from the respective ink cartridges to the ink discharge heads 61 through 64.

Figure 4:
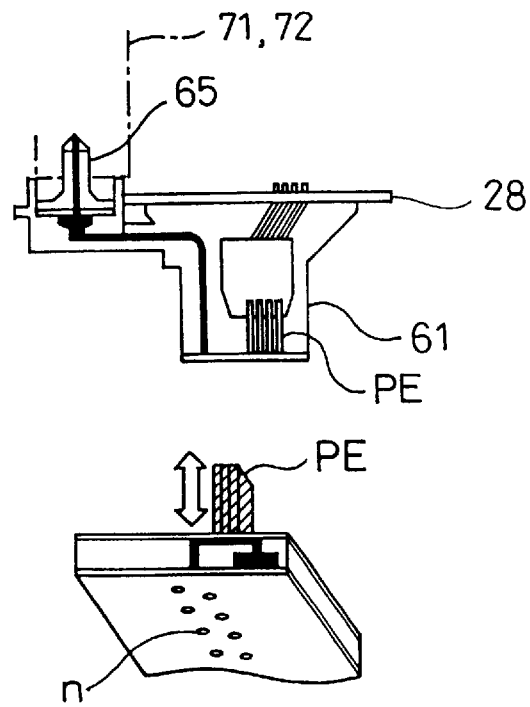
FIG. 4 shows structure of a head 61 in the printer 22.

The following briefly describes the mechanism of discharging ink. When the ink cartridges 71 and 72 are attached to the carriage 31, supplies of ink in the ink cartridges 71 and 72 are sucked out by capillarity through the ink supply conduits 65 and are led to the ink discharge heads 61 through 64 formed in the print head 28 arranged in the lower portion of the carriage 31 as shown in FIG. 4. In case that the ink cartridges 71 and 72 are attached to the carriage 31 for the first time, a pump works to suck first supplies of ink into the respective ink discharge heads 61 through 64. In this embodiment, structures of the pump for suction and a cap for covering the print head 28 during the suction are not illustrated nor described specifically.

Figure 5:
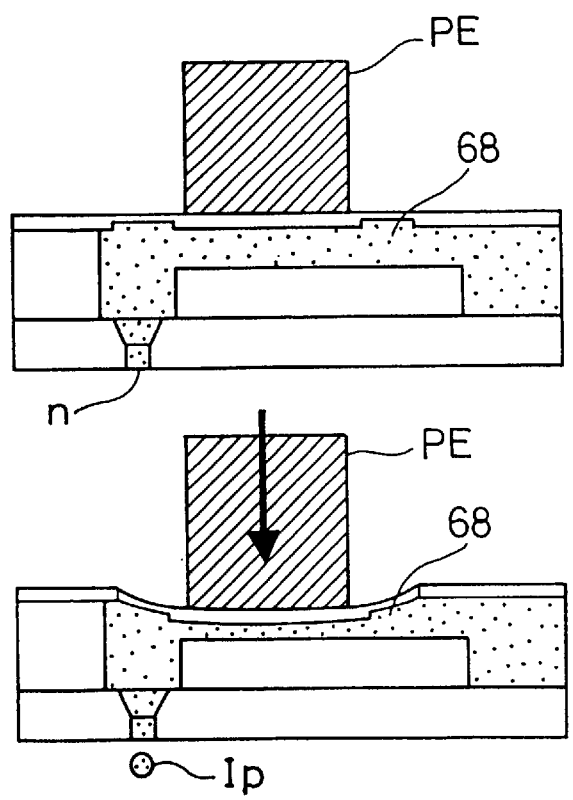
FIG. 5 shows the principle of spouting ink with a piezo-electric element PE.

An array of thirty-two nozzles 'n' is formed in each of the ink discharge heads 61 through 64 as shown in FIG. 4. A piezoelectric element PE, which has an excellent response and is one of electrically distorting elements, is arranged for each nozzle 'n'. FIG. 5 illustrates a configuration of the piezoelectric element PE and the nozzle 'n'. The piezoelectric element PE is disposed at a position that comes into contact with an ink conduit 68 for leading ink to the nozzle 'n'. As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 68 as shown in the lower drawing of FIG. 5. The volume of the ink conduit 68 is reduced with an extension of the piezoelectric element PE, and a certain amount of ink corresponding to the reduced volume is sprayed as ink particles Ip from the ends of the nozzle 'n' at a high speed. The ink particles Ip soak into the sheet of paper P set on the platen 26, so as to carry out printing.

In the printer 22 of the embodiment having the hardware structure discussed above, while the sheet feed motor 23 rotates the platen 26 and the other related rollers to feed the sheet of paper P, the carriage motor 24 drives and reciprocates the carriage 31, simultaneously with actuation of the piezoelectric elements PE on the respective ink discharge heads 61 through 64 of the print head 28. The printer 22 accordingly sprays the respective color ink sand forms a multi-color image on the sheet of paper P. Concrete arrangements of the nozzles in the respective ink discharge heads 61 through 64 will be discussed later.

The mechanism for feeding the sheet of paper P has a gear train (not shown) for transmitting rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 for detecting the position of the origin of the carriage 31.

Figure 6:
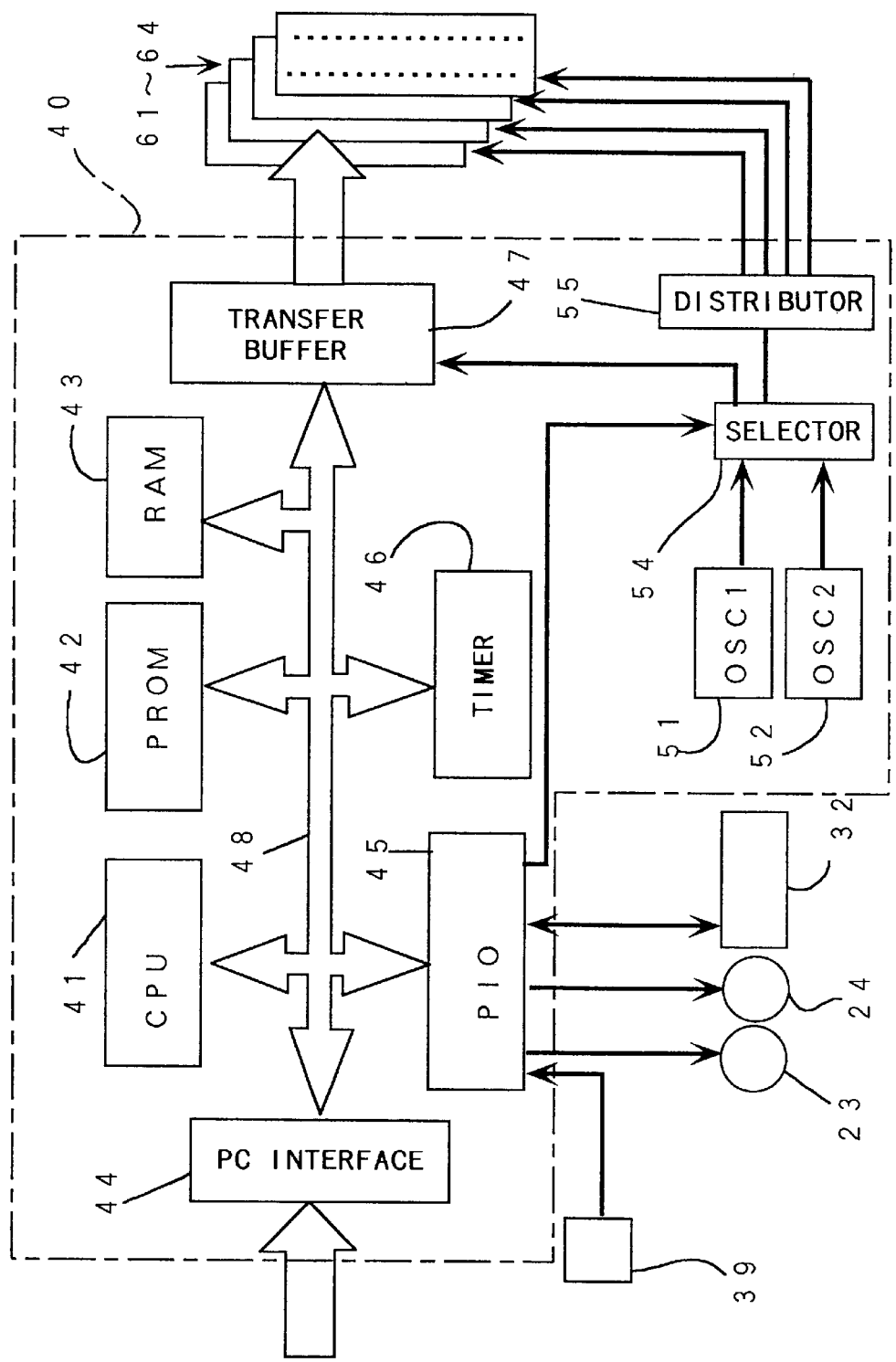
FIG. 6 is a block diagram illustrating internal structure of a control circuit 40.

As shown in FIG. 6, the control circuit 40 includes a CPU 41, a PROM (programmable ROM) 42, a RAM 43, a PC interface 44 for data transmission from and to the computer 90, a peripheral input/output unit (PIO) 45 for transmission of signals from and to the motors 23 and 24 and the control panel 32, a timer 46 for counting the time, and a transfer buffer 47 for outputting dot on/off signals to the respective ink discharge heads 61 through 64. These elements and circuits are mutually connected via a bus 48. The control circuit 40 further includes a first oscillator (OSC1) 51 for outputting rectangular pulses of a predetermined frequency, a second oscillator (OSC2) 52 for outputting pulses having the same frequency but wider pulse width than the rectangular pulses, a selector 54 for selectively transmitting either one of the outputs of these oscillators 51 and 52 to the ink discharge heads 61 through 64, and a distributor 55 for distributing the output of the selector 54 into the four ink discharge heads 61 through 64 at a given timing. The control circuit 40 receives dot data from the computer 90, temporarily stores the input dot data in the RAM 43, and outputs the dot data to the transfer buffer 47 at a predetermined timing. Namely the printer 22 does not carry out the image processing for generating multi-tone images. The control circuit 40 simply carries out the on/off control of dots, that is, determines formation or non-formation of dots.

Figure 7:
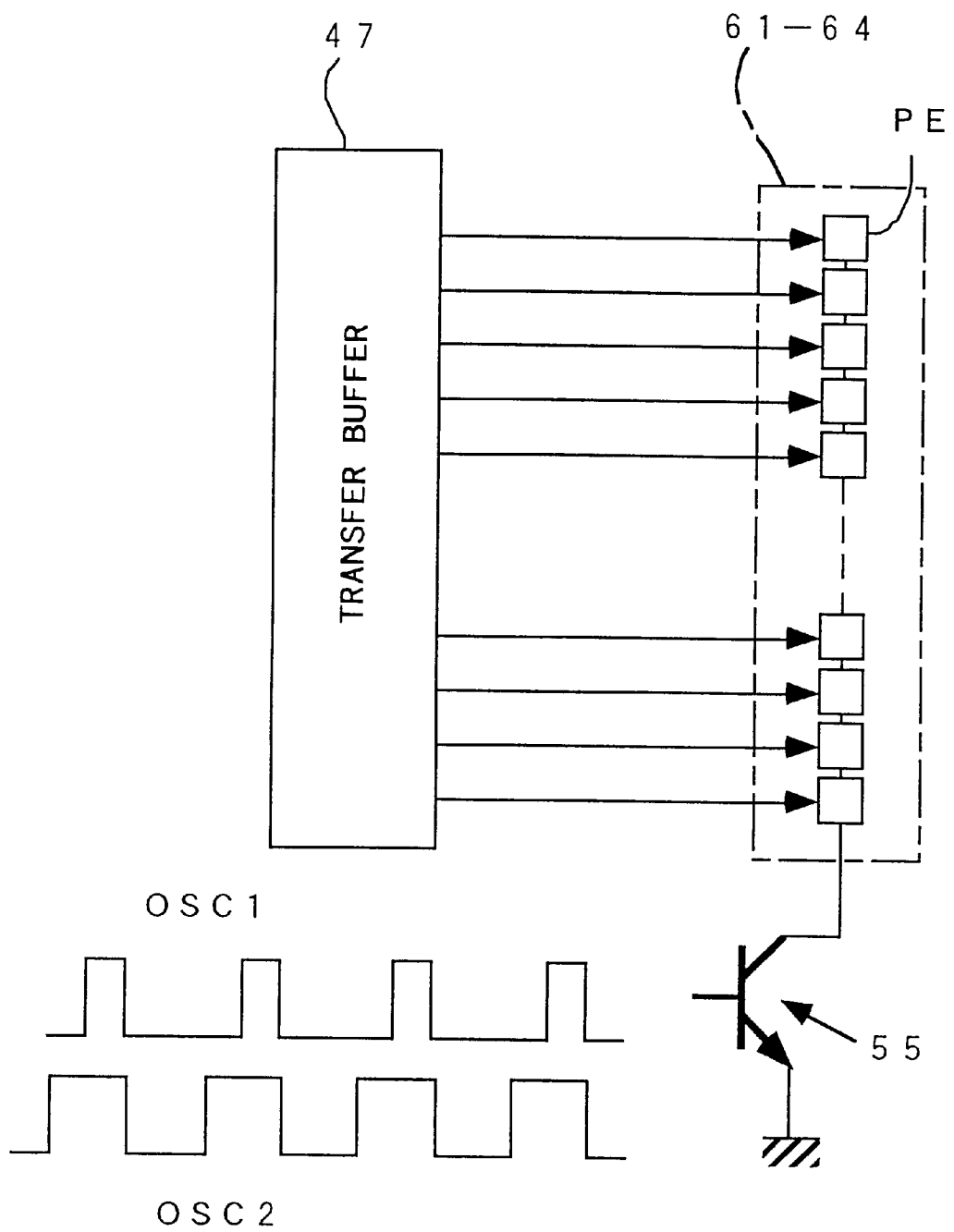
FIG. 7 shows a circuit structure for driving heads 61 through 64.

The control circuit 40 outputs signals to the ink discharge heads 61 through 64 in the following manner. FIG. 7 shows connection to one nozzle array in the ink discharge heads 61 through 64. As illustrated in FIG. 7, one nozzle array in the ink discharge heads 61 through 64 is incorporated in a circuit including the transfer buffer 47 as a source and the distributor 55 as a sink. Each piezoelectric element PE of the nozzle array is connected on one electrode with each output terminal of the transfer buffer 47 and on the other electrode with an output terminal of the distributor 55. The distributor 55 has a power transistor that is driven by either one of the signals of the first and the second oscillators 51 and 52. The power transistor is turned on in response to ON of the rectangular pulse from the oscillator. When the CPU 41 determines the on/off conditions of the respective nozzles and outputs signals to the respective terminals of the transfer buffer 47, only the piezoelectric elements PE receiving the ON signal from the transfer buffer 47 are driven in response to the pulse output from the selected one of the first and the second oscillators 51 and 52. The nozzles corresponding to the piezoelectric elements PE receiving the ON signal from the transfer buffer 47 simultaneously spout the ink particles Ip. The timing of outputting data from the transfer buffer 47 is synchronized with the ON timing of the power transistor of the distributor 55 by the signal output from the selector 54.

The ink discharge heads 61 through 64 are arranged in the feeding direction of the carriage 31, so that the respective nozzle arrays reach a fixed position on the sheet of paper P at different timings. The CPU 41 takes into account the difference in position of the respective nozzle arrays in the ink discharge heads 61 through 64, and outputs the on/off signals of dots via the transfer buffer 47 at required timings to form dots of the respective colors. As described below, in the actual structure, each ink discharge head has two rows of nozzles to construct a nozzle array. The CPU 41 considers this arrangement, that is, two rows of nozzles in each head, and controls output of the on/off signal to each nozzle.

The rectangular pulses output from the first and the second oscillators 51 and 52 are schematically illustrated in FIG. 7. The width of the ON time of the pulse signal determines a variation of the piezoelectric element PE. The variation of the piezoelectric element PE controls the size of the ink particles Ip spouted from the nozzles. In case that the selector 54 selects the pulse signal OSC2 output from the second oscillator 52, large ink particles I are spouted. In case that the selector 54 selects the pulse signal OSC1 output from the first oscillator 51, on the other hand, small ink particles I are spouted. The CPU 41 of the control circuit 40 controls the selector 54 and thereby regulates the size of the ink particles Ip, that is, the diameter of dots formed on the paper, between two different stages in this embodiment. For synchronization of pulses, the same pulse signal is continuously selected while the carriage 31 is fed once in the direction of the width of the sheet of paper P. In the structure of the embodiment, the dots formed during one feed (single way) of the carriage 31 in the primary scanning direction are restricted to have the same diameter.

B. Dot Recording Mode
(1) Arrangement of Nozzles

The following describes a dot recording mode realized by the computer 90 in cooperation with the printer 22. The method of forming dots of different diameters according to the present invention is based on the technique of enabling the simultaneous existence of two different types of dots under the restriction that only one dot diameter is allowed during one feed of the carriage 31 in the primary scanning direction. The method of forming such dots is not restricted to the technique utilizing the recording mode discussed below, but there are a variety of other available techniques. The principle of the present invention is applicable to any recording mode.

The dot recording mode depends upon control parameters, such as shifts of the ink discharge heads 61 through 64 in the secondary scanning direction. The printer driver 96 of the computer 90 may have the structure that reads these parameters from the printer 22. These parameters are registered in the programmable ROM (PROM) 42 included in the control circuit 40. The PROM 42 stores dot recording mode information including parameters of a plurality of dot recording modes. The term 'dot recording mode' here implies a dot recording system defined by, for example, a number of nozzles N actually used in each nozzle array and a quantity of secondary scanning feed L. In the specification hereof, the terms 'recording system' and the 'recording mode' substantially have the same meanings. Concrete examples of the dot recording mode and their parameters will be discussed later. The PROM 42 further stores mode specification information used to select a favorable mode among the plurality of dot recording modes. For example, in case that the PROM 42 can store sixteen pieces of dot recording mode information, the mode specification information consists of 4-bit data.

When the printer driver 96 (see FIG. 2) is installed on the start of the computer 90, the printer driver 96 reads the dot recording mode information from the PROM 42. More concretely, the printer driver 96 reads the dot recording mode information regarding a favorable dot recording mode selected by the mode specification information from the PROM 42. The processing in the rasterizer 97 and the halftone module 99 is carried out according to this dot recording mode information.

The PROM 42 may be a rewritable non-volatile memory, and a variety of non-volatile memories, such as an EEPROM and a flash memory, may be applicable for the PROM 42. Although it is preferable that the mode specification information is stored in the rewritable non-volatile memory, the dot recording mode information may be stored in a non-rewritable ROM. The plural pieces of dot recording mode information may be stored in a storage unit other than the PROM 42. For example, instead of the structure of reading these parameters from the printer 22, such information may be registered in the printer driver 96. In accordance with another possible application, the user activates the utility software and specifies the parameters on the computer 90.

FIG. 8A shows an arrangement of ink jet nozzles in the ink discharge heads 61 through 64. The first head 61 has a nozzle array for spouting black ink. Similarly the second through the fourth heads 62 through 64 respectively have nozzle arrays for spouting cyan, magenta, and yellow inks. These four nozzle arrays have identical positions in the secondary scanning direction.

Each of the four nozzle arrays includes thirty-two nozzles n arranged in zigzag with a constant nozzle pitch k in the secondary scanning direction. Thirty-two nozzle n included in each nozzle array may be arranged in alignment, instead of in zigzag. The zigzag arrangement as shown in FIG. 8A, however, has the advantage of setting a smaller nozzle pitch k in the manufacturing process.

FIG. 8B shows an arrangement of a plurality of dots formed by one nozzle array. In this embodiment, whether the ink nozzles are arranged in zigzag or in alignment, driving signals are supplied to the piezoelectric elements PE (FIG. 5) of the respective nozzles, in order to cause a plurality of dots formed by one nozzle array to be arranged substantially in alignment in the secondary scanning direction. By way of example, it is assumed that the nozzle array has nozzles arranged in zigzag as shown in FIG. 8A and that the head 61 is scanned rightward in the drawing to form dots. In this case, a group of preceding nozzles 100, 102, . . . receive driving signals at an earlier timing by d/v [second] than a group of following nozzles 101, 103 . . . . In the drawing of FIG. BA, d [inch] denotes the pitch between the two nozzle groups in the head 61, and v [inch/second] denotes the scanning speed of the head 61. A plurality of dots formed by one nozzle array are accordingly arranged in alignment in the secondary scanning direction. As described later, all the thirty-two nozzles formed in each of the heads 61 through 64 are not always used, but only part of the nozzles may be used according to the dot recording system.

(2) Essential Conditions of General Dot Recording System

Before the discussion of the technique for forming dots in the embodiment, the following describes the essential conditions required for the general dot recording system.

FIGS. 9A and 9B show essential conditions of the general dot recording system when a number of repeats of scan s is equal to one. FIG. 9A illustrates an example of secondary scanning feeds with five nozzles, and FIG. 9B shows parameters of the dot recording system. In the drawing of FIG. 9A, solid circles with numerals written therein represent the positions of the five nozzles in the secondary scanning direction after each secondary scanning feed. The numerals 0 through 4 in the circles denote the nozzle numbers. The five nozzles are shifted in the secondary scanning direction every time when one primary scan is concluded. In the actual state, however, the feed in the secondary scanning direction is realized by feeding a sheet of paper with the sheet feed motor 23.

As shown on the left end of FIG. 9A, the quantity of secondary scanning feed L is fixed to five dots. On every secondary scanning feed, the five nozzles are shifted by five dots in the secondary scanning direction. When the number of repeats of scan s is equal to one, each nozzle can record all dots (pixels) on the rasters. The right end of FIG. 9A shows the nozzle numbers for recording dots on the respective rasters. In case that the nozzles are shifted by a plurality of dots in the secondary scanning direction, a certain area immediately after a start of recording by the head can not be filled with dots. In a similar manner, a predetermined area immediately before an end of recording by the head can not be filled with dots. Recording by the corresponding nozzles is prohibited in this predetermined area. The area filled with dots according to the method of shifting nozzles by a plurality of dots in the secondary scanning direction, that is, the actual recording area, is hereinafter referred to as an effective recording range (effective printing range).

FIG. 9B shows a variety of parameters regarding this dot recording system. The parameters of the dot recording system include the nozzle pitch k [dots], the number of nozzles used N, the number of repeats of scan s, a number of effective nozzles Neff, and the quantity of secondary scanning feed L [dots].

In the example of FIGS. 9A and 9B, the nozzle pitch k is equal to 4 dots, and the number of nozzles used N is equal to 5. The number of nozzles used N denotes the number of nozzles actually used among a plurality of nozzles included in the nozzle array. The number of repeats of scan s implies that dots are formed intermittently at intervals of every (s−1) dots in one primary scan. The number of repeats of scan s is accordingly equal to the number of nozzles used to record all the dots on each raster. In the case of FIGS. 9A and 9B, the number of repeats of scan s is equal to one, and dots are formed at all the repeated positions in each operation in the primary scanning direction. The number of effective nozzles Neff is calculated by dividing the number of nozzles used N by the number of repeats of scan s. The number of effective nozzles Neff may be regarded as the net number of rasters that can be recorded in one primary scan. The meaning of the number of effective nozzles Neff will be further discussed later.

The quantity of secondary scanning feed L, its summation ΣL, and a nozzle offset F after each secondary scanning feed are shown in the table of FIG. 9B. The offset F is a value showing how many dots the position of the nozzles after each secondary scanning feed is apart from a reference position in the secondary scanning direction, when it is assumed that the first periodic position of the nozzles before the secondary scanning feed (position at intervals of every 5 dots in the example of FIG. 9A) is the reference position of the offset F=0. In the example of FIG. 9A, a first secondary scanning feed shifts the position of the nozzles by the quantity of secondary scanning feed L (=5 dots) in the secondary scanning direction. The nozzle pitch k is equal to 4 dots as mentioned above. The offset F of the nozzles after the first secondary scanning feed is accordingly equal to 1 (see FIG. 9A). In a similar manner, the position of the nozzles after a second secondary scanning feed is shifted by the summation ΣL=10 dots from the initial position, and the offset F is equal to 2. The position of the nozzles after a third secondary scanning feed is shifted by the summation ΣL=15 dots from the initial position, and the offset F is equal to 3. The position of the nozzles after a fourth secondary scanning feed is shifted by the summation ΣL=20 dots from the initial position, and the offset F is equal to 0. Since the offset F of the nozzles is returned to zero after the four secondary scanning feeds, repeating the cycle of four secondary scans enables all the dots on the rasters in the effective recording range to be recorded.

As clearly shown in the above example, when the position of the nozzles is apart from the initial position by an integral multiple of the nozzle pitch k, the offset F is equal to zero. The offset F is given as a remainder (L)%k obtained by dividing the summation ΣL of the quantity of secondary scanning feed L by the nozzle pitch k. Here [%] represents a remainder operator to take a remainder of the division.

When the initial position of the nozzles is regarded as the periodic position, the offset F may represent a deviation in phase from the initial position of the nozzles.

In case that the number of repeats of scan s is equal to one, it is required to satisfy the following conditions, in order to avoid a dropout or an overlap of rasters in the effective recording range:

Condition c1: The number of secondary scanning feeds in one cycle is equal to the nozzle pitch k.

Condition c2: The offsets F of the nozzles after the respective secondary scanning feeds in one cycle have different values in the range of 0 to (k−1).

Condition c3: A means quantity of secondary scanning feed (L/k) is equal to the number of nozzles used N. In other words, the summation L of the quantity of secondary scanning feed L per cycle is equal to the product of the number of nozzles used N and the nozzle pitch k (N×k).

The reason of the requirement for the above conditions can be understood as discussed below. Since (k−1) rasters exist between adjoining nozzles, the number of secondary scanning feeds required in one cycle is equal to k. This realizes recording of dots on the (k−1) rasters through one cycle and enables the position of the nozzles to be returned to the reference position (the position of the offset F equal to zero) after one cycle. In case that the number of secondary scanning feeds in one cycle is less than k, there is a dropout in the recorded rasters. In case that the number of secondary scanning feeds in one cycle is greater than k, on the other hand, there is an overlap in the recorded rasters. The first condition c1 is accordingly required.

Upon condition that the number of secondary scanning feeds in one cycle is equal to k, there is no dropout or overlap in the recorded rasters, only when the offsets F of the nozzles after the respective secondary scanning feeds in one cycle have different values in the range of 0 to (k−1). The second condition c2 is accordingly required.

When the first and the second conditions c1 and c2 are fulfilled, each of the N nozzles records k rasters in one cycle. Namely N×k rasters are recorded in one cycle. When the third condition c3 is satisfied, the position of the nozzles after one cycle (that is, after the k secondary scanning feeds) is apart from the initial position by the N×k rasters as shown in FIG. 9A. Satisfying the above first through the third conditions c1 to c3 thus prevents a dropout or an overlap in the recorded rasters in the range of N×k rasters.

Figures 10A, 10B, 10C, 10D:
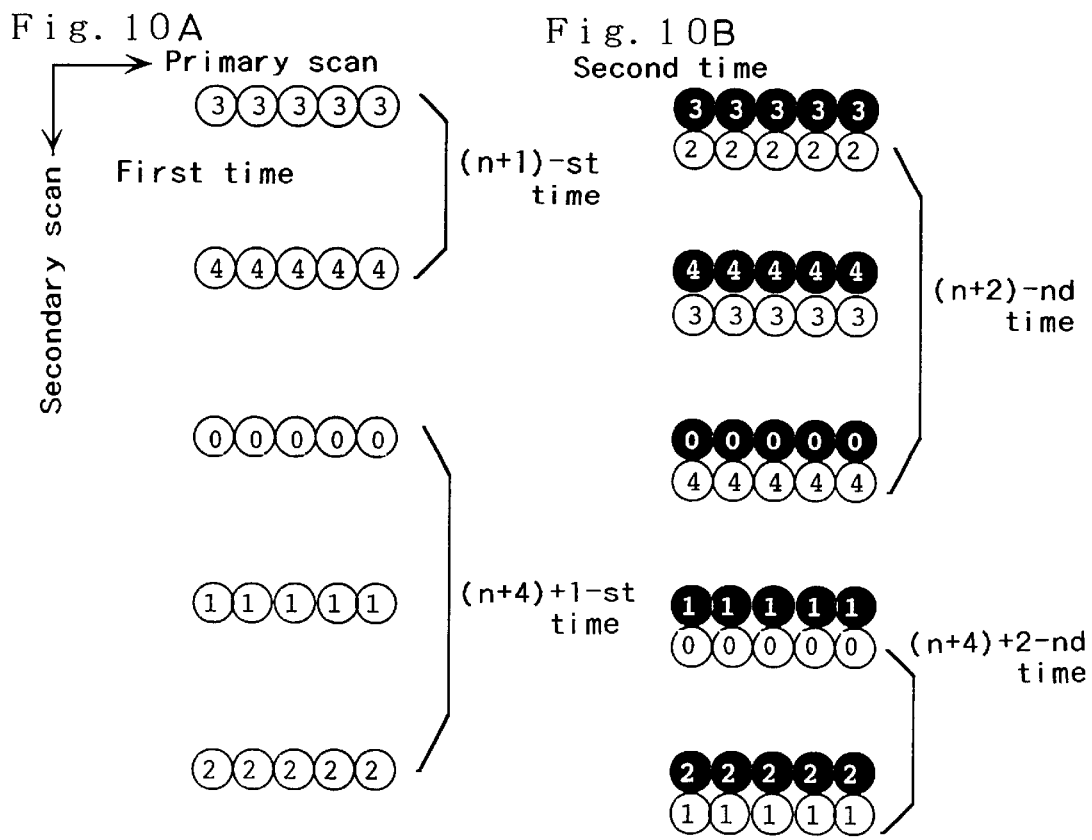
FIGS. 10A through 10D show the state of dot formation in an effective recording range by a plurality of primary scans.

In the recording mode discussed above, the number of repeats of scan s is equal to one, and one raster is recorded by only one nozzle. FIG. 10 shows the relationship between the number of scans in the primary scanning direction and the position of dots recorded in the effective recording range. Even in the effective recording range, all the dots can not be formed by the primary scans of the number equal to the nozzle pitch k (four in this example). The whole area is filled with dots by repeatedly carrying out records in the primary scanning direction while the recording range covered by the five nozzles is shifted little by little in the secondary scanning direction. In the example of FIG. 10, special attention is drawn to the time of the primary scan in one cycle. The dots that can be formed at the identical time in different cycles are shown together. The scan times n, n+1, . . . , n+5, are also shown in the drawing. FIG. 10A shows dots that can be formed by a first primary scan in one cycle, FIG. 10B dots that can be formed by a second primary scan in one cycle, FIG. 10C dots that can be formed by a third primary scan in one cycle, and FIG. 10D dots that can be formed by a fourth primary scan in one cycle. Dots shown by the open circles denote those formed by the current time of primary scan, and dots shown by the closed circles with white numerals denote those formed previously. As shown in FIG. 10A through FIG. 10D, in the recording mode of this embodiment, dots are formed by one line in the primary scanning direction in the effective recording range.

C. Formation of Dots having Different Dot Diameters

Figure 11:
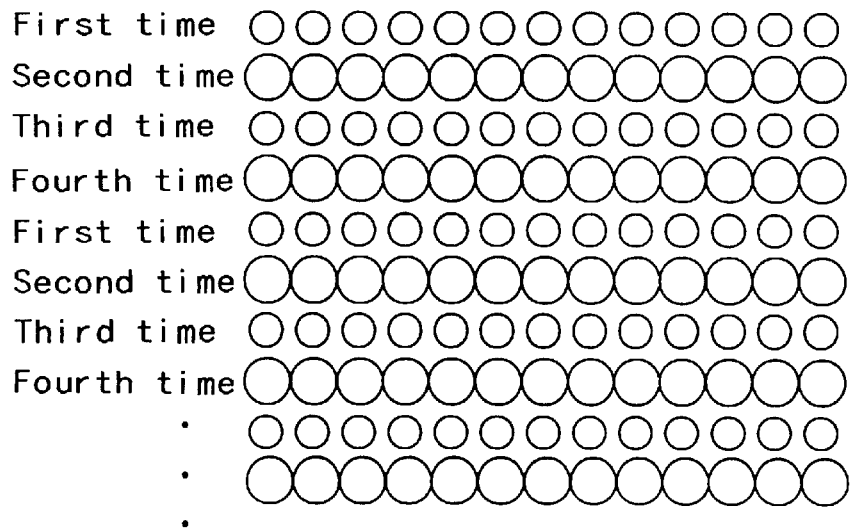
FIG. 11 illustrates an example of formation of small dots and large dots in the first embodiment.

Based on the image recording mode discussed above, the following describes the method of forming dots of different diameters in the first embodiment of the present invention. As mentioned above, the diameter of dots formed by the printer 22 of the embodiment can be changed on each primary scan. In accordance with a concrete procedure, in the case of printing in a single direction, every time when the carriage 31 is reciprocated once, a signal is output to the selector 54 via the PIO 45. The selector 54 then selectively outputs either one of the output signal OSC1 from the first oscillator 51 and the output signal OSC2 from the second oscillator 52 to the ink discharge heads 61 through 64, thereby selecting formation of either small dots (pulse signal OSC1) or large dots (pulse signal OSC2). In the recording mode discussed above, it is assumed that small dots are formed in the first and the third primary scans in each cycle, whereas large dots are formed in the second and the fourth primary scans. In this structure, dots of a smaller diameter and dots of a larger diameter are alternately recorded on each primary scanning line as shown in FIG. 11.

Figure 12:
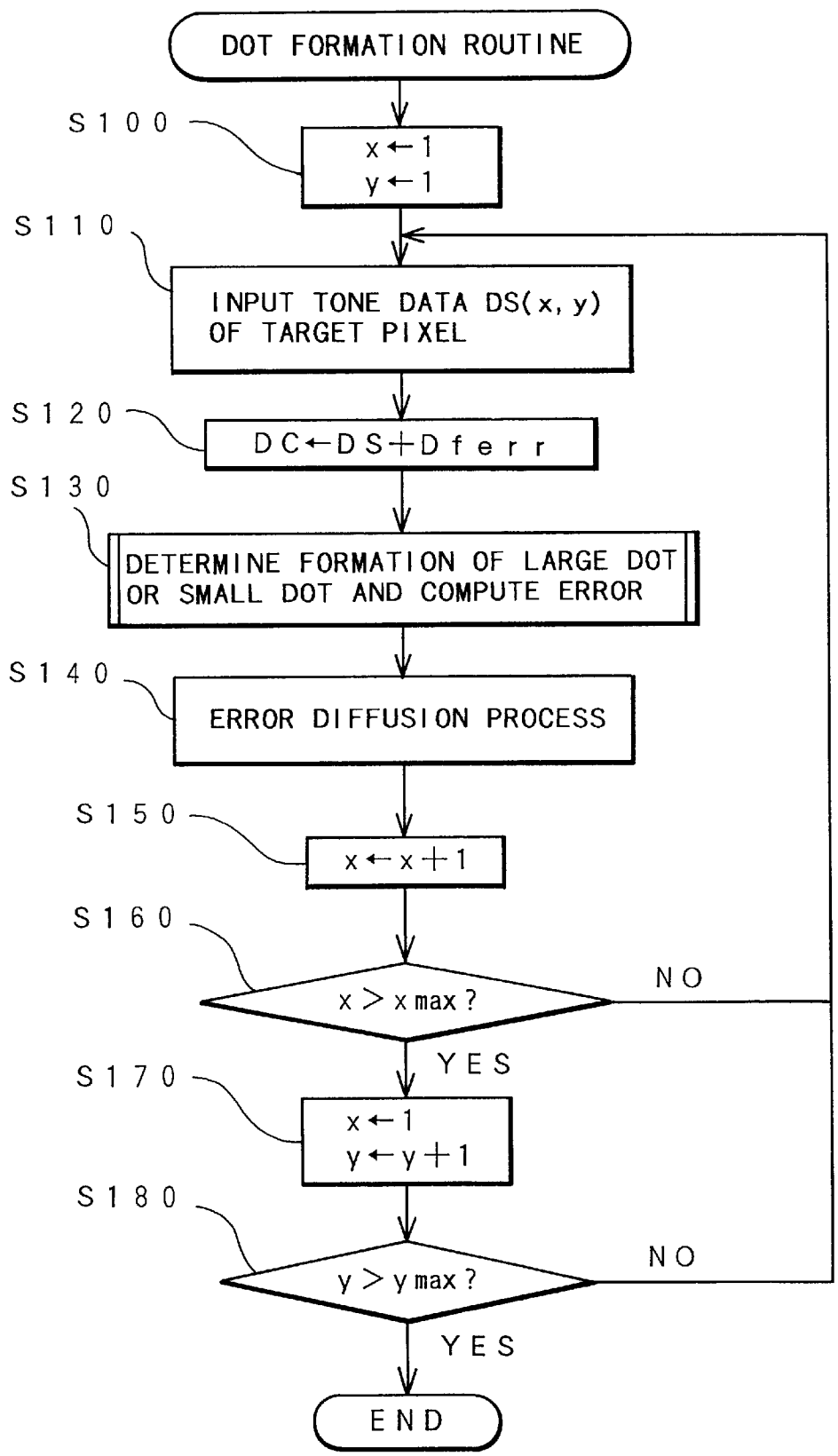
FIG. 12 is a flow chart showing a dot formation routine executed in the first embodiment.

Among the image processing operations executed by the printer driver 96 of the computer 90, the following describes the process of forming dots of different diameters. As discussed previously, in the printer 22 that generates a multi-tone image by the binary recording method, that is, formation or non-formation of dots, the density of dots is regulated according to the density of an image to be recorded. FIG. 12 is a flowchart showing a common idea to several embodiments discussed later. The outline of the technique for forming two different dots of different diameters is described with the flowchart of FIG. 12.

Figure 13:
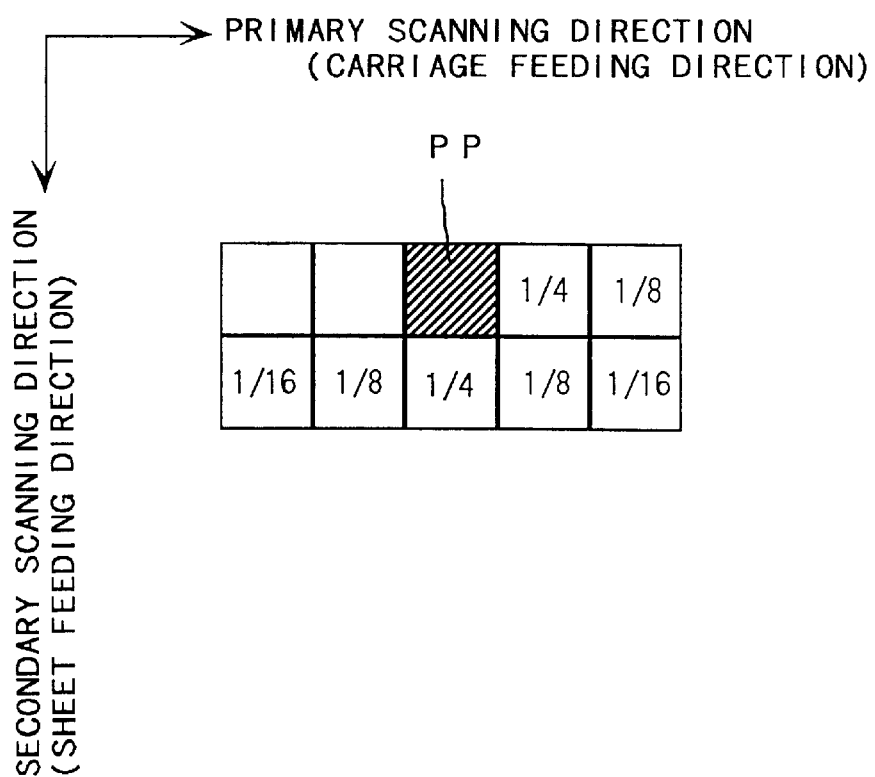
FIG. 13 shows an example of weights added in the process of error diffusion.

When the program enters the image processing routine of FIG. 12, the printer driver 96 initializes variables x and y representing a target position to be processed to initial values (1,1) at step S100. The printer driver 96 then inputs tone data DS (x,y) regarding a pixel at the position defined by the variables x and y (hereinafter referred to as the target pixel) in an image to be processed at step S110. The input tone data DS are 8-bit data ranging from 0 to 255. The tone data DS=0 represents the lowest tone (data corresponding to white), whereas the tone data DS=255 represents the highest tone (data corresponding to complete black). At subsequent step S120, the printer driver 96 corrects the input tone data DS with a diffusion error Dferr previously distributed to peripheral pixels according to the error diffusion method, and determines corrected tone data DC regarding the pixel to be processed. There are three possible choices in the printer 22 of the embodiment; formation of a small-diametral dot (hereinafter may be referred to as a small dot), formation of a large-diametral dot (hereinafter may be referred to as a large dot), no formation of either dots. It is here assumed that the tone of the small-diametral dot is approximately 127/255 and the tone of the large-diametral dot is approximately 255/255, whereas the input tone data DS regarding a specific pixel is 160/255. In the case of formation of a small-diametral dot, there is a shortage of the tone by 33/255 with respect to the specific pixel. In the case of formation of a large-diametral dot, on the other hand, there is an excess of the tone by 95/255 with respect to the specific pixel. In both cases, there is an error. The error diffusion method distributes the error to the peripheral pixels with predetermined weights. This reduces the error on average in an area of certain dimensions. FIG. 13 shows an example of distributing the error to the peripheral pixels with predetermined weights. The diffusion errors regarding the respective pixels existing before the target pixel at the position (x,y) are distributed to the peripheral pixels according to this weighting rule and stored in an error buffer. The corrected tone data DC is thus obtained by adding the diffusion error Dferr stored in the error buffer to the input tone data DS.

The program then determines formation of a large dot or a small dot and calculates an error at step S130. The principle of the processing is described briefly, although the details of the processing carried out at step S130 will be discussed later. A threshold value used to determine whether or not a dot is to be formed at the current processing position is varied, depending upon the position where a small dot is formed or the position where a large dot is formed. Varying the threshold value for determination according to the position regulates the ratio of large dots to small dots to a desirable level. Information regarding whether or not the position of the target pixel corresponds to the position where a small dot is formed is immediately known by specifying which ordinal number in the cycle the pixel is recorded by the printer 22. When the resolution of the input image is identical with the resolution of the printer 22, it is specified on which scanning line the target pixel exists in the course of processing the input image from the upper left corner thereof as the origin along the scanning lines. This determines whether or not the target pixel is at the position where a small dot is formed. In the recording mode shown in FIG. 11, small dots are formed on the scanning lines of the odd ordinal numbers (y: odd numbers), whereas large dots are formed on the scanning lines of the even ordinal numbers (y: even numbers). After determining formation of a large dot or a small dot, the printer driver 96 computes an error caused by formation or non-formation of a dot. As discussed above, the computation of the error is carried out by calculating the difference between the tone to be realized by the dot and the tone actually attained by the formed dot. In the above description, the error simply represents the difference in tone of the dot. The actual dot has a circular or elliptical shape and an overlap with an adjoining dot. Especially in the case of a large dot, a dot existing alone and a dot overlapping an adjoining dot cause different errors. In the actual computation of the error, existence or non-existence of the adjoining dot may be considered.

After determining formation of a large dot or a small dot and calculating the error at step S130, the program diffuses the error to the peripheral pixels at step S140. In accordance with a concrete procedure, the calculated errors with the predetermined weights shown in FIG. 13 are accumulated as diffusion errors in the error buffers corresponding to the peripheral pixels. The program proceeds to step S150 to increment the variable x by one, so as to move the position of the target pixel forward by one on the scanning line. The variable x is then compared with its maximum value xmax at step S160. The maximum value xmax corresponds to the width of the image. When the variable x is not greater than the maximum value xmax at step S160, the program returns to step S110 to input the tone data DS of another target pixel and repeat the image processing discussed above.

When it is determined that the position x of the target pixel has reached the end of the scanning line (that is, x>xmax), the program goes to step S170 to return the variable x to the initial value 1 and increment the variable y by one, so as to move the position of the target pixel to a next scanning line. The variable y is then compared with its maximum value ymax at step S180. In case that the variable y does not exceed the maximum ymax, the program returns to step S110 to repeat the image processing discussed above. In case that the variable y exceeds the maximum ymax, on the other hand, the program determines that the image processing has been concluded for all the pixels and goes to END to exit from this routine.

Figure 14:
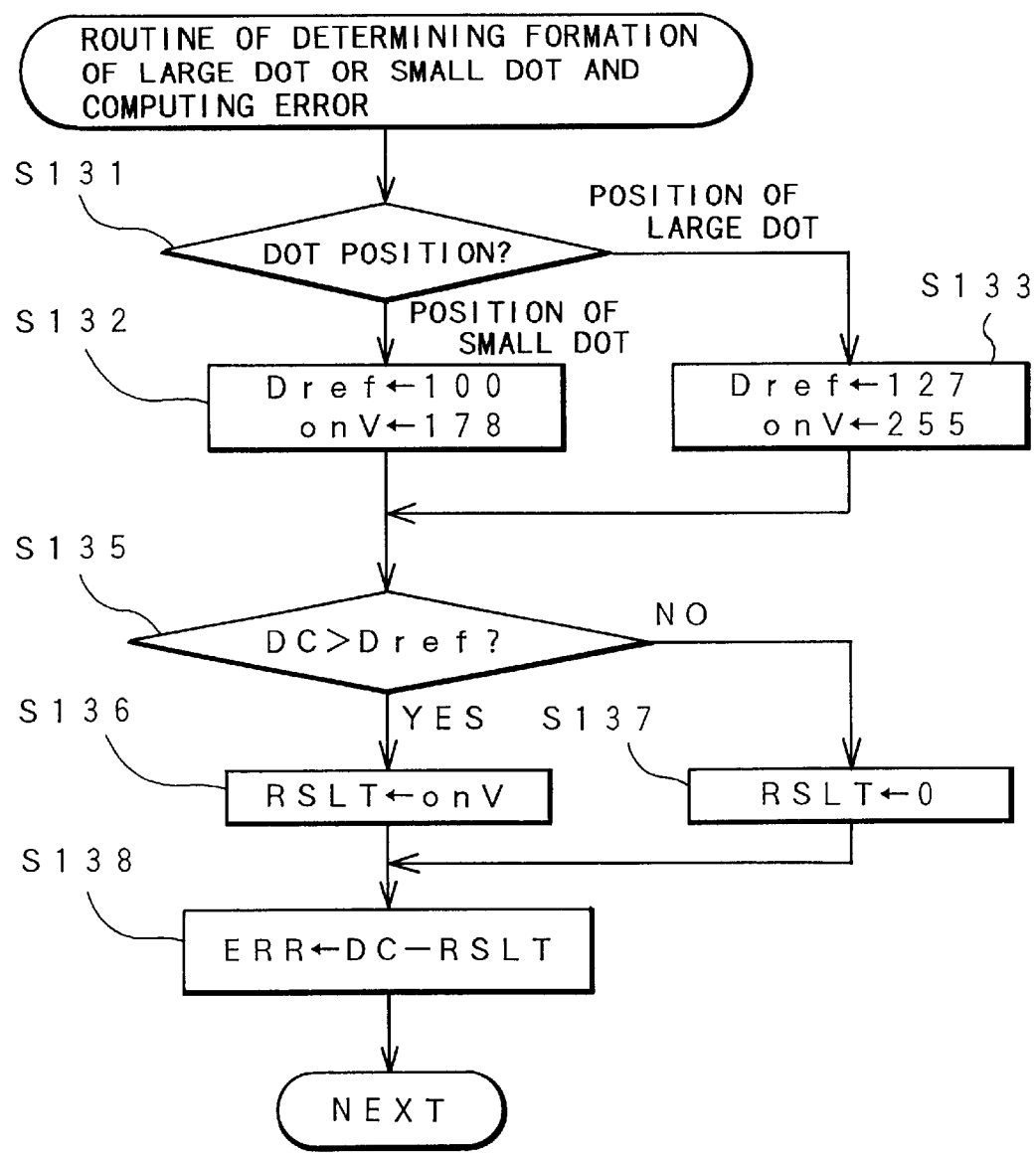
FIG. 14 is a flowchart showing a routine of determining formation of a large dot or a small dot and computing an error executed in the first embodiment.

This is the outline of the method that forms dots of different diameters according to the positions where dots are formed. In this method, positions where small dots are formed and those where large dots are formed have previously been specified, and the frequency of dot formation depends upon the position. The flowchart of FIG. 14 shows details of the process of determining formation of a large dot or a small dot. The processing of FIG. 14 corresponds to the processing of step S130 in the flowchart of FIG. 12.

When the program enters the processing of FIG. 14, the position of the target pixel is determined first at step S131. Namely it is determined whether the position of dot formation corresponds to the position where a small dot is formed or the position where a large dot is formed. In the dot recording system shown in FIG. 9, when the position of the target pixel (the position of the y-th scanning line) in the vertical direction (that is, in the secondary scanning direction) has an odd ordinal number, the position of the target pixel corresponds to the position where a small dot is formed. In the first embodiment, determination of the dot position is equivalent to determination of whether the variable y representing the position of the scanning line corresponding to the dot in the secondary scanning direction is an even number or an odd number. In case that the variable y is an odd number, it is determined that the position of the target pixel corresponds to the position where a small-diametral dot (a small dot) is formed as shown in FIG. 11. In this case, at step S132, a threshold value Dref used for comparison of dot formation is set equal to 100, and an on-value onV representing the tone value realized in the case of dot formation is set equal to 178. In case that the variable y is not an odd number, on the contrary, it is determined that the position of the target pixel corresponds to the position where a large-diametral dot (a large dot) is formed. In this case, at step S133, the threshold value Dref used for comparison of dot formation is set equal to 127, and the on-value onV is set equal to 255. Regulating the threshold value Dref according to the position enhances the probability of dot formation on the scanning lines of odd ordinal numbers. A small value is set to the on-value onV when a small dot is formed.

At subsequent step S135, the corrected tone data DC is compared with the threshold value Dref. When it is determined that the corrected tone data DC corrected with the diffusion errors is greater than the threshold value Dref, the program determines formation of a dot, writes the result of determination into a predetermined buffer area, and sets the on-value onV to a resulting value RSLT at step S136. When it is determined that the corrected tone data DC is not greater than the threshold value Dref at step S135, on the other hand, the program sets the resulting value RSLT equal to zero at step S137. When no dot is formed, the realized tone corresponds to the color of paper and is thus regarded as the value '0'.

After determining formation or non-formation of a dot and setting the resulting value RSLT, the program carries out error computation at step S138. A concrete procedure of step S138 subtracts the resulting value RSLT from the corrected tone data DC and sets the difference to an error ERR. The program here completes the processing of determining formation of a large dot or a small dot and computing the error and goes to NEXT to exit from this routine. The error ERR computed by this processing routine is diffused to the peripheral pixels at subsequent step S140 in the flowchart of FIG. 12.

After the processing shown in the flowcharts of FIGS. 12 and 14, the results of determination of dot formation corresponding to the input image data are stored in the predetermined buffer area. In the computer 90, this buffer area is set as a spool file on the hard disk 16. After completion of the image processing, the computer 90 reads data from the spool file and successively outputs the data to the printer 22 via the output interface 85. The printer 22 receives the output data, once stores the data into the RAM 43, and transfers the data to the transfer buffer 47 at a predetermined timing according to the current recording mode, thereby activating the ink discharge heads 61 through 64 and forming dots of the respective color inks on the sheet of paper P. In this manner, the printer 22 forms dots of an identical diameter on the same primary scanning line, but alternately forms large dots and small dots on every other line. In this embodiment, the smaller value is set the threshold value Dref on the odd lines, so that the probability of formation of small dots is high in a low-density area.

FIG. 15 shows dots generated according to the input tone data DS. When the input tone data DS is a low value, only small dots are generally formed as shown in FIG. 15A. With an increase in tone data DS, the ratio of large dots increases as shown in FIGS. 15B and 15C. When the tone data DS is an extremely high value, the ratio of large dots to small dots becomes one to one as shown in FIG. 15D. In this embodiment, the threshold value Dref has a small value at the positions where small dots are formed. The same effect is, however, obtained by setting a large value to the threshold value Dref at the positions where large dots are formed. In both cases, the probability of formation of small dots is higher, so that small dots are formed in an area of low tone data DS. This structure effectively reduces the degree of granularity in the area of low tone data, thereby improving the quality of picture. Another possible procedure sets a large value to the threshold value Dref at the positions where small dots are formed. In this case, the probability of formation of small dots is low and large dots are sparsely formed in the area of low tone data DS. This structure also makes the ratio of large dots to small dots gradually approach one to one with an increase in tone data DS as shown in FIG. 15D.

Figure 16A:
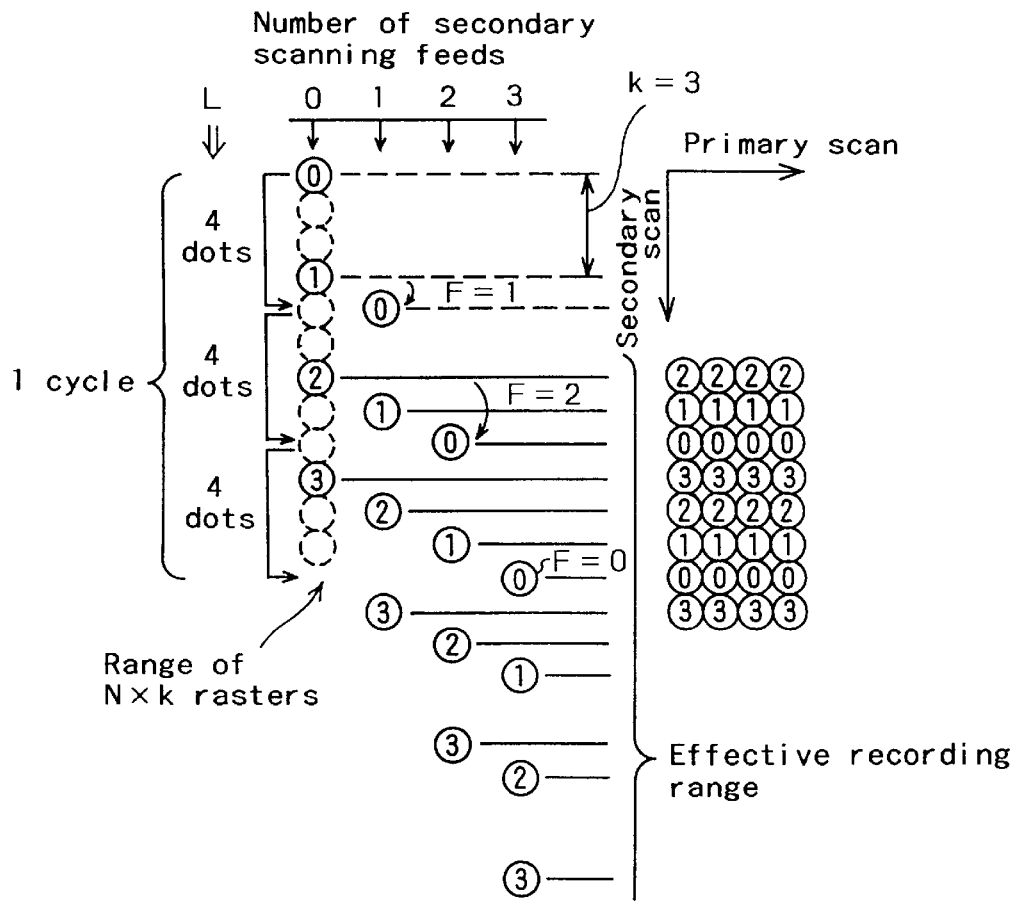

In the first embodiment of the present invention discussed above, the final ratio of large dots to small dots is one to one. Since the dot diameter can be regulated on every line, the final ratio of large dots to small dots may be controlled arbitrarily by determining formation of small dots or large dots based on the current line number in the course of image processing. By way of example, under the conditions of the nozzle pitch k=3, the number of nozzles used N=4, the number of repeats of scan s=1, and the quantity of secondary scanning feed L=4 dots, one cycle includes three primary scans as shown in FIG. 16. In this case, when large dots are formed in two of the three primary scans and small dots are formed in the remaining one primary scan, the final ratio of large dots to small dots is two to one. In the structure of FIG. 10, the final ratio of large dots to small dots may be one to three or three to one, instead of one to one. It is not required to fix the size of the dots formed in the respective scans of each cycle. Formation of either large dots or small dots may thus be freely set on each scanning line. The ratio of large dots to small dots may be freely set as one to five or one to seven, or formation of either dots may be determined at random.

In case that the final ratio of large dots to small dots is one to one, when the density expressible by small dots is 178/255 and the density expressible by large dots is 255/255, the mean expressible density is given as:

$$(1(178)+1(255))/(1+1)=216.5.$$

In order to raise the mean expressible density, it is required to increase the diameters of the small dots and the large dots. For example, the expressible density by small dots is set equal to 210/255 and the expressible density by large dots is set equal to 300/255. This makes the mean expressible density equal to 255/255 in case that the final ratio of large dots to small dots is one to one. As another example, in case that the final ratio of large dots to small dots is three to one, the weighting average technique is applied to regulate the expressible densities by small dots and large dots and realize a desired mean expressible density.

D. Second Embodiment

The following describes a second embodiment according to the present invention. The second embodiment has substantially the same hardware structure as that of the first embodiment, except the structure of head nozzles shown in FIG. 16 having the number of repeats of scan s equal to two. FIG. 17 shows a dot recording mode in the second embodiment. In this embodiment, the number of repeats of scan s is equal to two. When the number of repeats of scan s is not lower than 2, the same raster is recorded by s different nozzles. The dot recording system having the number of repeats of scan s of not less than 2 is hereinafter referred to as the 'overlap system'.

Figure 17A:
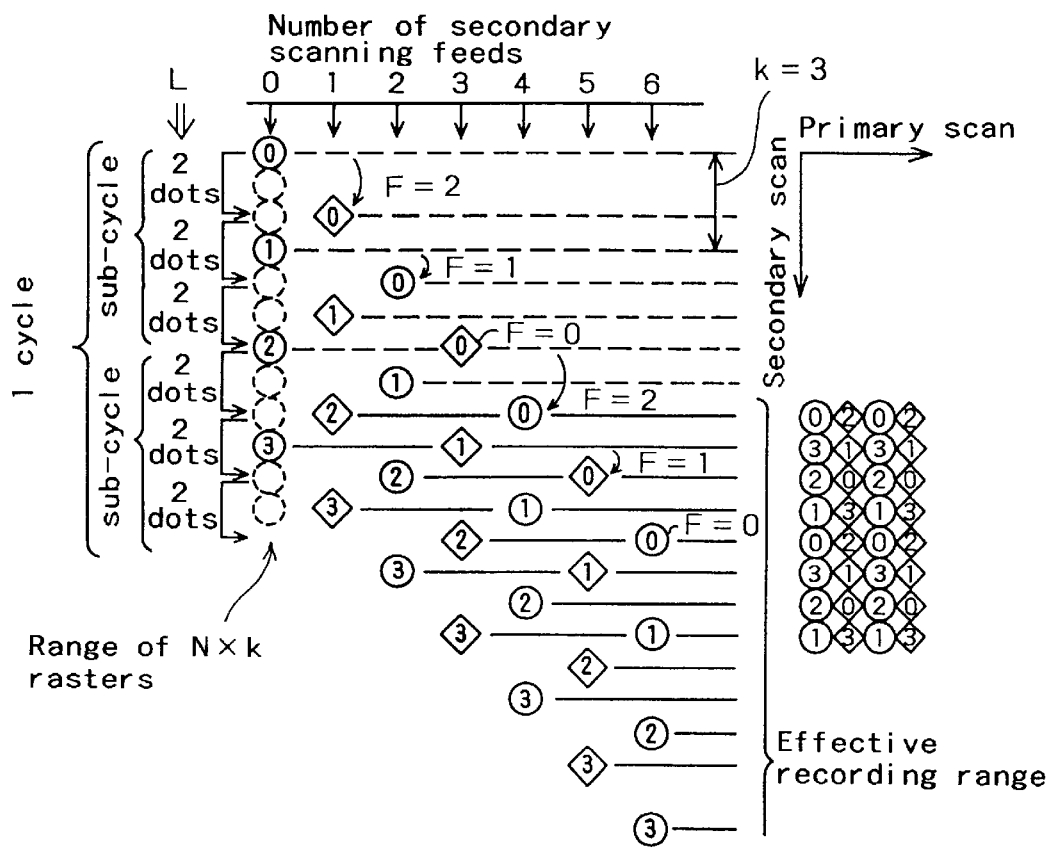

The dot recording system shown in FIG. 17 has different values in the number of repeats of scan s and the quantity of secondary scanning feed L from the parameters of the dot recording system shown in FIG. 16B. As clearly understood from FIG. 17A, the quantity of secondary scanning feed L is fixed to two dots in the dot recording system of FIG. 17. In the example of FIG. 17A, the positions of the nozzles after the secondary scanning feed of the odd time are shown by the squares. As shown on the right end of FIG. 17A, the position of the dots recorded after the secondary scanning feed of the odd time is deviated by one dot in the primary scanning direction from the position of the dots recorded after the secondary scanning feed of the even time. A plurality of dots on the same raster are thus recorded intermittently by two different nozzles. For example, the upper-most raster in the effective recording range is intermittently recorded on every other dot by the No. 2 nozzle after a first secondary scanning feed and then intermittently recorded on every other dot by the No.0 nozzle after a fourth secondary scanning feed. In the overlap system, each nozzle is generally driven at an intermittent timing; that is, recording is prohibited for (s−1) dots after recording of one dot in one primary scan. The nozzle may be driven in this manner by doubling the repeating cycle of the pulse signal output from the oscillator, while keeping the on time of the pulse signal unchanged. This prevents the transistor on the sink's side from being turned on at the drive-prohibiting timing. Another possible structure prevents data output to the transfer buffer 47 at the drive-prohibiting timing, while keeping the pulse signal unchanged. The structure of the second embodiment prohibits data transfer to the transfer buffer 47 at every other time.

In the overlap system, the positions of a plurality of nozzles for recording the same raster should be deviated from one another in the primary scanning direction. The actual shift of each primary scan in the primary scanning direction is thus not restricted to the state shown in FIG. 17A. One possible procedure does not carry out any shift in the primary scanning direction after the first secondary scanning feed and records dots at the positions defined by the circles. After the fourth secondary scanning feed, this procedure carries out a shift in the primary scanning direction and records dots at the positions defined by the squares.

The lower-most row of the table of FIG. 17B shows the values of the offset F after each secondary scanning feed in one cycle. One cycle includes six secondary scanning feeds. The offset F after each of the first through the sixth secondary scanning feeds is varied in the range of 0 to 2 and has the same values twice. The variation in offset F after the first through the third secondary scanning feeds is identical with the variation in offset F after the fourth through the sixth secondary scanning feeds. As shown on the left end of FIG. 17A, the six secondary scanning feeds included in one cycle can be divided into two sets of sub-cycles, each including three secondary scanning feeds. One cycle of the secondary scanning feeds is concluded by repeating the sub-cycles s times.

When the number of repeats of scan s is an integer of not less than 2, the first through the third conditions c1 to c3 discussed above are replaced by the following conditions c1' through c3':

Condition c1': The number of secondary scanning feeds in one cycle is equal to the product of the nozzle pitch k and the number of repeats of scan s (k×s).

Condition c2': The offset F of the nozzle after each secondary scanning feed included in one cycle is varied in the range of 0 to (k−1) and has the same values s times.

Condition c3': The mean quantity of secondary scanning feed {L/(k×s)} is equal to the number of effective nozzles Neff (=N/s). In other words, the summation $\Sigma L$ of the quantity of secondary scanning feed L per cycle is equal to the product {Neff×(k×s)} of the number of effective nozzles Neff and the number of secondary scanning feeds (k×s).

The above conditions c1' through c3' are held even when the number of repeats of scan s is equal to one. This means that the conditions c1' through c3' are generally held for the dot recording system, irrespective of the number of repeats of scan s. When these three conditions c1' through c3' are satisfied, there is no dropout or an overlap in the dots recorded in the effective recording range. In case that the overlap system is applied (in case that the number of repeats of scan s is not less than 2), the recording positions of the nozzles for recording the same raster should be deviated from each other in the primary scanning direction.

Figure 18:
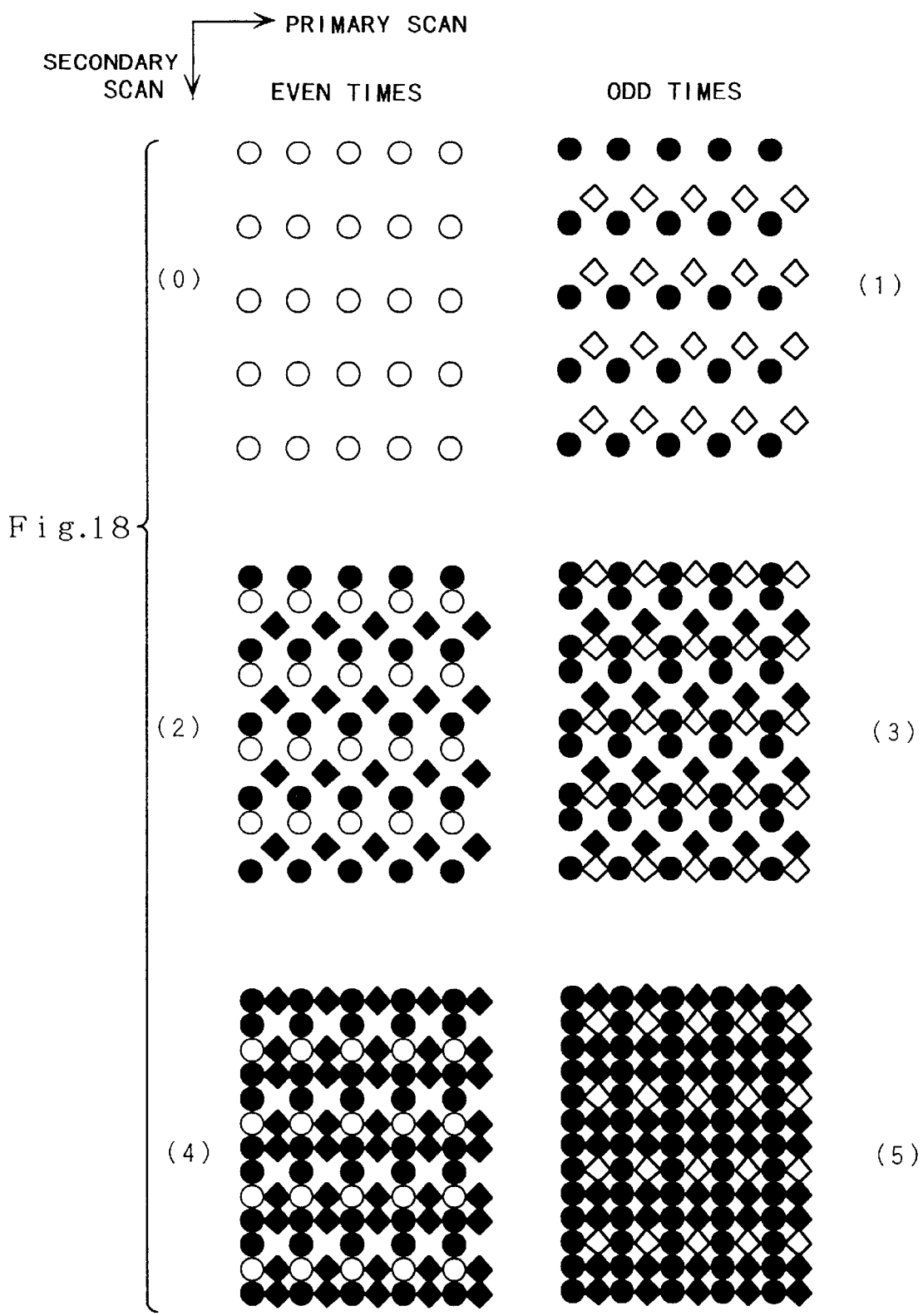
FIG. 18 shows the order of dot formation in the second embodiment.

The number of dots formed simultaneously by one primary scan in the recording system shown in FIG. 17 is half the number of dots formed in the recording system shown in FIG. 16. This is because, in the recording system of FIG. 17, the same nozzle passes through the same raster twice and one primary scan carries out recording on every other dot in the primary scanning direction. Namely dots are alternately formed by different primary scans in the primary scanning direction. FIG. 18 shows this state in detail. In the recording system of FIG. 17, one cycle includes six primary scans from the secondary scanning position 0 to the secondary scanning position 5. FIG. 18 shows the dots formed in one cycle according to the secondary scanning positions (0) through (5). In the drawing of FIG. 18, dots formed at the same secondary scanning position in different cycles are shown together. The dots currently formed at the secondary scanning position are shown by the open circles or squares, whereas those previously formed are shown by the closed circles or squares.

As shown in FIG. 18, dots formed at the positions having the number of the secondary scanning feeds equal to 0, 2, and 4 (hereinafter referred to as the even time) and those formed at the positions having the number of the secondary scanning feeds equal to 1, 3, and 5 (hereinafter referred to as the odd time) are arranged alternately in the primary scanning direction. The structure of the second embodiment determines the dot position according to the above dot recording system in the course of executing the routine of determining formation of a large dot or a small dot and computing the error (see FIG. 14) discussed in the first embodiment. Small dots are formed when the number of secondary scanning feeds is an even time in one cycle. Large dots are formed, on the other hand, when the number of secondary scanning feeds is an odd time in one cycle. Such determination results in forming small dots at the positions defined by the open circles or closed circles shown in FIG. 18 and forming large dots at the positions defined by the open squares or closed squares. While the small dots and the large dots are alternately arranged in the secondary scanning direction in the first embodiment (see FIG. 11), the small dots and the large dots are alternately arranged in the primary scanning direction in the second embodiment.

The following describes a third embodiment according to the present invention. The structure of the third embodiment arranges small dots and large dots in zigzag. There are numerous dot recording systems that realize such a dot arrangement. In one example shown in FIG. 19, the applied conditions are the nozzle pitch k=2, the number of nozzles used N=6, and the number of repeats of scan s=2. In this example, since the number of repeats of scan s is equal to two, the overlap system is applied; that is, the same nozzle passes through the same primary scanning line twice. The order of forming dots in this structure has been discussed previously in the first and the second embodiments, and is thereby not specifically described here. For example, small dots are formed at the number of secondary scanning feeds equal to 0 and 1, while large dots are formed at the number of secondary scanning feeds equal to 2 and 3. In this case, small dots (defined by open circles) and large dots (defined by open squares) are arranged alternately as shown in FIG. 19A. Namely the small dots and the large dots are arranged in zigzag.

Figure 20A:
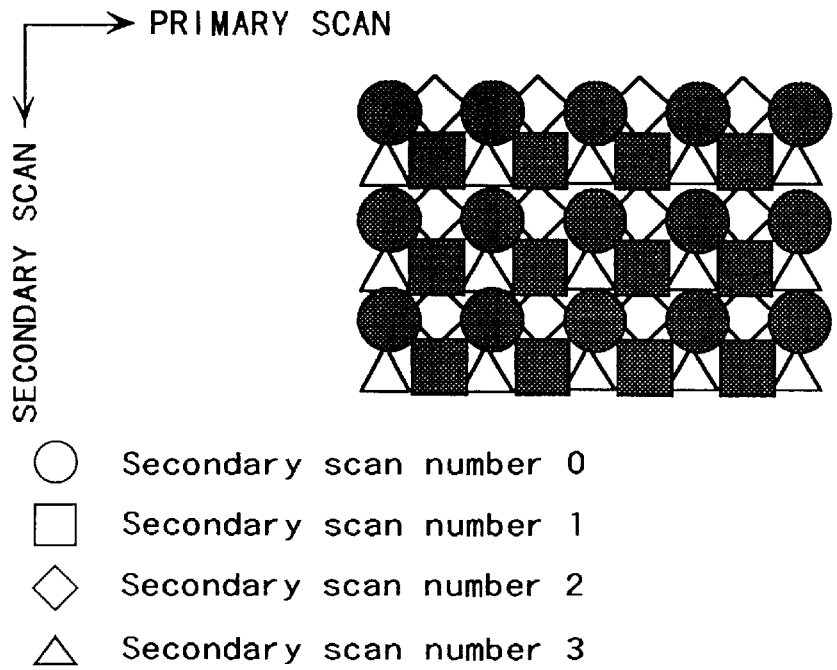
FIGS. 20A through 20C show examples having the ratio of large dots to small dots equal to one to one, one to three, and three to one in the structure of the third embodiment.
Figure 20B:
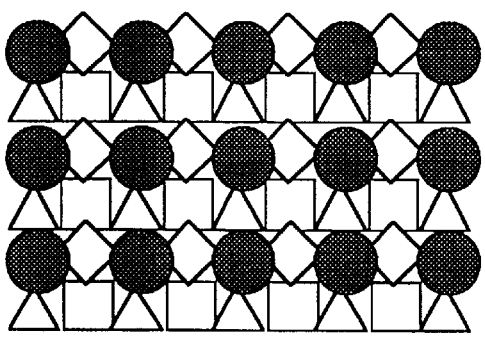
Figure 20C:
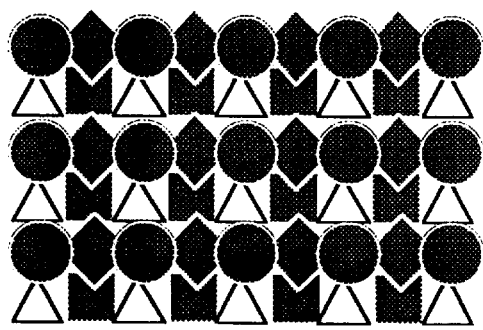

The printer of the third embodiment can form a variety of dot patterns. This is because any 2×2 dots included in the dot pattern shown in FIG. 19 are formed by different primary scans. When small dots are formed at the zero and the first secondary scanning feeds and large dots are formed at the second and the third secondary scanning feeds, the small dots and the large dots are arranged in zigzag. When small dots are formed at the zero and the second secondary scanning feeds and large dots are formed at the first and the third secondary scanning feeds, on the other hand, the large dos and the small dots are arranged on every other line in the secondary scanning direction, like the first embodiment. When small dots are formed at the zero and the third secondary scanning feeds and large dots are formed at the first and the second secondary scanning feeds, the large dots and the small dots are arranged on every other column in the primary scanning direction, like the second embodiment. In these examples, the final ratio of small dots to large dots is set equal to one to one. The same principle is, however, applicable to the case in which the final ratio of small dots to large dots is three to one or one to three. In the example of FIG. 19, when small dots are formed at any three feeds among the zero through the third secondary scanning feeds and large dots are formed at the remaining one feed, the final ratio of small dots to large dots becomes three to one. The opposite arrangement realizes the final ratio of small dots to large dots equal to one to three. FIGS. 20A, 20B, and 20C respectively show the example of one to one, example of three to one, and example of one to three. In these examples, dots formed at the number of secondary scans equal to (n+0) are defined by circles, those at the number of secondary scans equal to (n+1) by squares, those at the number of secondary scans equal to (n+2) by rhombuses, and those at the number of secondary scans equal to (n+3) by triangles. Large dots are shown by the corresponding closed symbols. Although the primary scan positions of the respective nozzles are different between the zero secondary scanning feed and the fourth secondary scanning feed, the relative positions in the basic 2×2 unit are identical. The dots formed by the respective primary scans are thus shown together. The symbol 'n' accordingly means an arbitrary integer.

In these examples, four of the 2×2 dots are formed by different primary scans, so that the final ratio of small dots to large dots can be regulated to one to one, one to three, or three to one. Another possible structure adequately selects the nozzle pitch and the number of repeats of scan and causes the six dots included in a basic 2(3 unit to be formed by different primary scans. This sets the final ratio of small dots to large dots equal to one to one (three to three), one to two (two to four), or one to five. In a similar manner, any different ratio, such as one to seven, is also realized.

Figure 21:
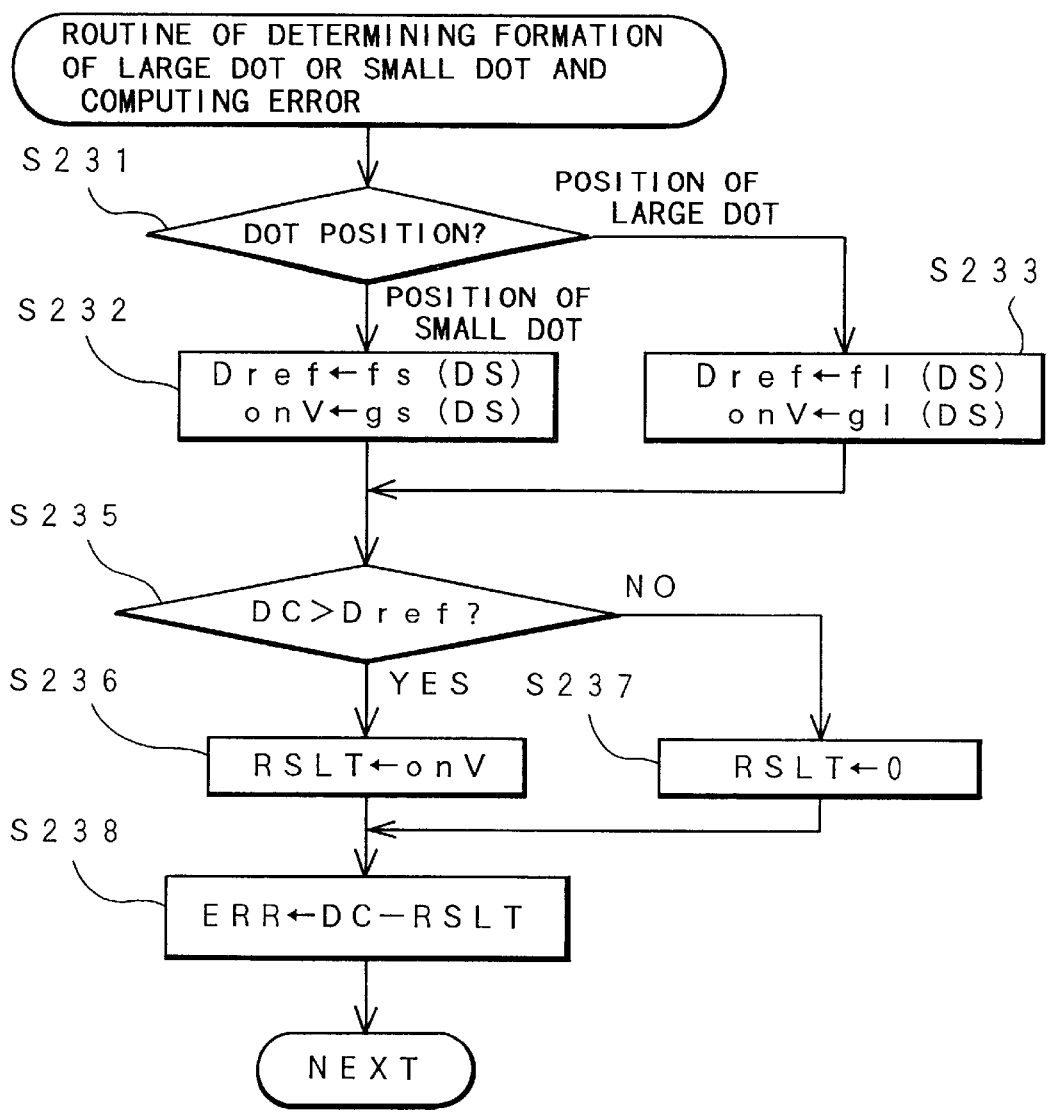
FIG. 21 is a flowcart showing another routine of determining formation of a large dot or a small dot and computing an error.
Figure 22:
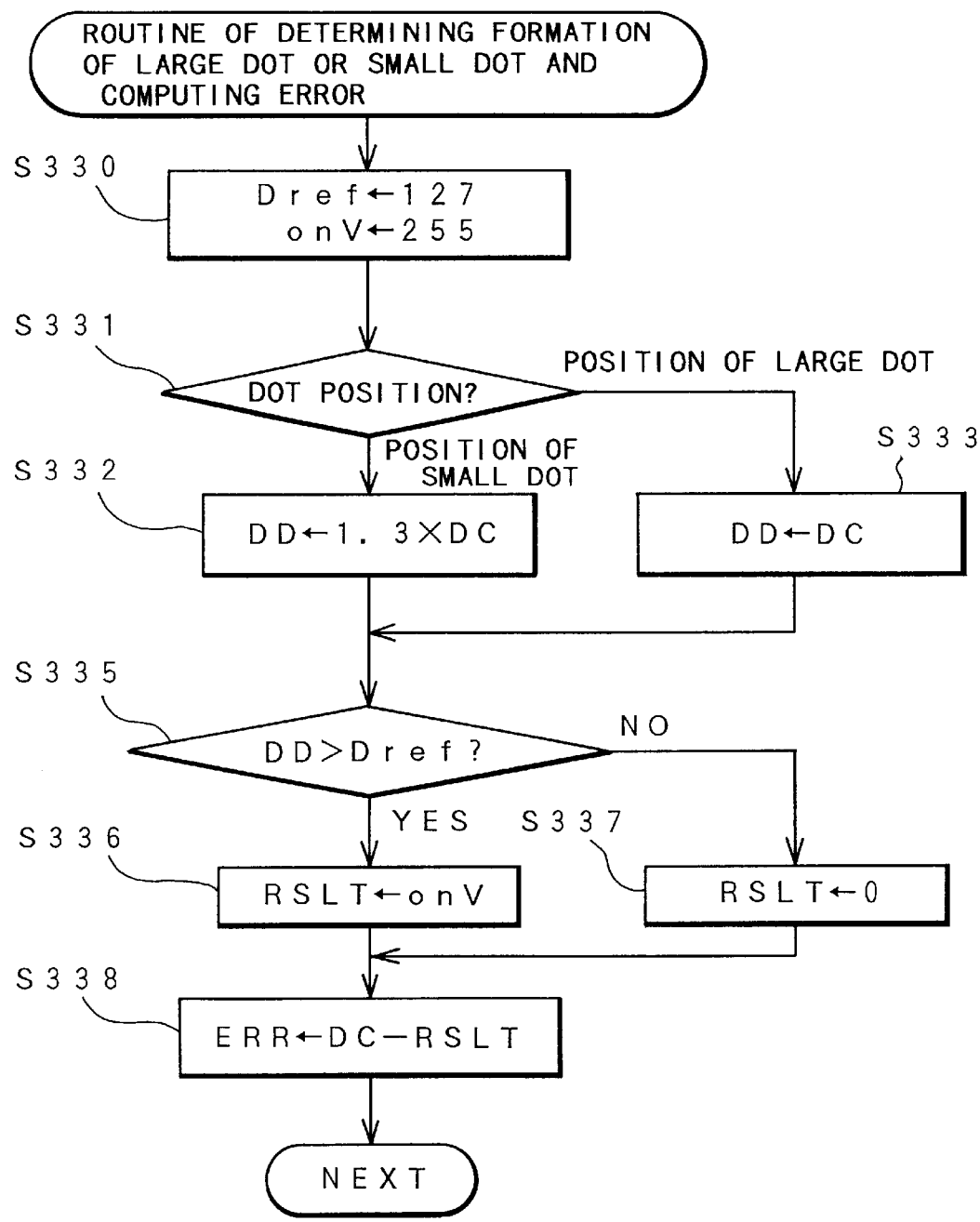
FIG. 22 is a flowchart showing still another routine of determining formation of a large dot or a small dot and computing an error.

The first through the third embodiments discussed above generate an image including both small dots and large dots with the heads that can form only the dots of an identical diameter in each primary scan. The first through the third embodiment determine formation of a large dot or a small dot according to the routine of FIG. 14. There are, however, various modifications in this processing. The flowcharts of FIGS. 21 and 22 show other processes of determining formation of a large dot or a small dot and computing the error. In the routine of FIG. 21 for determining formation of a large dot or a small dot and computing the error, the program first determines the position of the dot at step S231 and calculates the threshold value Dref and the on-value onV using functions fs and gs or functions fl and gl of the input tone data DS at step S232 or S233. The processing of steps S235 through S238 executed after the computation of the threshold value Dref and the on-value onV is identical with that of the first embodiment.

In this embodiment, the function is different between the position where a small dot is formed and the position where a large dot is formed. An example of such a function is given below:

| fs(DS) = 127 − (127 − DS)/2 | where DS < 127 |
| = 127 | where DS 127 |
| fl(DS) = 127 (fixed value) | |

The threshold value Dref is determined according to these functions based on the input tone data. When the tone data DS is not less than 127, the threshold values Dref for the large dot and the small dot are equal to each other. This means that the ratio of small dots to large dots becomes closer to one to one at the lower tone data, compared with the example shown in the first embodiment. The functions gs and gl used for calculating the on-value onV may be identical with the above functions or defined, for example as:

$$gs(DS)=255+(255-DS)\times K$$
$$gl(DS)=gs(DS)/2$$

where K denotes an arbitrary integer of not less than 1. For example, in the case of K=1, the on-value onV is set to the 2-fold value 510, upon condition that DS is substantially equal to zero. In a similar manner, the on-value onV is set to the 3-fold value in the case of K=2 and to the 4-fold value in the case of K=3.

In another example, the following functions may be used to determine the threshold value Dref:

| fs(DS) = 127 − (127 − DS)/2 | where DS < 127 |
| = 127 | where DS 127 |
| fl(DS) = 127 | where DS < 127 |
| = 127 − (127 − DS)/2 | where DS 127 |

In this case, the ratio of large dots is increased in the area of intermediate or higher density. This effectively reduces unevenness that often appears as streaks in images of intermediate density. Compared with the small-diametral dots, large-diametral dots have a wider overlapping area and are thus not significantly affected by the deviation of dot position. In the area of intermediate density, the quality of picture is improved more by the effect of the greater ratio of large-diametral dots that prevents unevenness appearing as streaks than by the effect of the greater ratio of small-diametral dots that reduces the degree of granularity. The increased ratio of large dots in the area of intermediate density thus improves the quality of the recorded image as a whole.

FIG. 22 shows another routine of determining formation of a large dot or a small dot and computing the error. This procedure varies the data itself used for determination, instead of varying the threshold value Dref. In the routine of FIG. 22, the program first sets the threshold value Dref equal to 127 and the on-value onV equal to 255 at step S330, and then determines the position of dot formation at step S331. Only when it is determined that the dot position corresponds to the position where a small dot is formed, decision data DD is obtained by multiplying the corrected tone data DC by 1.3 at step S332. When it is determined that the dot position corresponds to the position where a large dot is formed, on the other hand, the corrected tone data DC is set to the decision data DD at step S333. The processing of steps S335 through S338 is identical with that of the first embodiment.

Like the first embodiment, the routine of FIG. 22 increases the probability of formation of small dots in the area of low tone data, whereas making the ratio of small dots to large dots approach to one to one in the area of high tone data.

Some techniques of determining formation of a large dot or a small dot have been described above. The determination is, however, not restricted to these techniques, and there are a number of variations. The first through the third embodiments discussed above regard multi-color images with four color inks, black, cyan, magenta, and yellow. The principle of these embodiments may, however, be applicable to multi-tone recording (gray scale) of monochromatic images only with black ink. In case that dots of three or more different diameters can be formed with each ink, the applicable procedure varies the probability of formation of the respective dots according to the positions where the dots of the respective diameters are formed and carries out n-coded conversion.

In one possible structure, dots of different diameters, for example, large dots and small dots, are formed with light ink of lower density and dark ink of higher density. In this case, the principle of the above embodiments may be combined with formation of dots with the light ink and the dark ink. These light ink and dark ink may be pigment-type inks or dye-type inks.

Figure 23:
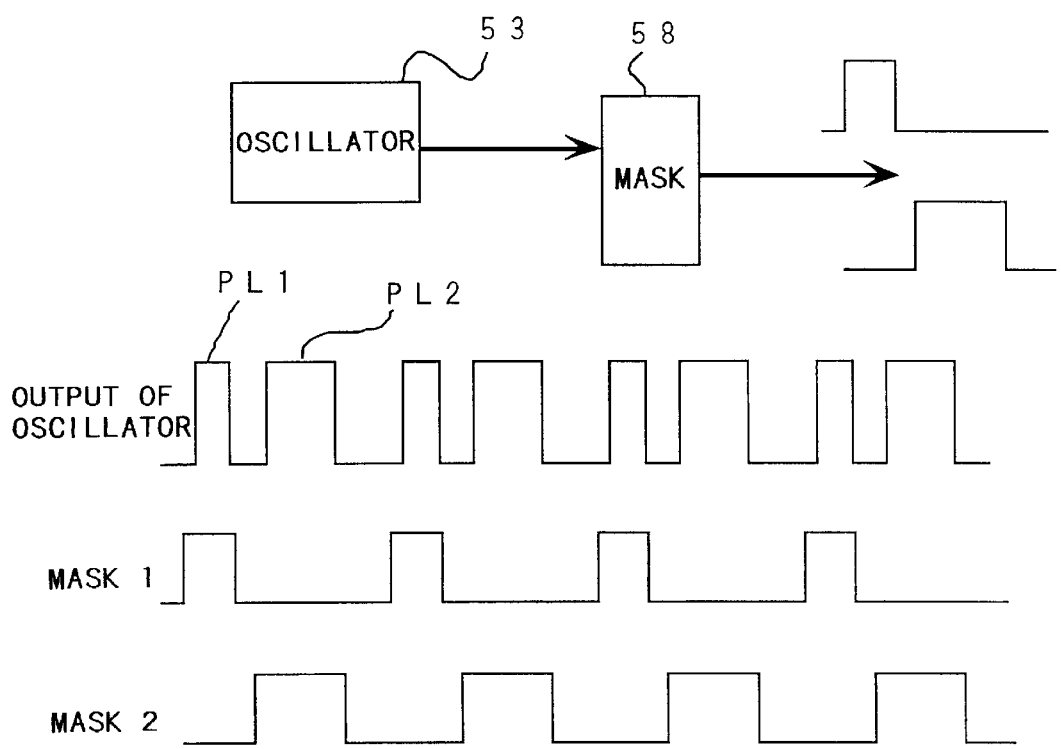
FIG. 23 shows another possible circuit structure for generating pulse signals to form dots of different diameters.

The above embodiments form the dots of different diameters by selecting one of the two oscillators that output pulse signals of different duties. Another available structure shown in FIG. 23 masks either one of two pulses PL1 and PL2 included in a signal output from a single oscillator 53 with a mask 58. The masking process changes the driving time of the piezoelectric element PE and thereby varies the size of the ink particles Ip spouted and the diameter of the dots. In this example, when neither of the pulses are masked, the piezoelectric element PE is driven by both the pulses PL1 and PL2 to form the largest-diametral dots. This structure is accordingly used to form dots of three different diameters, where the diameter decreases in the order of (1) masking neither of the pulse signals, (2) masking the pulse signal PL1, and (3) masking the pulse signal PL2.

In a printer that supplies electricity to a heater disposed in an ink conduit and spouts ink by means of bubbles generated in the ink conduit, the size of the spouted ink particles Ip and the diameter of dots is varied by regulating the time of supply of electricity to the heater. Another possible application disposes plural types of heaters having different characteristics in the ink conduit and regulates the dot diameter by selecting one heater to which the electricity is supplied. The principle of the present invention is further applicable to thermal transfer printers, thermal sublimation printers, and laser printers with LED arrays.

Other than the basic system discussed in the above embodiments, a variety of recording systems are applicable for recording dots. For example, a partial overlap may be realized by a recording system with overlap of nozzles. The term 'partial overlap' implies the recording system in which rasters recorded by one nozzle and rasters recorded by a plurality of nozzles. In the recording system of the partial overlap, the number of effective nozzles Neff can be defined like the above embodiments. For example, in the partial overlap system where two of the four nozzles cooperate to record one identical raster and the remaining two nozzles respectively record one raster, the number of effective nozzles Neff is equal to 3.

In the above embodiments, the quantity of secondary scanning feed is fixed to a predetermined number of dots. Another possible application changes the relationship between the nozzle pitch and the quantity of feed, so as to vary the quantity of feed in every secondary scan for forming dots. This structure changes the order of formation of dots in a predetermined area and thus prevents ink from blurring between adjoining dots.

Figure 24:
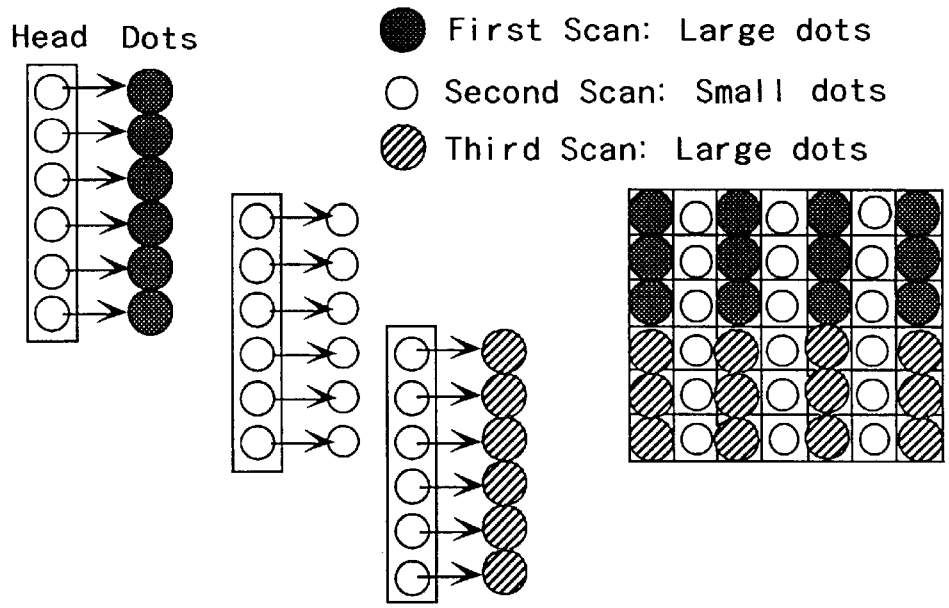
FIG. 24 shows other example of formation of large dots and small dots.
Figure 25:
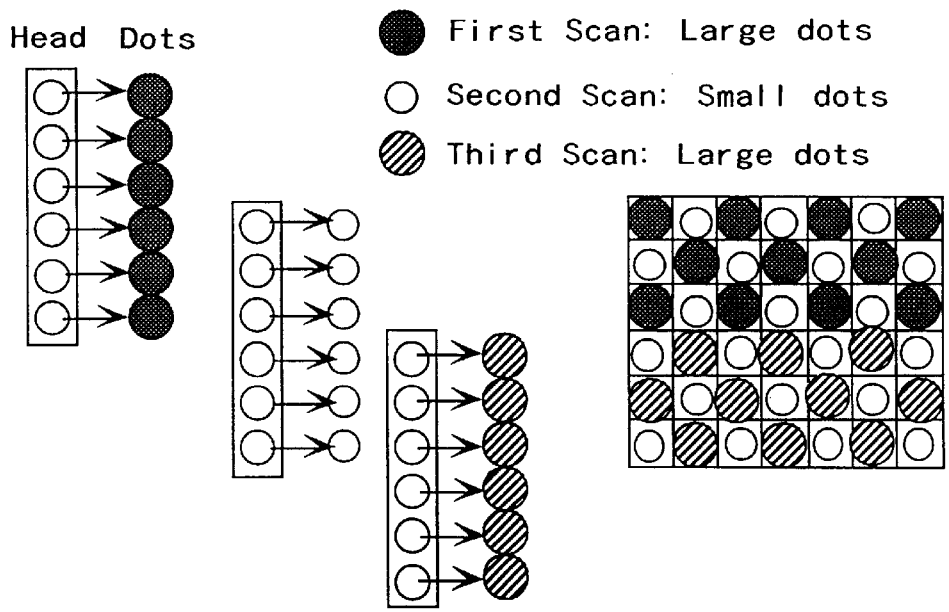
FIG. 25 shows still another example of formation of large dots and small dot.

Still another possible structure arranges a plurality of nozzles at the pitch identical with the pitch of the formed dots and sets the quantity of secondary scanning feed equal to the plurality of nozzles. Like the above embodiments, this structure realizes the overlap system and forms large dots and small dots at a predetermined ratio. FIG. 24 shows an example under the conditions of the nozzle pitch k=1, the number of nozzles used N=6, the quantity of secondary scanning feed L=3 (dots), and the number of repeats of scan s=2. This example forms large dots and small dots at every other secondary scanning feed and makes the final ratio of small dots to large dots equal to one to one. In the example of FIG. 24, each primary scan forms dots alternately. When the nozzles are replaced at every dot in the primary scanning direction as shown in FIG. 25, the same nozzle structure forms large dots and small dots in a zigzag arrangement.

The principle of the present invention is also applicable to a printer and a printing method that allow printing in dual directions. In this case, for example, large-diametral dots are formed during a shift of a head in a predetermined direction (for example, forward direction), whereas small-diametral dots are formed during a shift of the head in the opposite direction (for example, backward direction). Compared with the single-way printing, the dual-direction printing generally has difficulties in maintaining the positional accuracy with respect to each feeding direction of the print head and may result in the poor quality of a recorded image, although the printing speed is doubled. In the structure of the present invention, formation of a large dot or a small dot is determined according to the printing position. This structure makes the difference in position of dot formation between the forward direction and the backward direction inconspicuous, compared with the case of forming dots of an identical diameter. The positional deviation in the feeding direction of the print head is most conspicuous when vertical lines, such as ruled lines, are printed. Ruled lines are, however, generally made of only the large-diametral dots (or deep dots). Since the dots constituting the ruled lines are formed during a shift of the print head in a single direction, there is no substantial effect of the positional deviation due to the dual-direction printing on the ruled lines. In case that the final ratio of large-diametral dots to small-diametral dots is set equal to one to three, the large-diametral dots are formed during a shift of the print head in one direction, whereas the small-diametral dots a re formed during shifts of the print head in both the forward direction and the backward direction. The small-diametral dots are generally used for producing images of low-density areas and not used for constituting characters and ruled lines, thereby not being substantially affected by the positional deviation due to the dual-direction printing.

The following describes a fourth embodiment according to the present invention. An ink jet printer 400 of the fourth embodiment includes a print head 401, a primary scan driving unit 402, a secondary scan driving unit 404, a driving unit controller 405, a primary scan number counter 406, a data storage unit 407, a print head drive controller 408, and a print head driving unit 409 as shown in FIG. 26.

Figure 27:
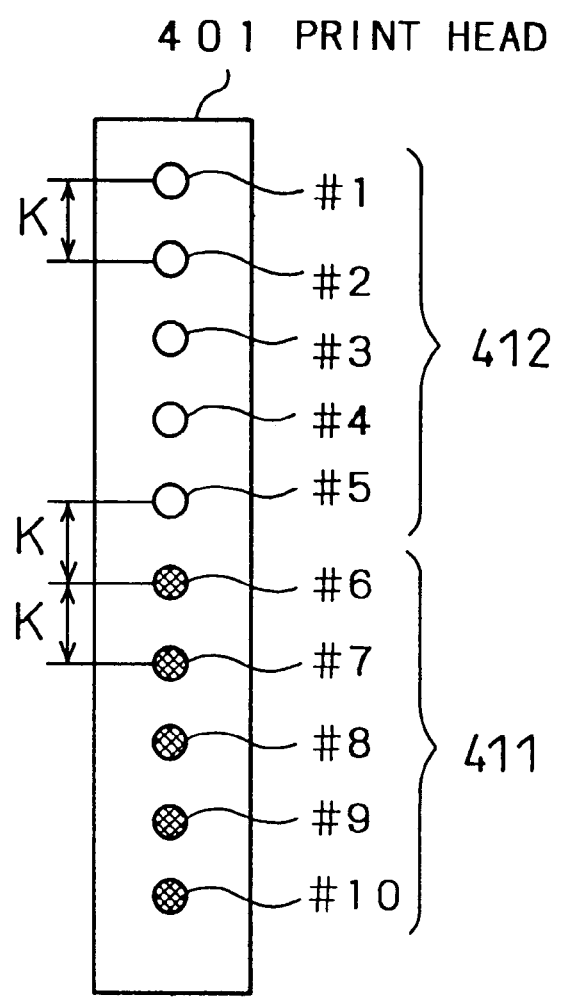
FIG. 27 shows a print head used in the ink jet printer of FIG. 26.

The print head 401 has a nozzle array including a predetermined number of nozzles that are arranged at fixed nozzle pitches. In a concrete example, the print head 401 has ten nozzles #1 through #10 arranged in the secondary scanning direction as illustrated in FIG. 27. These nozzles #1 through #10 are divided into two groups; that is, a first nozzle group 411 including five nozzles #6 through #10 and a second nozzle group 412 including five nozzles #1 through #5. Namely the print head 401 has the first nozzle group 411 and the second nozzle group 412 aligned in the secondary scanning direction. In the first nozzle group 411 or the second nozzle group 412, the respective nozzles #6 through #10 or #1 through #5 are arranged at the intervals of k-dot pitch. The interval between the first nozzle group 411 and the second nozzle group 412 is also the k-dot pitch. The dot pitch here implies the distance between adjoining dots formed on a printing medium 403. When the two nozzles #1 and #2 are separate from each other by the k-dot pitch, (k−1) dots may exist between the nozzles #1 and #2.

Figure 26:
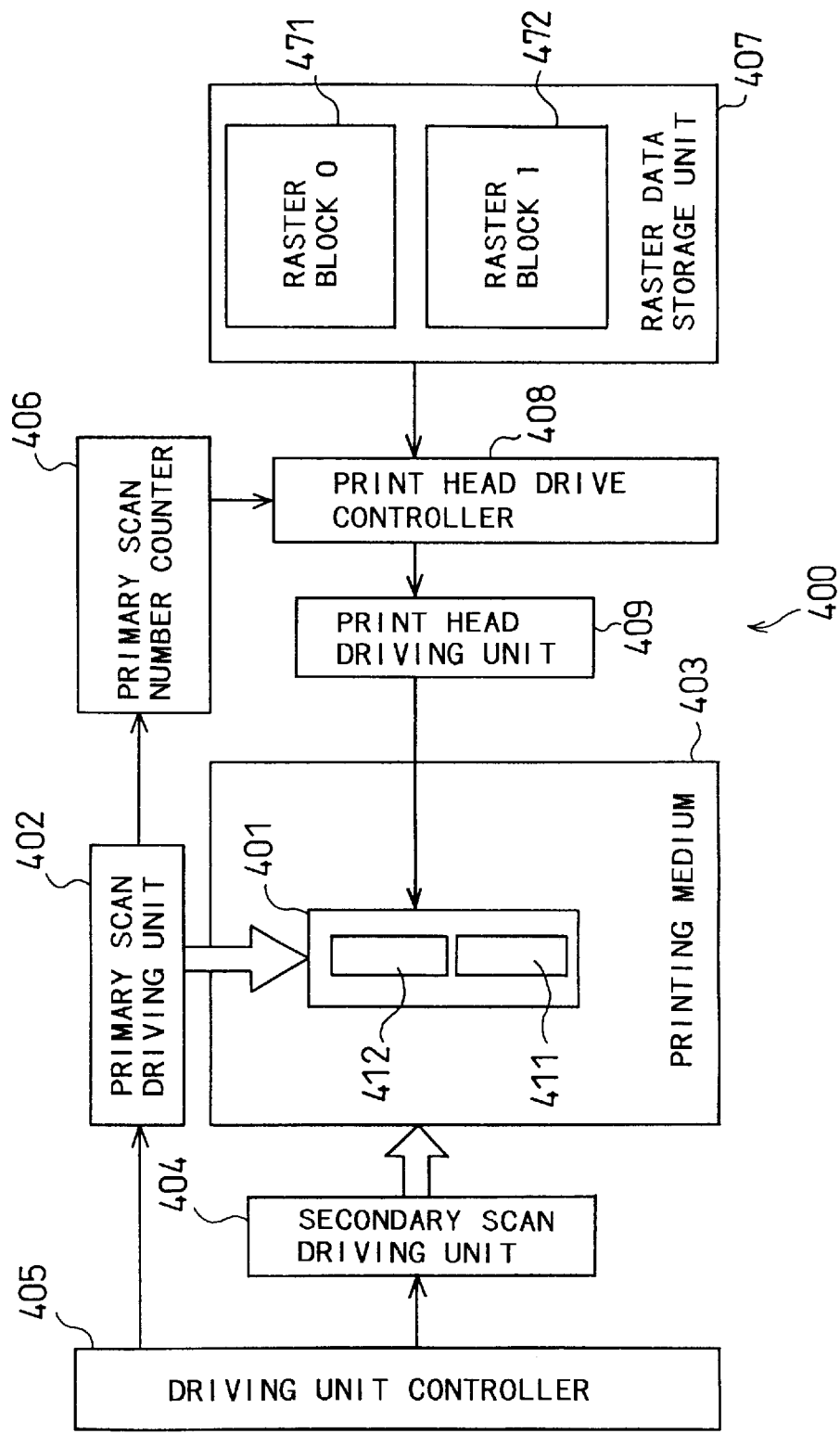
FIG. 26 is a block diagram illustrating structure of an ink jet printer as a fourth embodiment according to the present invention.

The primary scan driving unit 402 drives the print head 401 in the primary scanning direction or the direction of the width of the printing medium 403, that is, from side to side in the drawing of FIG. 26. The secondary scan driving unit 404 feeds the printing medium 403 in the secondary scanning direction.

The driving unit controller 405 controls the primary scan driving unit 402 and the secondary scan driving unit 404 to regulate the driving amount and the driving timing of the print head 401 and the printing medium 403. The driving unit controller 405 executes the non-illustrated processing to shift the print head 401 in the primary scanning direction to a predetermined position relative to the printing medium 403. The driving unit controller 405 also controls the secondary scan driving unit 404 to realize a feed operation mode, which feeds the printing medium 403 by n dots at the time of conclusion of one primary scan.

The primary scan number counter 406 counts the number of primary scans (the number of paths) in a current head driving mode (large-diametral dot spouting mode or small-diametral dot spouting mode). In other words, the primary scan number counter 406 counts the path number of primary scans after the print head 401 is switched to the current head driving mode (large-diametral dot spouting mode or small-diametral dot spouting mode).

The data storage unit 407 is a memory or more specifically a semiconductor RAM, in which print image data including multi-valued tone information are stored. The data storage unit 407 has a plurality of data block areas, for example, a first raster block (raster block 0) 471 and a second raster block (raster block 1) 472. In the fourth embodiment, data for forming large-diametral dots and those for forming small-diametral dots have respectively been stored in the first raster block 471 and the second raster block 472, prior to a start of printing.

The print head drive controller 408 is a circuit for switching the head driving mode at every predetermined number of paths, for example, at every 4 paths, in response to the output from the primary scan number counter 406. In the large-diametral dot spouting mode, the print head drive controller 408 reads the data for forming large-diametral dots from the first raster block 471 and applies a driving pulse to the print head 401 via the print head driving unit 409. In the small-diametral dot spouting mode, on the other hand, the print head drive controller 408 reads the data for forming small-diametral dots from the second raster block 472 and applies a driving pulse to the print head 401 via the print head driving unit 409. The print head driving unit 409 controls supply of electricity to the print head 401 to spout ink onto the printing medium 403 based on the print image data stored in the data storage unit 407. The detailed structure of the print head driving unit 409 is similar to that of the first embodiment (see FIGS. 6 and 7).

Figure 28:
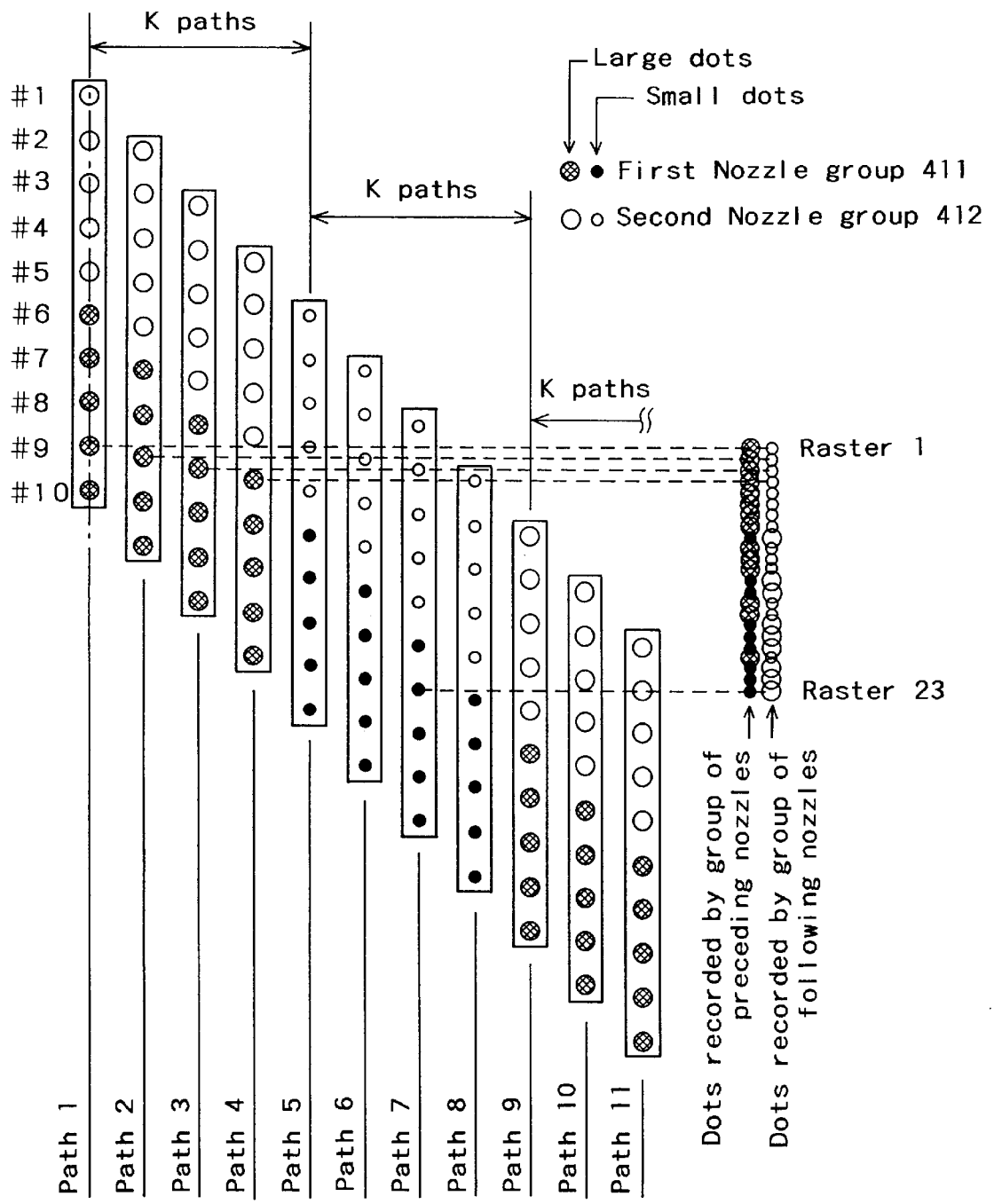
FIG. 28 shows a typical operation of the ink jet printer of FIG. 26.

FIG. 28 shows a typical operation of the ink jet printer 400 thus constructed. In this ink jet printer 400, the printing medium 403 is fed upward after a primary scan path of the print head 401. This causes the print head 401 to be displaced in the opposite direction or downward relative to the printing medium 403. In the illustration of FIG. 28 and the description below, it is assumed that the print head 401 is shifted downward after a primary scan path. In the example of FIG. 28, the dot pitch k representing the distance between the adjoining nozzles is set equal to 4 (k=4), and the number of nozzles n used for printing in the first nozzle group 411 and in the second nozzle group 412 is set equal to 5 (n=5).

The ink jet printer 400 of the fourth embodiment under such conditions drives the five nozzles #6 through #10 included in the first nozzle group 411 to print large-diametral dots alternately in the primary scanning direction during one primary scan and subsequently feeds the printing medium 403 by n dots. This process corresponds to one path. After repeating this path k times (four times in this embodiment), the ink jet printer 400 drives the five nozzles #1 through #5 included in the second nozzle group 412 to print small-diametral dots alternately in the primary scanning direction during one primary scan, and subsequently feeds the printing medium 403 by n dots. This path is also repeated k times. This results in forming the small-diametral dots and the large-diametral dots alternately in the primary scanning direction. This processing unit is called a raster-forming step. An image is printed on the printing medium 403 by repeating the raster-forming step. In order to realize this raster-forming step, the driving unit controller 405 controls the primary scan driving unit 402 and the secondary scan driving unit 404, whereas the print head drive controller 408 controls the print head driving unit 409.

Repeating the raster-forming step completes printing on the printing medium 403. A nozzle included in the first nozzle group 411 (the nozzle for forming the large-diametral dots) and a nozzle included in the second nozzle group 412 (the nozzle for forming the small-diametral dots) pass through the same raster. Dots are formed alternately with the two different nozzles passing through the same raster. In the example shown in FIG. 28, one raster is formed by a predetermined combination of nozzles, such as the nozzles #9 and #4, the nozzles #8 and #3, and the nozzles #7 and #2.

The right side of FIG. 28 shows the case in which all the dots are formed as rasters 1 through 23. Among the illustrated rasters, the left-side column shows dots recorded on the printing medium 403 in the respective paths by the group of preceding nozzles (the first nozzle group 411). The right-side column shows dots recorded on the printing medium 403 in the respective paths by the group of following nozzles (the second nozzle group 412). As clearly shown in FIG. 28, large-diametral dots or small-diametral dots are not continuously formed in the primary scanning direction.

Figure 29:
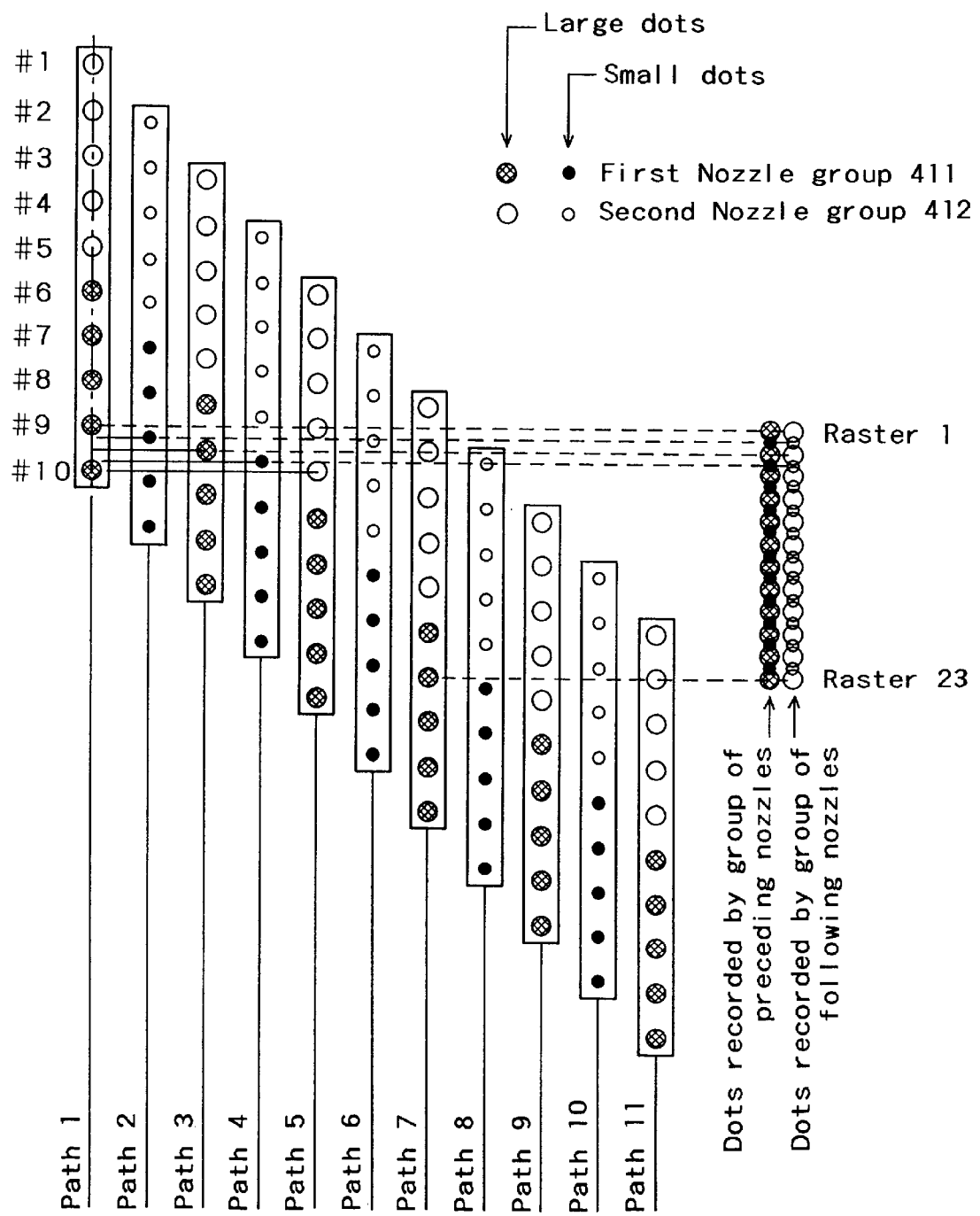
FIG. 29 shows an operation of the ink jet printer of FIG. 26 according to the prior art system.

One modification of the raster-forming step in the fourth embodiment is shown in FIG. 29. FIG. 29 illustrates the state of dot formation when spout of large-diametral dots and spout of small-diametral dots are switched on every path. In this case, the large-diametral dots recorded on the printing medium 403 by the group of preceding nozzles (first nozzle group 411) and the small-diametral dots recorded on the printing medium 403 by the group of following nozzles (second nozzle group 412) are arranged alternately in the secondary scanning direction. In the primary scanning direction, both the two nozzles passing through one raster form either the large-diametral dots or the small-diametral dots. One raster is accordingly made of dots of an identical diameter.

Figure 30:
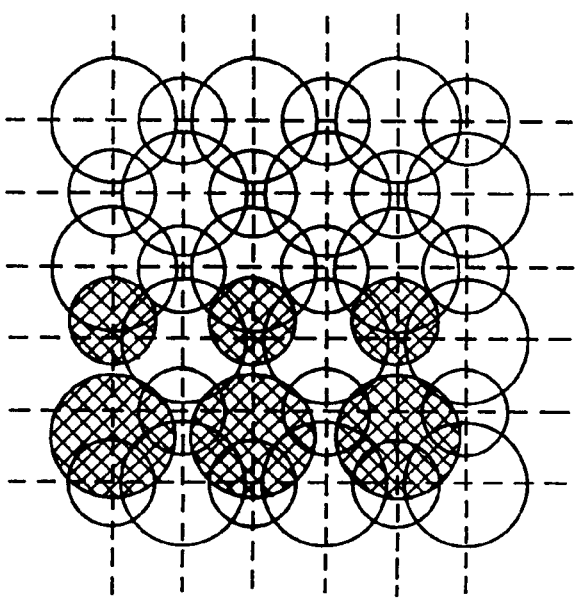
FIG. 30 shows a printing result by the structure of the fourth embodiment.
Figure 31:
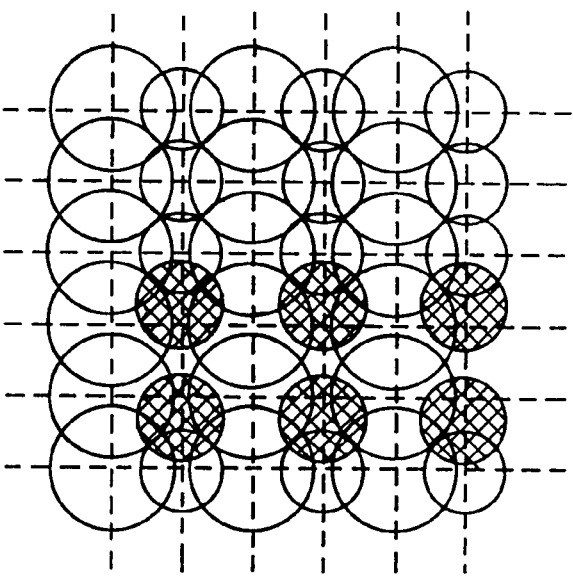
FIG. 31 shows another printing result by the structure of the fourth embodiment.

When the nozzle structure and the raster-forming step shown in FIG. 28 are adopted and the dot forming positions in the primary scanning direction are replaced on every primary scan, the large-diametral dots and the small-diametral dots are formed in a zigzag arrangement. In the structure of FIG. 28, the positions of forming dots on the odd paths 1, 3, 5, . . . in the primary scanning direction are replaced with the positions of forming dots on the even paths 2, 4, 6, . . . in the primary scanning direction. The print head drive controller 408 controls the print head driving unit 409 and determines whether the nozzles are to be driven on every primary scan and thereby readily replaces the dot forming positions. FIG. 30 shows an example of dot formation in this case. FIG. 31 shows an example of dot formation according to the technique of the fourth embodiment (FIG. 28).

In case that large-diametral dots and small-diametral dots are formed in a zigzag arrangement as shown in FIG. 30, the driving unit controller 405 and the print head drive controller 408 function to arrange the large-diametral dots and the small-diametral dots in the secondary scanning direction as discussed above. The arrangement of the large-diametral dots and the small-diametral dots in the primary scanning direction is realized, for example, by arranging large-diametral dots and small-diametral dots alternately in the image processing step prior to the storage of the print image data into the data storage unit 407.

In the examples of FIGS. 30 and 31, an error in formation of nozzles or a feed deviation of the printing medium may cause a curved spout, which results in deviation of the dot forming positions as shown by the hatched dots. When a mechanical error exists in nozzles adjoining to each other in the secondary scanning direction, a curved spout may deviate the positions of adjoining dots in opposite directions. In this case, the deviated arrangement of the large-diametral dots and the small-diametral dots causes the unevenness of density, especially in the white background without ink spouts.

In the example of FIG. 30, there is a smallest overlap of dots, so that the area of the white background can be minimized even in the case of deviation of dot forming positions. In case that the positions of the small-diametral dots are deviated as shown in the example of FIG. 31, the area of the white background is increased. This area, however, does not extend in the primary scanning direction and is thereby not observed as a white streak. Even when the positions of the large-diametral dots are deviated in the example of FIG. 31, a large overlap of dots in the secondary scanning direction substantially prevents the adverse effect on the printing quality.

Figure 32:
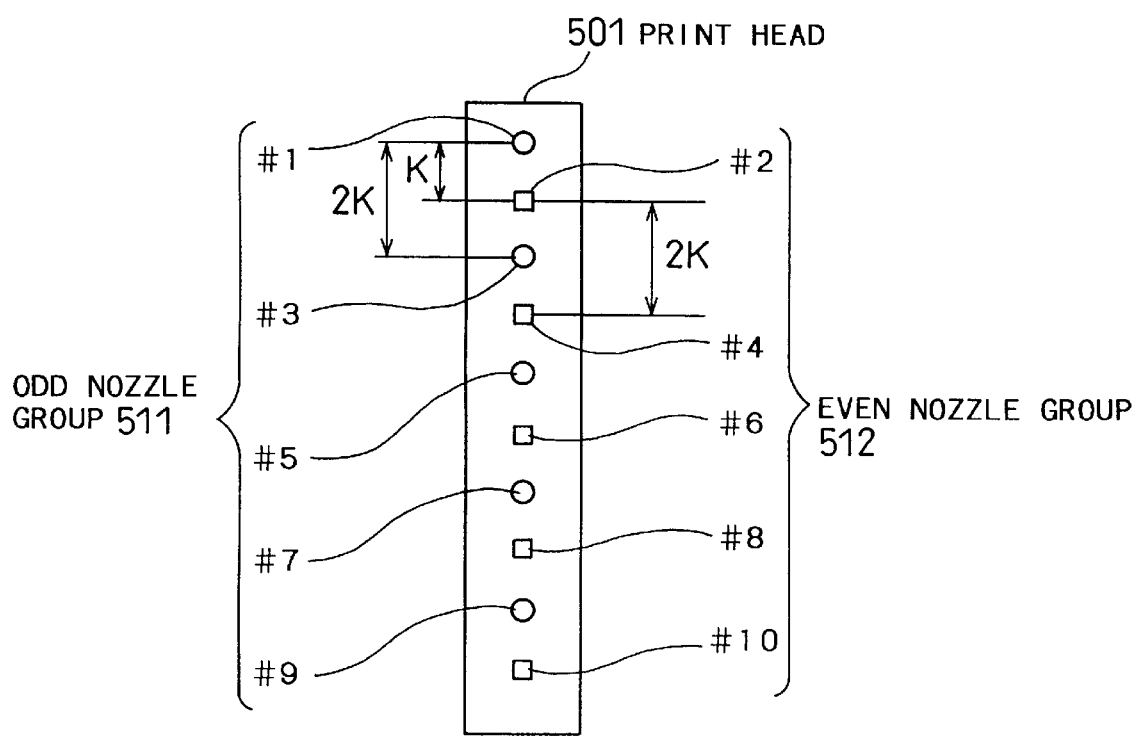
FIG. 32 shows a print head used in an ink jet printer of a fifth embodiment according to the present invention.

In the fourth embodiment, the nozzle array is divided vertically (in the secondary scanning direction) into two groups, that is, the group of the nozzles #1 through #5 and the group of the nozzles #6 through #10. In a fifth embodiment according to the present invention shown in FIG. 32, a print head 501 has ten nozzles #1 through #10, which are divided into two groups, that is, nozzles of odd numbers #1, #3, . . . ,#9 and nozzles of even numbers #2, #4, . . . ,#10. An odd nozzle group 511 includes the five nozzles of odd numbers, whereas an even nozzle group 512 includes the five nozzles of even numbers. Namely the nozzles in these two groups are alternately arranged. In the drawing of FIG. 32, for the matter of convenience, the nozzles included in the odd nozzle group 511 are shown by open circles, and the nozzles included in the even nozzle group 512 are shown by open squares. The respective nozzles included in the odd nozzle group 511 and those included in the even nozzle group 512 are aligned in the secondary scanning direction at the intervals of k-dot pitch.

On the print head 501, the nozzles #1,#3, #5, #7, and #9 included in the odd nozzle group 511 are separate at the intervals of 2k-dot pitch, whereas the nozzles #2, #4, #6, #8, and #10 included in the even nozzle group 512 are also separate at the intervals of 2k-dot pitch.

Figure 33:
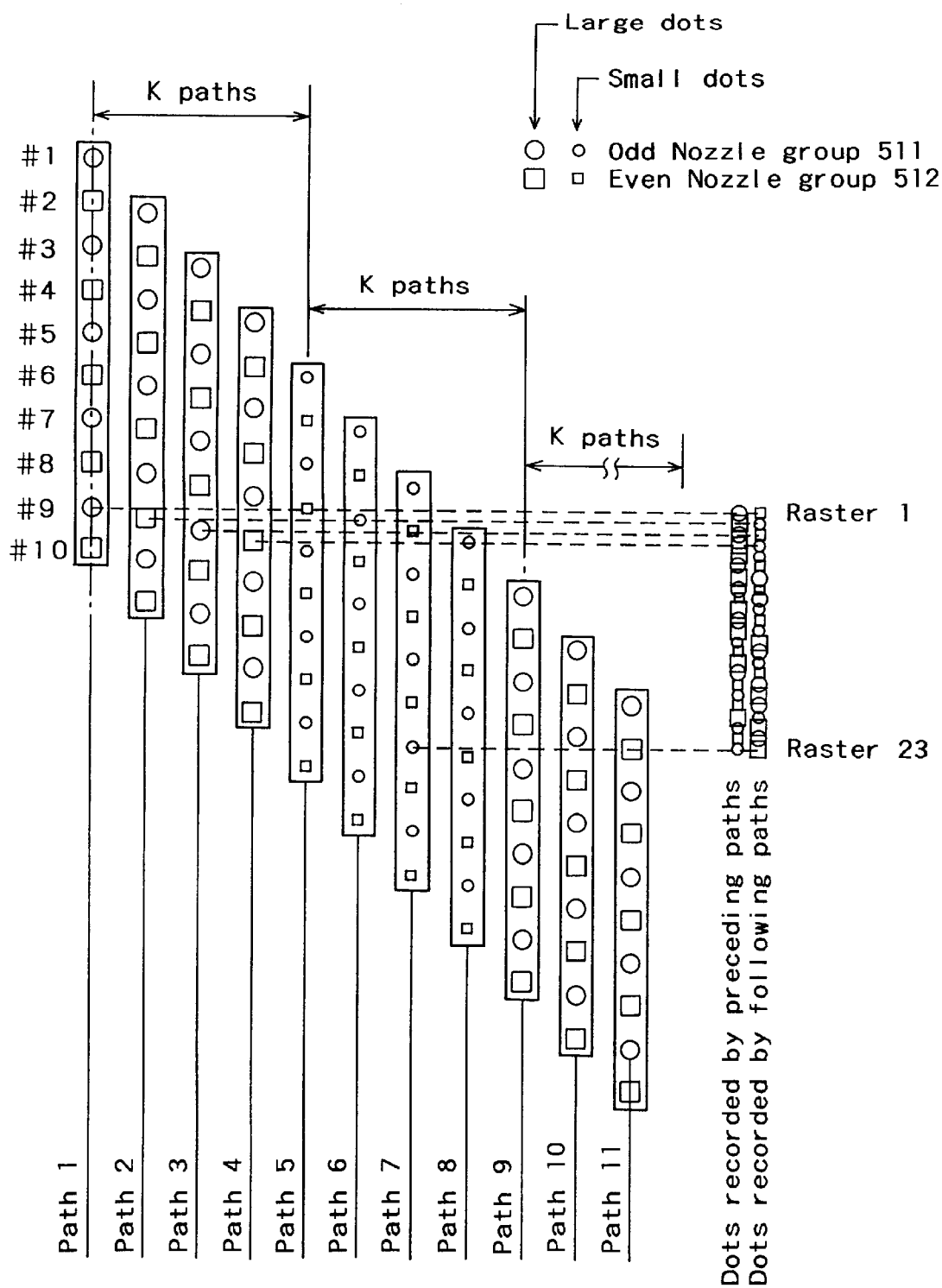
FIG. 33 shows a typical operation of the ink jet printer with the print head of FIG. 32.

The hardware structure of the fifth embodiment is identical with the structure of the fourth embodiment shown in FIG. 26, except the print head 501 shown in FIG. 32. FIG. 33 shows a typical operation of the ink jet printer of the fifth embodiment. In the example of FIG. 33, the dot pitch k representing the distance between the adjoining nozzles is set equal to 4 (k=4), and the number of nozzles n used for printing in the odd nozzle group 511 and in the even nozzle group 512 is set equal to 5 (n=5). The ink jet printer under such conditions prints large-diametral dots using the odd nozzle group 511 and the even nozzle group 512 alternately in one primary scan and feeds the printing medium 403 by n dots. This path is repeated k times. The ink jet printer then prints small-diametral dots using the odd nozzle group 511 and the even nozzle group 512 alternately in one primary scan and feeds the printing medium 403 by n dots. This path is also repeated k times. The above processing unit called a raster-forming step is repeatedly executed to complete printing on the printing medium 403. Like in the fourth embodiment, in order to realize the raster-forming step in the fifth embodiment, the driving unit controller 405 controls the primary scan driving unit 402 and the secondary scan driving unit 404, whereas the print head drive controller 408 controls the print head driving unit 409.

The right side of FIG. 33 shows the dots recorded on the printing medium 403 by the respective preceding paths and the dots recorded on the printing medium 403 by the respective following paths as rasters 1 through 23. As clearly shown in FIG. 33, large-diametral dots or small-diametral dots are not continuously formed in the primary scanning direction.

Figure 34:
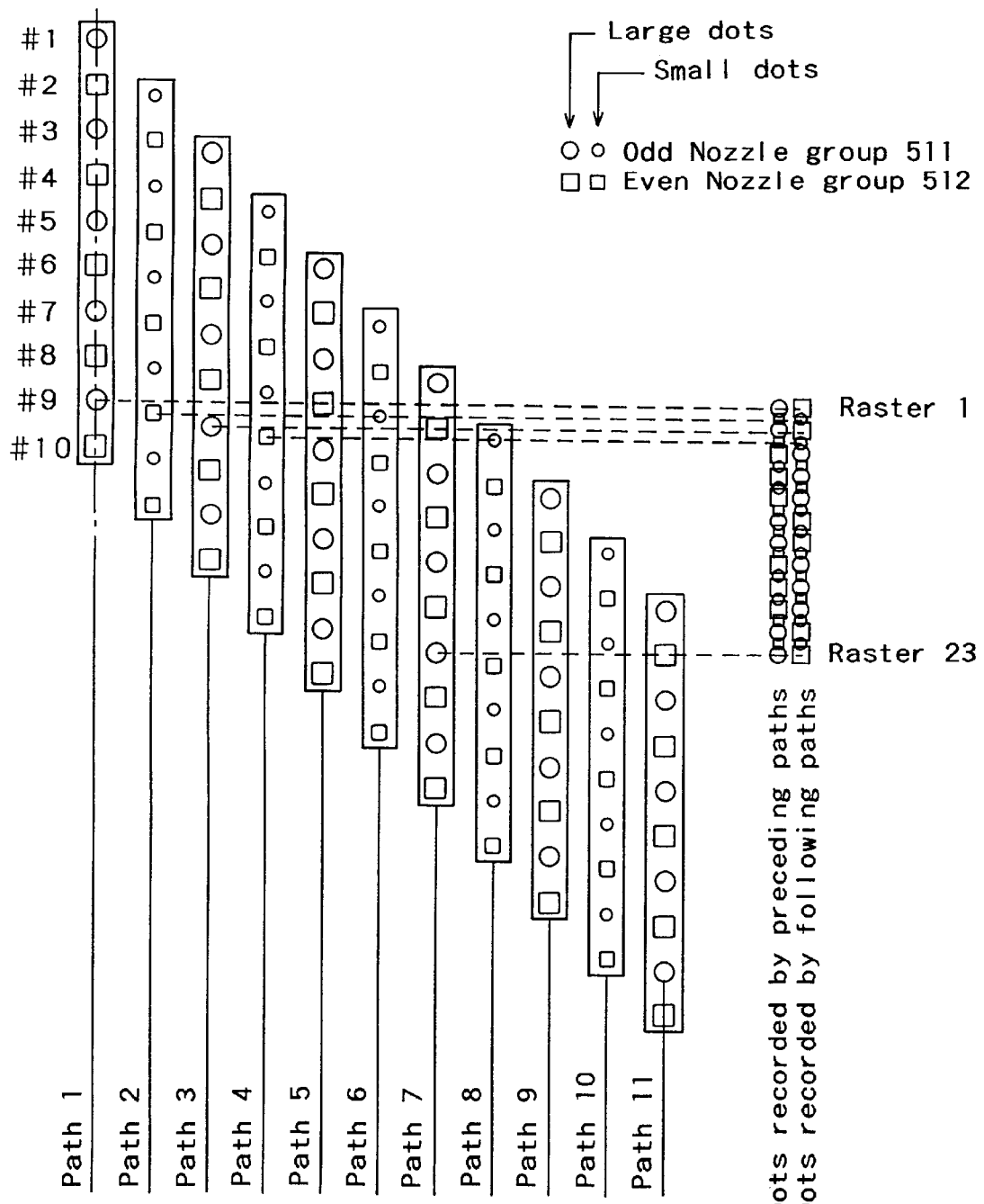
FIG. 34 shows an operation of the ink jet printer with the print head of FIG. 32 according to the prior art system.

One modification of the raster-forming step in the fifth embodiment is shown in FIG. 34. FIG. 34 illustrates the state of dot formation when spout of large-diametral dots and spout of small-diametral dots are switched on every path. In this case, after large-diametral dots are formed by using the odd nozzle group 511 and the even nozzle group 512 alternately on one path, small-diametral dots are formed by using the odd nozzle group 511 and the even nozzle group 512 alternately on next path. This recording system makes the large-diametral dots and the small-diametral dots arranged alternately in the secondary scanning direction.

An ink jet printer of a sixth embodiment according to the present invention has the same hardware structure as that of the fourth embodiment, except the structure of a print head. The print head of the sixth embodiment has a first nozzle group including nozzles #1 through #6 arranged at the intervals of k-dot pitch and a second nozzle group including nozzles #7 through #12 arranged at the intervals of k-dot pitch. The first nozzle group and the second nozzle group are aligned in the secondary scanning direction with the interval of k-dot pitch.

Figure 35:
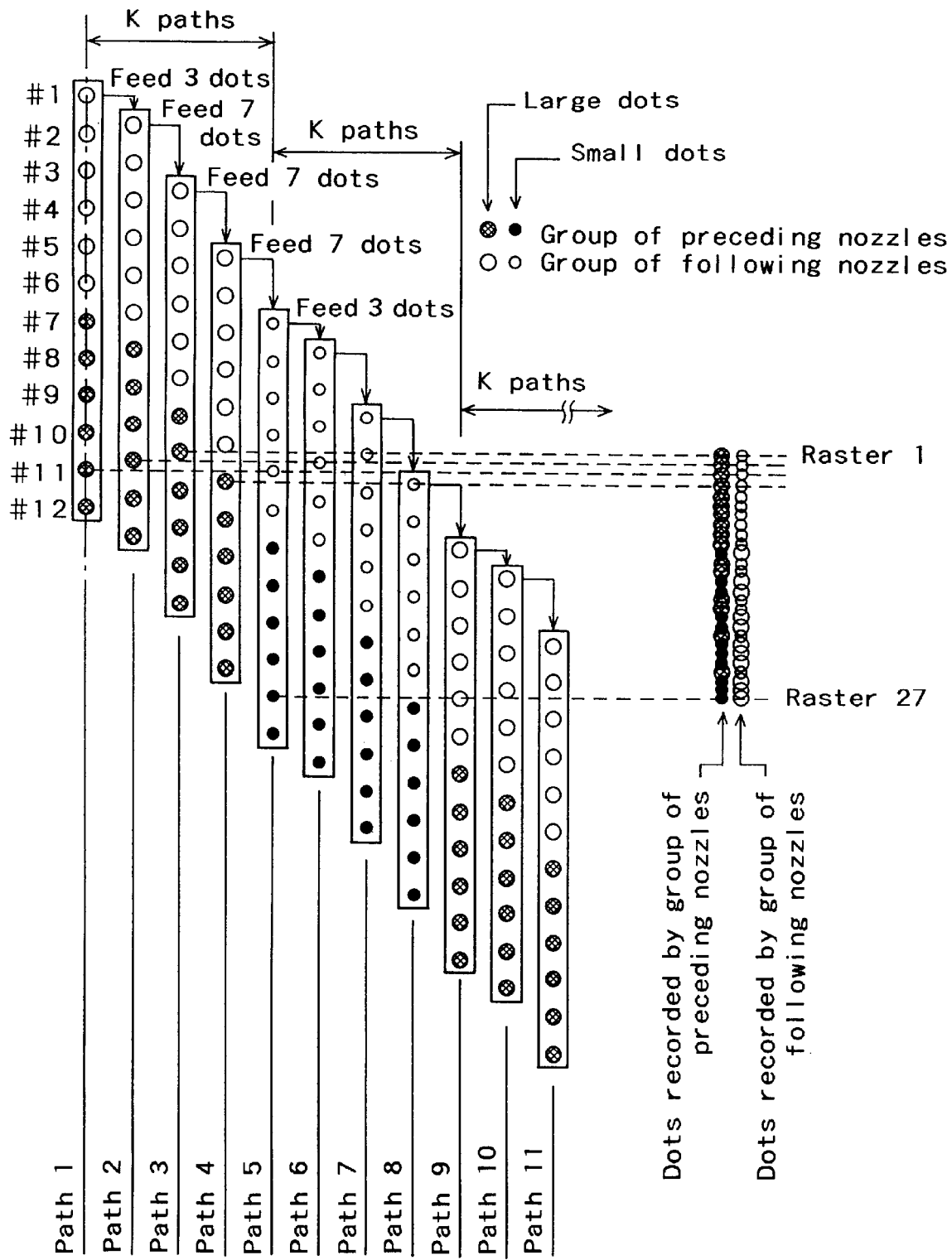
FIG. 35 shows a typical operation of an ink jet printer of a sixth embodiment according to the present invention.

In the example of FIG. 35, the dot pitch k representing the distance between the adjoining nozzles is set equal to 4 (k=4), and the number of nozzles n used for printing in the first nozzle group and in the second nozzle group is set equal to 6 (n=6). The feed of the printing medium in the secondary scanning direction after completion of a primary scan is changed successively as 3 dots, 7 dots, 7 dots, and 7 dots on every path.

The total feed of the printing medium on every four paths is accordingly equal to 24 dots (=3+7+7+7). This is identical with the case of FIG. 28, in which the feed is fixed to 6 dots on every path. The right side of FIG. 35 shows the dots recorded on the printing medium by the group of preceding nozzles (the first nozzle group) and the dots recorded on the printing medium by the group of following nozzles (the second nozzle group) on the respective paths as rasters 1 through 27. As clearly shown in FIG. 35, large-diametral dots and small-diametral dots are alternately arranged in the primary scanning direction.

Figure 36:
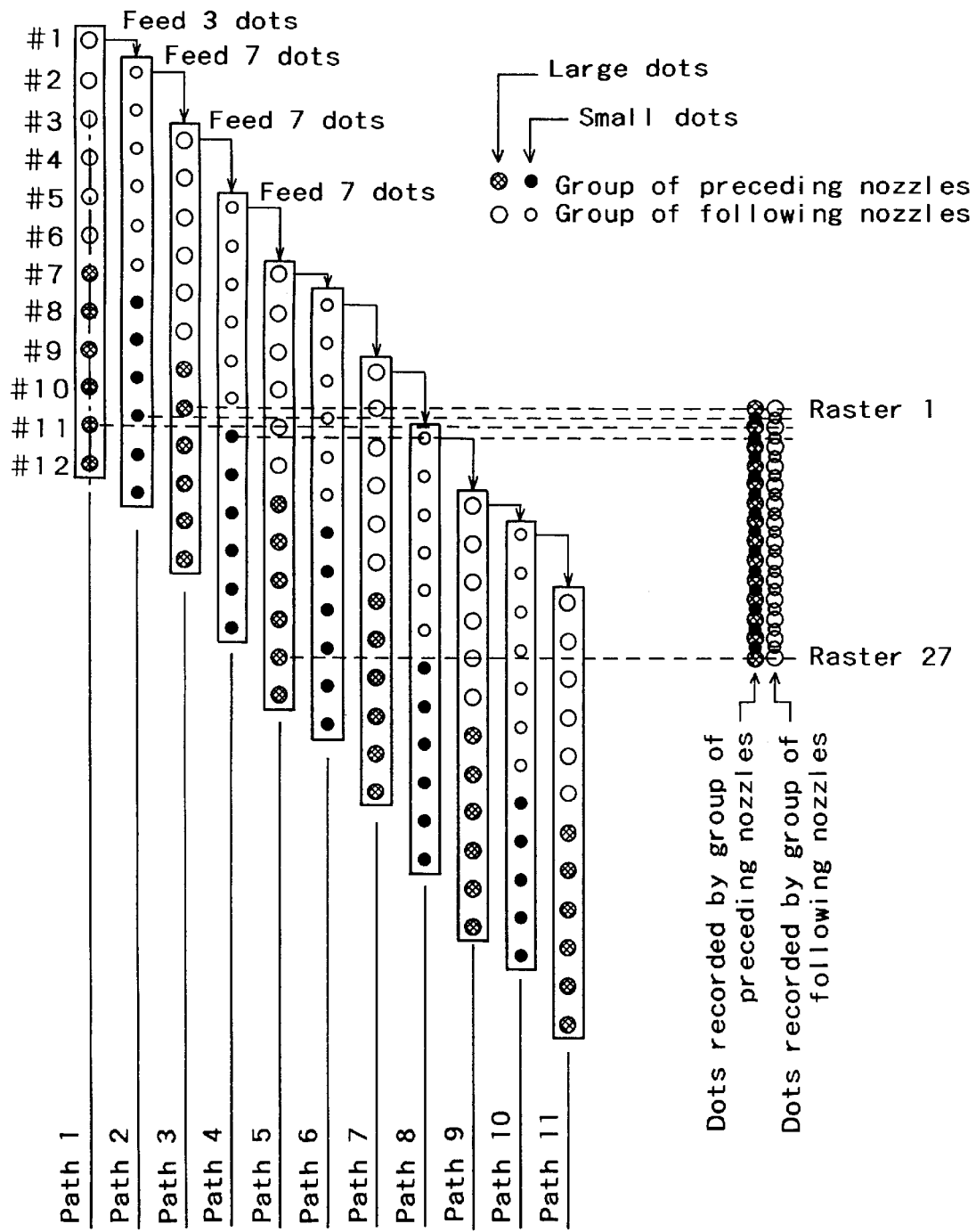
FIG. 36 shows an operation of the ink jet printer of the sixth embodiment according to the prior art system.

FIG. 36 shows another case of dot formation, in which spout of ink for forming large-diametral dots and spout of ink for forming small-diametral dots are alternately carried out on every other path. The example of FIG. 36 executes formation of an image on the printing medium according to the same procedure as that of FIG. 35, except that the diameter of the dots is varied on every other path. The right side of FIG. 36 shows the dots recorded on the printing medium by the group of preceding nozzles (the first nozzle group) and the dots recorded on the printing medium by the group of following nozzles (the second nozzle group). In this case, large-diametral dots and small-diametral dots are alternately arranged in the secondary scanning direction.

In the above embodiments, operation of the ink jet printer is described on the assumption that the value k representing the ratio of the nozzle interval to the interval between the adjoining dots is even. The same operation is, however, realized in the case of k=an odd value. In the case of k=an odd value, the procedure of alternately repeating the path on which the printing medium is fed after print of the dots of a first size and the path on which the printing medium is fed after print of the dots of a second size can complete desired formation of dots.

In the above embodiments, the dots of the first size are greater (have a larger diameter) than the dots of the second size. The principle of the present invention is also applicable to the opposite case, in which the dots of the first size are smaller (have a smaller diameter) than the dots of the second size.

The present invention relates to a printing system, a method of generating an image, and a recording medium for realizing the method. Since the printing system of the present invention described above can record at least two types of dots having different diameters on a printing object, the printing system is applicable to a printer which records a few kind of dots for recording the high-quality images.

What is claimed is:

1. A printing system for recording at least two types of dots having different diameters on a printing object and thereby generating a multi-tone image expressed by recording densities of said at least two types of dots, said printing system comprising:

a head which records a larger-diametral dot out of said at least two types of dots having different diameters at a first position that is determined according to a relative position to said printing object, and records a smaller-diametral dot out of said at least two types of dots at a second position that is different from the first position;

a position specification unit which determines whether said head exists at the first position or at the second position, based on the relative position to said printing object;

an input unit which inputs image data including density information of a target image to be printed; and a multi-valuing unit which carries out a multi-valuing operation corresponding to a number of tones expressible by said at least two types of dots based on the input image data, while changing a condition for formation of a dot according to a type of the dot to be printed at the position of said head specified by said position specification unit.

2. A printing system in accordance with claim 1, said printing system further comprising:

a scanning control unit which causes said head to carry out a primary scan and a secondary scan relative to said printing object, wherein said head repeats the primary scan and the secondary scan via said scanning control unit, so as to record a two-dimensional image, said head having a plurality of dot-forming elements of a predetermined pitch, which are arranged in a secondary scanning direction and forms said at least two types of dots, and forming one type of a dot out of said at least two types of dots on every primary scan, and wherein said multi-valuing unit carries out the multi-valuing operation to form a specified type of a dot based on the input image data on every primary scan in which said head forms one type of a dot.

3. A printing system in accordance with claim 2, said printing system further comprising:

a dot formation unit which causes a quantity of feed of said head in the secondary scanning direction after completion of every primary scan to be different from the predetermined pitch between said plurality of dot-forming elements, so as to form dots on said printing object through a plurality of the primary scans at a pitch narrower than the predetermined pitch between said plurality of dot-forming elements.

4. A printing system in accordance with claim 2, wherein said head comprises a dot-formation array in which a given number of dot-forming elements for forming dots are arranged at an interval of a predetermined pitch in the secondary scanning direction perpendicular to a primary scanning direction, said dot-forming elements included in said dot-formation array being driven simultaneously at a predetermined position in the primary scanning direction.

5. A printing system in accordance with claim 4, wherein said dot-forming elements included in said dot-formation array are nozzles for spouting ink particles, and wherein said given number of dot-forming elements included in said dot-formation array are divided into two groups of dot-forming elements, each group comprising N nozzles, where N denotes an integer of not less than 2, which are arranged in the secondary scanning direction at a nozzle interval of k dots, where k denotes an integer of not less than 2, the two groups of dot-forming elements being apart from each other by the nozzle interval of k dots.

6. A printing system in accordance with claim 5, said printing system further comprising:

a secondary scanning control unit which drives said head and said scanning control unit to repeat a step of repeating a first path k times and subsequently repeating a second path k times, wherein said first path carries out the secondary scan after printing a first-sized dot out of said at least two types of dots having different diameters, and said second path carries out the secondary scan after printing a second-sized dot, which is different in size from the first-sized dot.

7. A printing system in accordance with claim 5, said printing system further comprising:

a secondary scanning control unit which drives said head and said scanning control unit to repeat a step of repeating a first path k times and subsequently repeating a second path k times when the nozzle interval k is an even value, wherein said first path carries out the secondary scan after printing a first-sized dot out of said at least two types of dots having different diameters, and said second path carries out the secondary scan after printing a second-sized dot, which is different in size from the first-sized dot.

8. A printing system in accordance with claim 5, said printing system further comprising:

a secondary scanning control unit which drives said head and said scanning control unit to alternately repeat a first path and a second path when the nozzle interval k is an odd value, wherein said first path feeds said printing object after printing a first-sized dot out of said at least two types of dots having different diameters, and said second path feeds said printing object after printing a second-sized dot, which is different in size from the first-sized dot.

9. A printing system in accordance with claim 6, wherein when a number of nozzles n are used for printing among N nozzles included in said head, where n is a positive integer of not greater than N, k and n are relatively prime.

10. A printing system in accordance with claim 6, wherein said first-sized dot is smaller than said second-sized dot.

11. A printing system in accordance with claim 9, wherein said secondary scanning control unit feeds said printing object by n dots.

12. A printing system in accordance with claim 4, wherein said dot-forming elements included in said dot-formation array are nozzles for spouting ink particles, and wherein said given number of dot-forming elements included in said dot-formation array are divided into an even nozzle group and an odd nozzle group, each group comprising N nozzles, where N denotes a positive integer, which are arranged in the secondary scanning direction at a nozzle interval of 2k dot pitch, where k denotes a positive integer, each nozzle in the even nozzle group and an adjoining nozzle in the odd nozzle group being arranged at a fixed interval of k dots.

13. A printing system in accordance with claim 12, said printing system further comprising:

a secondary scanning control unit which drives said head and said scanning control unit to repeat a step of repeating a first path k times and subsequently repeating a second path k times, wherein said first path feeds said printing object after printing a first-sized dot out of said at least two types of dots having different diameters, and said second path feeds said printing object after printing a second-sized dot, which is different in size from the first-sized dot.

14. A printing system in accordance with claim 12, said printing system further comprising:

a secondary scanning control unit which drives said head and said scanning control unit to repeat a step of repeating a first path k times and subsequently repeating a second path k times when the nozzle interval k is an even value, wherein said first path feeds said printing object after printing a first-sized dot out of said at least two types of dots having different diameters, and said second path feeds said printing object after printing a second-sized dot, which is different in size from the first-sized dot.

15. A printing system in accordance with claim 12, said printing system further comprising:

a secondary scanning control unit which drives said head and said scanning control unit to alternately repeat a first path and a second path when the nozzle interval k is an odd value, wherein said first path feeds said printing object after printing a first-sized dot out of said at least two types of dots having different diameters, and said second path feeds said printing object after printing a second-sized dot, which is different in size from the first-sized dot.

16. A printing system in accordance with claim 13, wherein when a number of nozzles n are used for printing among N nozzles included in said head, where n is a positive integer of not greater than N, 2k and n are relatively prime.

17. A printing system in accordance with claim 13, wherein said first-sized dot is smaller than said second-sized dot.

18. A printing system in accordance with claim 16, wherein said secondary scanning control unit feeds said printing object by n dots.

19. A printing system in accordance with claim 1, wherein said multi-valuing unit varies a threshold value, which is the condition for formation of a dot and used to determine whether a dot is to be formed or not, according to the type of the dot to be printed at the position of said head specified by said position specification unit.

20. A printing system in accordance with claim 19, wherein said multi-valuing unit sets a smaller value to the threshold value for the smaller-diametral dot and a greater value to the threshold value for the larger-diametral dot.

21. A printing system in accordance with claim 19, wherein said multi-valuing unit sets a smaller value to the threshold value for the smaller-diametral dot when the input image data has a lower density.

22. A printing system in accordance with claim 19, wherein said multi-valuing unit sets a smaller value to the threshold value for the larger-diametral dot in an area where density of the input image data is higher than a predetermined level.

23. A printing system in accordance with claim 1, wherein said multi-valuing unit varies an evaluation value, which is the condition for formation of a dot and used to evaluate a recording density realized by a dot, according to the type of the dot to be printed at the position of said head specified by said position specification unit.

24. A printing system in accordance with claim 23, wherein said multi-valuing unit carries out binarization and sets a smaller value to the evaluation value for the larger-diametral dot and a greater value to the evaluation value for the smaller-diametral dot.

25. A printing system in accordance with claim 1, wherein said multi-valuing unit comprises:

an error diffusion unit which diffuses a quantization error of an image density caused by the multi-valuing operation with respect to a target pixel to peripheral pixels in the vicinity of the target pixel; and an image data correction unit which corrects the input image data with a summation of the quantization errors diffused by said error diffusion unit, said multi-valuing unit carrying out the multi-valuing operation based on the corrected image data.

26. A printing system in accordance with claim 1, wherein said head reciprocates along a width of said printing object to form said at least two types of dots, said head forming at least one type of a dot out of said at least two types of dots only during a shift in one direction.

27. A printing system in accordance with claim 1, wherein said head comprises a mechanism for discharging ink particles under a pressure applied to each ink running through an ink conduit by application of a voltage to a piezoelectric element arranged in said ink conduit.

28. A printing system in accordance with claim 1, wherein said head comprises a mechanism for discharging ink particles under a pressure applied to each ink running through an ink conduit by air bubbles that are produced by a supply of electricity to a heating body arranged in said ink conduit.

29. A method of recording at least two types of dots having different diameters on a printing object by driving a head and thereby generating a multi-tone image expressed by recording densities of said at least two types of dots, said head recording a larger-diametral dot out of said at least two types of dots having different diameters at a first position that is determined according to a relative position to said printing object and recording a smaller-diametral dot out of said at least two types of dots at a second position that is different from the first position, said method comprising the steps of:

inputting image data including density information of a target image to be printed;

determining whether said head exists at the first position or at the second position, based on the relative position to said printing object; and carrying out a multi-valuing operation corresponding to a number of tones expressible by said at least two types of dots based on the input image data, while changing a condition for formation of a dot according to a type of the dot to be printed at the position of said head thus determined.

30. A method in accordance with claim 29, wherein said head repeats a primary scan and a secondary scan relative to said printing object, so as to record a two-dimensional image, said head having a plurality of dot-forming elements, which are arranged in a secondary scanning direction and forms said at least two types of dots, and forming one type of a dot out of said at least two types of dots on every primary scan, said method further comprising the steps of:

shifting said head in the secondary scanning direction by a distance that is different from a pitch between said dot-forming elements on completion of every primary scan;

forming dots on said printing object through a plurality of the primary scans at a pitch narrower than the pitch between said dot-forming elements; and carrying out a multi-valuing operation corresponding to a number of tones expressible by said at least two types of dots based on the input image data, while changing the condition for formation of a dot on every primary scan, in which said head forms one type of a dot out of said at least two types of dots.

31. A recording medium mechanically readable by a computer for controlling a head which records a larger-diametral dot out of said at least two types of dots having different diameters at a first position that is determined according to a relative position to said printing object and records a smaller-diametral dot out of said at least two types of dots at a second position that is different from the first position, said recording medium comprising program code means recorded thereon, said program code means comprising:

a first program code which causes a computer to determine whether said head exists at the first position or at the second position, based on the relative position to said printing object; and a second program code which causes the computer to carry out a multi-valuing operation corresponding to a number of tones expressible by said at least two types of dots based on input image data, while changing a condition for formation of a dot according to a type of the dot to be printed at the position of said head thus determined.

32. A printing system for recording at least two types of dots having different diameters on a printing object and thereby generating a multi-tone image expressed by recording densities of said at least two types of dots, said printing system comprising:

a head with a nozzle array that includes a plurality of nozzles to make a plurality of dots simultaneously and form said at least two types of dots having different diameters in response to an input signal:

a shifting unit which shifts said head along a width of said printing object;

a head feeding unit which feeding said head relative to said printing object in a direction perpendicular to the width of said printing object; and a head driving unit which causes said plurality of nozzles to spout ink corresponding to a diameter of one type of a dot during one shift of said head by said shifting unit, thereby forming the one type of a dot on said printing object, wherein a pitch of said plurality of nozzles on said head and a quantity of feed by said head feeding unit have a predetermined relationship, so that at least two nozzles exist to form dots in a specified area and causes the specified area to be filled with dots through a plurality of shifts of said head;

said printing system further comprising:

a control unit which regulates a diameter of dots formed by said plurality of nozzles on every shift of said head and repeats the shift of said head by said shifiting unit and the feed of said head by said head feeding unit.

33. A printing system in accordance with claim 32, wherein said at least two types of dots are formed at a predetermined ratio in the specified area.

34. A printing system in accordance with claim 32, wherein dots formed in the specified area have an identical diameter along every shift of said head.

35. A printing system in accordance with claim 32, wherein dots formed in the specified area have an identical diameter along every feed of said head.

36. A printing system in accordance with claim 32, wherein dots of different diameters formed in the specified area are arranged in a zigzag pattern.

* * * * *